United States Patent [19]

Robinton

[11] Patent Number: 4,692,761

[45] Date of Patent: Sep. 8, 1987

[54] ADAPTIVE COMMUNICATION NETWORK AND METHOD

[75] Inventor: Michael A. Robinton, Palo Alto, Calif.

[73] Assignee: Robinton Products, Inc., Sunnyvale, Calif.

[21] Appl. No.: 747,806

[22] Filed: Jun. 21, 1985

[51] Int. Cl.$^4$ .................... H04Q 11/00; H04J 3/00
[52] U.S. Cl. .................... 340/825.01; 370/17; 370/60; 340/870.02; 340/825.52
[58] Field of Search ........... 340/870.02, 310 R, 310.1, 340/825.01, 825.52, 310 A, 826; 371/64; 370/13, 14, 17, 60, 61, 94

[56] References Cited

U.S. PATENT DOCUMENTS

| | | | |
|---|---|---|---|
| 4,250,489 | 2/1981 | Dudash et al. | 340/825.52 |
| 4,302,750 | 11/1981 | Wadhwani et al. | 340/870.02 |
| 4,380,063 | 4/1983 | Janson et al. | 370/60 |
| 4,393,499 | 7/1983 | Evans | 371/5 |
| 4,427,968 | 1/1984 | York | 340/310 R |
| 4,446,462 | 5/1984 | Ovellette et al. | 340/310 R |
| 4,580,276 | 4/1986 | Andruzzi, Jr. et al. | 340/310 R |
| 4,642,607 | 2/1987 | Strom et al. | 340/310 A |

Primary Examiner—Donald J. Yusko
Attorney, Agent, or Firm—Limbach, Limbach & Sutton

[57] ABSTRACT

A communication system for use in a network of interconnected communication paths such as electrical power lines utilized for distributing electrical power. The system includes two or more remote units and a master unit, each having an associated address, which are connected to the network. The remote units are each capable of initiating a down link message sequence wherein a data package containing data, such as data relating to power consumption, is transferred from one of the remote units to the master unit. The down link message sequence may include the transmission of one or more messages containing the data package by the remote units with the particular path taken being a function of network conditions. The master unit acknowledges receipt of the data package by initiating an up link message sequence wherein the remote units transmitting during a down link sequence are informed of the receipt. In addition to addresses and data package the messages include information regarding network conditions. By way of example, a message may include information which indicates the amount of noise present in the message path between the transmitting remote unit and the master unit and information which indicates the number of message transmissions required to transfer a data package from the transmitting unit to the master unit. Remote units ascertain network conditions for selecting optimum message paths by examining messages received on the network, including messages not directed to the receiving remote unit.

78 Claims, 47 Drawing Figures

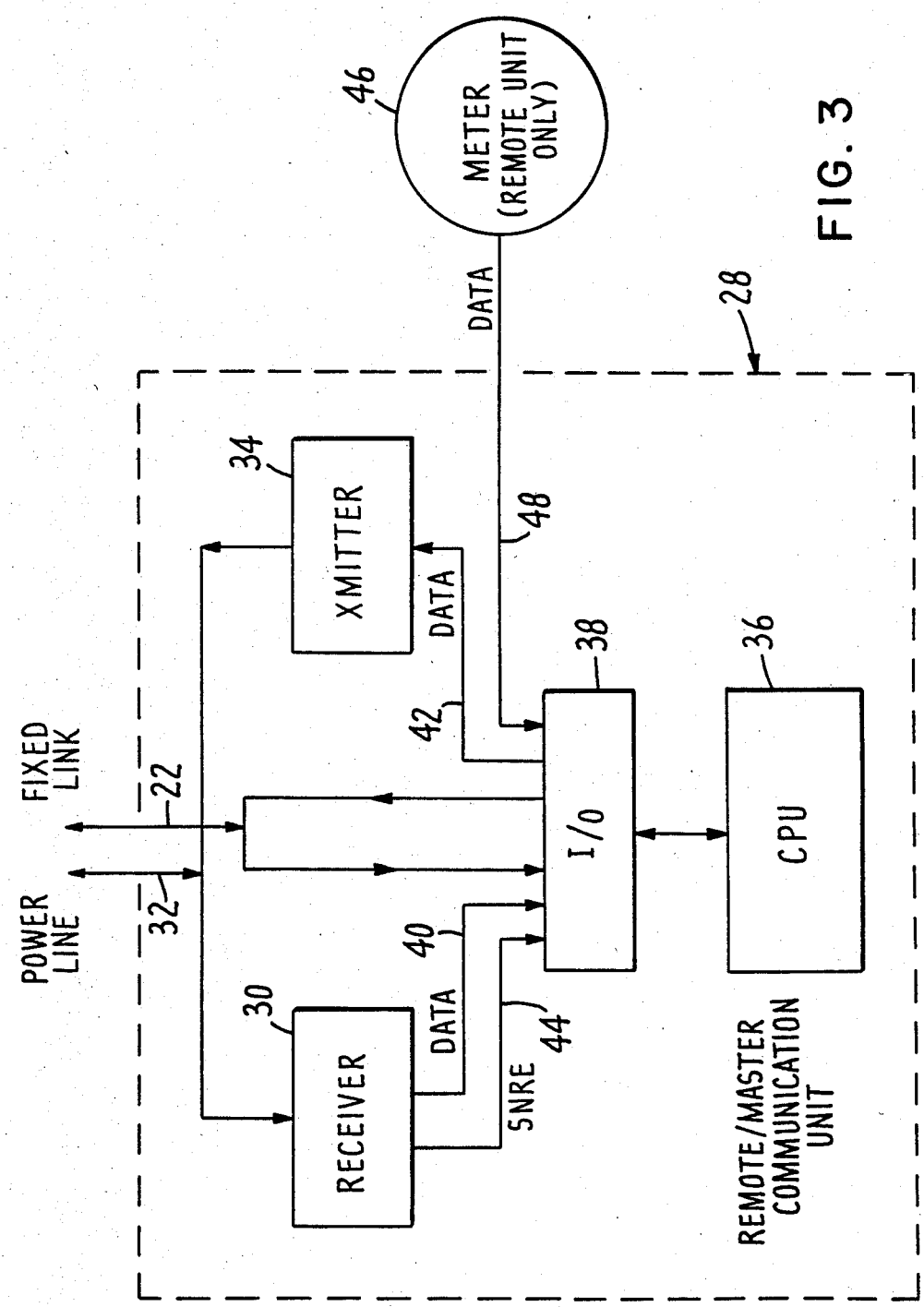

ADAPTIVE COMMUNICATION NETWORK AND METHOD

DESCRIPTION

1. Technical Field

The subject invention relates generally to communication networks and methods and, more particularly, to an adaptive communication network having a control or master unit which is in communication with a plurality of remote units and which is capable of automatically changing communication paths in the presence of noise and other changes in the network.

2. Background Art

In many communication networks, it is necessary for various remote sending units to periodically forward data to a central or master unit. By way of example, many older buildings, such as apartment buildings, are wired such that it is only convenient to measure the amount of electrical energy consumed by the entire building or a major subsection of the building using a centralized meter. It is frequently not convenient to install separate meters in the individual units or apartments since access to the meters in the apartments is usually not available.

One solution to the foregoing problem is to rewire the building to include a line to each apartment from each meter to a central site. The cost of such rewiring is typically prohibitive. The building power lines which are fed to each apartment can be used for transmitting data to a central unit by injecting a modulated carrier signal on the lines. Thus, it is not necessary to rewire the building. However, power lines are notoriously noisy; therefore, it is difficult to establish a reliable communication link without utilizing an inordinately high amount of signal power. In addition, the noise on a particular data path will typically drastically change with respect to time. By way of example, if electrical equipment utilizing a normally noise-free line is turned on, the increase in noise may be so great that no reasonable amount of signal power will insure reliable communication over the line.

The present invention overcomes the above-noted limitations in conventional metering applications. Existing power lines are used for transmitting a modulated carrier, therefore substantially no changes in the building wiring need be made. In addition, immunity to noise is provided by virtue of a data package store and forward function which is performed by each remote unit so that a data package originating from remote units can be relayed by other remote units towards the master unit. The particular path taken by a data package is also automatically altered to take into account changes in power line noise and other network conditions. These and other advantages of the subject invention will be obvious to those skilled in the art upon a reading of the following Best Mode for Carrying Out the Invention, together with the drawings

DISCLOSURE OF THE INVENTION

A communication system for use in a network of interconnected communication paths is disclosed. The communication paths may include, for example, a network of power lines for distributing electrical energy. The system includes a plurality of communication nodes which are capable of transmitting messages on the network including a master unit and a plurality of remote units which are also capable of receiving messages on the network. Each node has an associated address for identifying the node. The system may also include remote units, sometimes referred to as secondary remote units, which are capable of only transmitting messages. Remote units capable of both transmitting and receiving messages are sometimes referred to as primary remote units to distinguish them from secondary remote units.

The primary remote units are each capable of initiating a down link message sequence wherein a data package is transferred from the remote unit to the master unit. The data package may include for example, power consumption data produced by a power meter associated with the initiating remote unit. The data package may also be associated with a secondary unit which transmitted a message received by the sequence initiating primary remote unit if secondary remote units are utilized.

The down link message sequence includes the transmission of at least one message, with such messages being referred to as down link messages. It is possible that two or more successive down link message transmissions will be required to transfer the data package to the master unit.

The down link messages include, in addition to the data package, a source address identifying the node which is associated with the data package. For example, if the down link message contains a data package from a secondary remote unit, the source address will correspond to the secondary remote unit address. The down link messages also include an intermediate source address identifying which of the nodes transmitted the message and an intermediate destination address identifying which of the nodes is intended to receive the messages.

By way of example, if a first primary remote unit received a message from a secondary remote unit and transmits a subsequent message to a second primary remote unit, the subsequent message will have a source address which corresponds to the secondary remote unit address, an intermediate source address which corresponds to the first primary remote unit address, and an intermediate destination address which corresponds to the second primary remote unit address. It is likely that other remote units, in addition to the second primary remote unit will receive the message since the primary remote units are all capable of receiving messages on the network.

The master unit is capable of initiating an up link message sequence in response to receipt of one of the down link messages. The up link sequence serves to inform the down link sequence-originating remote unit that the master unit received the data package from the sequence-originating remote unit. The up link sequence includes the transmission of one or more messages, referred to as up link messages.

The up link messages include an intermediate source address identifying the node which transmitted the message, an intermediate destination address which identifies which of the nodes is intended to receive the message and a final destination address identifying the node associated with the data package present in the down link message received by the master unit which resulted in the responding up link message. By way of example, if the data package associated with a secondary remote unit had been transfered from a first primary remote unit to the master unit, the responding up link message transmitted from the master unit to the first primary remote unit will have an intermediate source address which corresponds to the address of the master unit, an intermediate destination address which coresponds to the first primary remote unit address and a final destination address which corresponds to the address of the secondary remote unit.

The remote units are provided with a remote input means for receiving the data package to be transferred to the master unit. The remote input means includes remote receiver means for receiving messages transmitted over the network. In that event, the data package is derived from the received messages. The remote input means may also include data input means for receiving the data package from a data source associated with the remote unit. An exemplary associated data source would be a power meter.

The remote receiver means includes direction means for discriminating between the up and down link messages received by the remote unit. By way of example, the messages may include one or more bits which indicate message direction, with the direction means examining such bits of received messages. The remote receiver means further includes store and forward means for identifying received messages requiring a transmit action by the remote unit. Transmit action may include a message transmission during an up or down link message sequence. A transmit action may also include the initiation of a down link message sequence. This may occur when a primary remote unit receives message from a secondary remote unit if such units are present.

In addition to the remote input means, the remote units include a remote transmitter means for transmitting the messages in response to receipt by the remote unit of a message requiring a transmit action by the unit. The remote transmitter means includes down link transmit means for transmitting down link messages containing a data package. In the event the communication nodes include secondary remote units, the down link transmit means will transmit down link messages containing a data package obtained from messages received from the secondary units.

The down link transmit means includes down link address means for determining the intermediate destination address of messages transmitted by the remote units. The address is determined utilizing at least one parameter indicative of network conditions obtained from messages received by the remote units. The parameters are obtained, at least in part, from messages which are not directed to the subject remote unit, i.e., received messages having an intermediate destination address which is other than that of the receiving remote unit. It is these messages which contain information regarding network conditions which may enable the receiving remote unit to select alternative down link addresses which are more preferable than the intermediate destination address presently used by the remote unit for transmitting down link messages.

There are several possible parameters indicative of network conditions which can be utilized by the down link address means for determining optimum down link intermediate destination addresses. In the presently-preferred embodiment, a total of seven parameters are utilized, although fewer or more parameters and different parameters will provide satisfactory operation. One such parameter is whether a potential down link intermediate destination address is also used for intermediate destination addresses for up link messages. If this is the case, the node identified by the address is less likely to be suitable for receiving down link messages. The amount of noise present in messages transmitted by the node is an example of a further parameter.

The remote transmitter means further includes up link transmit means for transmitting up link messages in the event the message received by the remote unit is an up link message. The up link transmit means includes up link address means for determining the intermediate destination address of the up link message. In the preferred embodiment, the up link intermediate address is typically determined during a previous down link message sequence.

The master unit is provided with a master receiver means and a master transmitter means. The master receiver means is a means for receiving messages transmitted over the network and includes direction means for discriminating between up and down link messages. The master transmitter means is a means for transmitting up link messages in response to receipt of the master unit of a down link message. The up link message may, for example, be the first message of an up link message sequence wherein a down link sequence-originating remote unit is informed of receipt of a data package by the master unit, as previously described.

BRIEF DESCRIPTION OF THE DRAWINGS

FIG. 3 is a schematic block diagram of a communication unit of the subject communication system.

BEST MODE FOR CARRYING OUT THE INVENTION

The subject adaptive communication network will be described in connection with a power metering system for an apartment building. It should be understood, however, that the subject invention has applications other than power metering systems The power wiring of a building, such as an apartment building, will vary widely depending on many factors including arbitrary choices made by the builder. It is a principle objective of the subject invention to accommodate almost any conceivable building power wiring configuration.

Figure 1:
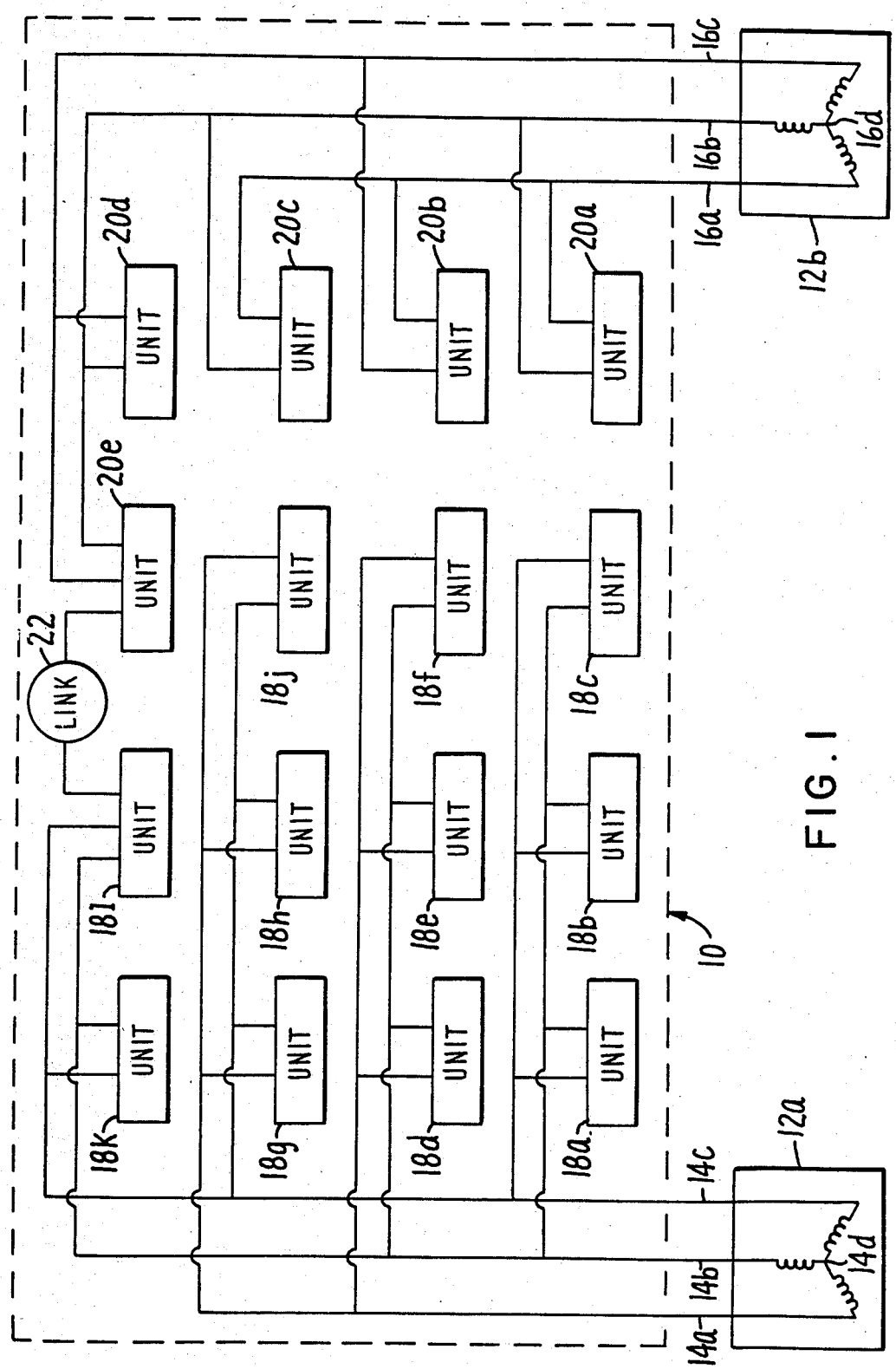
FIG. 1 is a schematic diagram of an exemplary apartment building depicting a typical power line arrangement which can be utilized in connection with the subject communication system.

Referring now to the drawings, FIG. 1 is a simplified schematic representation of an apartment building and associated exemplary wiring configuration. The apartment building, generally designated by the numeral 10, has four floors, with four apartment units 18 and 20 present on each floor. It should be noted that the subject communication network is intended primarily for much larger buildings with a smaller building being described to illustrate the characteristics of a typical building wiring configuration.

The building illustrated is powered by two separate power transformers, this being a relatively common practice. The transformers have three-phase Y-configured secondary windings 12a and 12b, each having a neutral connection 14d and 16d, respectively. Each apartment unit 18 receives power from one or the other of the secondary windings. Secondary winding 12a provides power to apartment units 18, and secondary winding 12b provides power to apartment units 20.

All three phases of the secondary winding outputs of both transformers are available on each floor of the building. Lines 14a, 14b and 14c carry the three-phases of secondary 12a and lines 16a, 16b and 16c carry the three phases of secondary 12b. Two of the three phases are distributed to the apartment units on each floor. By way of example, the phase output on lines 14a and 14b of secondary 12a are distributed to the second floor apartment units 18d, 18e and 18f and the phase output on lines 16a and 16c of secondary 12b are distributed to the second floor apartment unit 20b. In addition, a neutral line (not shown) coupled to the neutral connection (14d, 16d) of each of the two transformers is also distributed to each of the apartment units.

Although not depicted in the FIG. 1 diagram, each apartment unit 18 and 20 is provided with a communication unit and an associated electronic power meter. Each communication unit is programmed to periodically transmit power consumption data provided by the meter to a central or master unit located in the building utilizing the power lines. Other forms of data can also be transmitted to the master unit.

Communication units located in the apartment units 18, referred to herein sometimes as remote units or nodes, are frequently not capable of transmitting data directly to the master unit. This is due to many factors including, for example, noise present on the power lines, the physical separation of the remote units from the master unit, and the configuration of the building wiring. Accordingly, the present invention utilizes a store and forward technique, as will be subsequently described in greater detail, wherein each remote unit is capable of receiving and retransmitting information, sometimes referred to as a data package, in messages originating from other remote units.

Assuming, by way of example, that the master communication unit is disposed in apartment unit 18c, it is likely that a remote communication unit located in adjacent apartment 18b will be able to communicate directly with the master unit. However, a remote unit located in apartment unit 18l, for example, will most likely be required to communicate to the master unit through intermediate remote units. A typical communication link would include a remote unit in apartment 18k, from apartment 18k through secondary 12a to unit 18a, then to apartment 18b and finally to apartment 18c. There exist several other alternative communication links which could also be used, with the particular link path being selected based upon several factors, to be subsequently described, so as to optimize overall communication efficiency.

Apartment units 20 are not capable of communicating with the master communication unit exclusively utilizing the power line since the master is coupled to a different power transformer. In such cases, where a single building receives electrical power from more than one power transformer, it is necessary to provide one or more fixed communication links between the separate segments of the power system. Such permanent links preferably include electro-optical isolators so as to maintain electrical isolation between the segments. Radio links could also be used for this application. By way of example, a fixed link 22 is provided between apartment unit 18l, powered by secondary 12a, and apartment unit 20e, powered by secondary 12b. Any communications between apartment units 18 and 20 must utilize link 22.

The primary mode of communication includes the transmission of a message containing a data package by one of the remote units which is destined to the master unit followed by an acknowledgement or reply message from the master unit back to the originating remote unit. Messages can also be transmitted to the master unit from a remote unit without a following acknowledgement message. In addition, messages may originate from the master unit which contain a data package intended for a particular remote unit, a group of remote units or all remote units.

A brief overview of the subject communication network will now be given in connection with the schematic diagram of FIG. 2. The diagram, which represents an exemplary network, includes a plurality of remote units 26 and an associated master unit 24, sometimes collectively referred to as nodes. The remote and master units are coupled to a power line grid (not depicted) which may include one or more fixed links.

The lines interconnecting the remote and master units represent exemplary data paths over the power line and/or fixed link at a particular point in time. When a remote unit 26 transmits a message containing a data package originated by the unit, which will typically contain meter data, master unit 24 will be the final destination for the data package. The remote units contains a list of one or more preferred node addresses to which the message will be directed. The node addresses, referred to as down link address, are selected based upon various network parameters which may change with respect to time.

Figure 2:
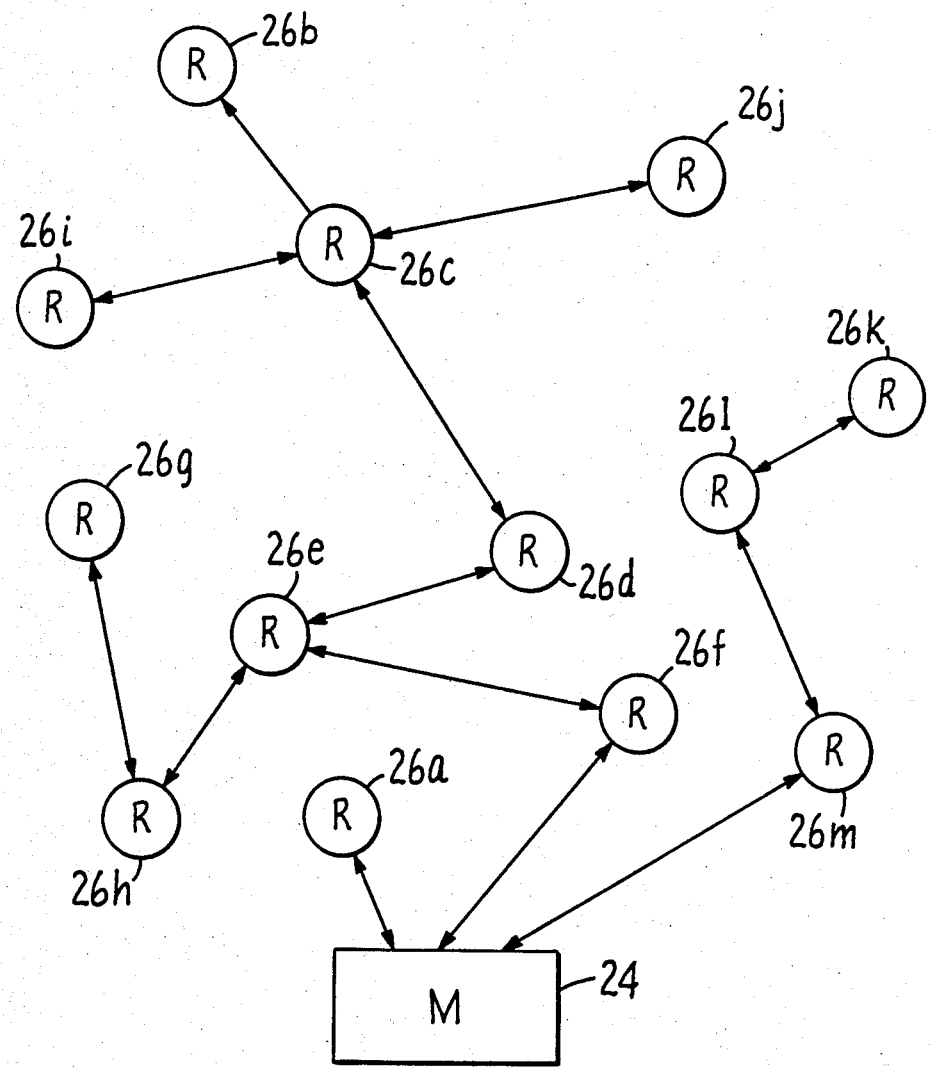
FIG. 2 is a schematic diagram illustrating a typical communication system and exemplary communication paths among the various remote communication units and the master communication unit of a preferred embodiment of the subject invention

For the conditions depicted in the FIG. 2 diagram, remote unit 26m has determined that the preferred down link address is the address of master unit 24. Accordingly, unit 26m will transmit down link messages directly to master unit 24. For the same network conditions, remote unit 26e has determined that it would be preferrable to transmit down link messages to intermediate remote unit 26f, rather than directly to the master unit. Intermediate remote unit 26f will then store and forward the data package in the message to its preferred down link node address, which is the address of the master unit in this instance. It can be seen that the data package transmitted in the message by remote unit 26b must be stored and forwarded by four intermediate remote units 26c,26d,26e and 26f, respectively, in order to reach the master unit.

The remote units are adapted to alter the preferred down link addresses should network conditions change. By way of example, should remote unit 26f become incapable of communicating directly with the master unit because of an increase in noise on the power line, remote unit 26e is adapted to sense the change in network conditions and select another node address for down link messages.

Down link address selection is preferably based upon a plurality of network parameters. One important parameter is the demonstrated ability of a particular remote unit to communicate with the master unit. Another important parameter is the amount of noise present in the data path between the remote unit and the preferred down link unit. The distance of the remote unit from the master unit is still another important parameter. Such distance is measured in terms of the number of message transmissions required for a data package originating from the remote unit to reach the master unit and is referred to as Hop Count. Additional parameters will be subsequently discussed.

An exemplary message transmission sequence will now be described. Each remote unit is adapted to originate a data package to periodically initiate a down link message sequence by transmitting a message containing a data package originated by the unit in the form of meter data wherein the data package is transferred from the remote unit to the master unit. The message will typically be transmitted once a day and the data package will comprise meter data. Once the master unit has received the data package, the master is adapted to initiate an up link message sequence, which includes one or more messages, referred to as up link messages, wherein the transmitting remote units in the down link message sequence are apprised of receipt by the master unit of the data package.

Assuming that remote unit 26c has transmitted a message containing a data package originated by the remote unit, the message will be directed to remote unit 26d, since that remote unit is presently preferred. In addition to the meter data, the message will contain an Intermediate Destination Address, which is the address of remote unit 26d and an Intermediate Source Address, which is the address of unit 26c. An additional address will be included indicating that unit 26c is the source of the data package in the message. The message will further contain information indicating that the message is a down link message, therefore, the master unit is the final destination. Accordingly, unit 26d will determine that the meter data are to be stored and forwarded in the down link direction.

Remote unit 26e is the presently-preferred down link address for unit 26d. Accordingly, unit 26d will transmit an additional down link message containing the meter data, with the Intermediate Destination Address being that of unit 26e and the Intermediate Source Address being that of 26d. The address of unit 26c associated with the meter data in the down link message sequence will remain in all of the messages, as the data package is stored and forwarded. Unit 26d will also store the Intermediate Source Address of the received message, unit 26c, which will be used in transmitting the up link reply message. The address of the remote unit originating the data package will also be stored so that the reply message can be identified.

Remote unit 26e will store and forward the meter data in a subsequent down link message followed by a store and forward sequence performed by unit 26f. The Intermediate Destination Address of the message transmitted by unit 26f will be the address of the master unit 24. Remote units 26e and 26f and master unit 24 will each store the respective Intermediate Source Address of the received message, together with the address of the remote unit originating the data package.

Upon receipt of the final down link message of the sequence, master unit 24 is adapted to initiate an up link message sequence which will include the transmission of one or more up link messages. The path taken by the up link message will be the same as that taken by the previous down link message sequence. The up link message transmitted by the master will include a final destination address which is the same as the address associated with the data package in the message received by the master, namely, remote unit 26c. The up link address of the message, the Intermedidate Destination Address, will be the same as the stored Intermediate Source Address of the received message, namely, remote unit 26f.

The message received by unit 26f will contain information indicating that the message is an up link message. In addition, the final destination address present in the message will not be that of unit 26f, thereby indicating that the acknowledgement is to be stored and forwarded in the up link direction. Unit 26f will use the previously-stored Intermediate Source Address as the Intermediate Destination Address of the message to be transmitted. The final destination address of the received message will be used to identify the stored up link address.

The up link store and forward operation will be repeated by remote units 26e and 26d. The final destination address of the message transmitted by unit 26d will match the address of unit 26c. Accordingly, unit 26c will determine that it is the final destination of the reply message and will not store and forward the acknowledgement further.

Each remote unit is adapted to confirm that an expected acknowledgement or reply message is received. When a down link message for which a reply is expected is transmitted, the transmitting remote unit starts an associated failure timer. If the expected reply message is not received within a time period determined by the timer, a flag associated with the remote unit, referred to as a Link confirmed flag, is cleared. The flag is inserted in all messages transmitted by the remote unit. If the transmitting remote unit also initiated the sequence, a retry timer is also started when the message is transmitted. If an expected reply message is not received prior to the time out of the retry timer, the originating unit will initiate a subsequent down link message sequence containing the same meter data.

When a message is transmitted on the network, the message will usually be directed to a single remote unit or to the master unit, as determined by the Intermediate Destination Address of the message. There are, however, message types which are directed to more than one node, as will be subsequently explained. Inasmuch as the nodes are all coupled to a common power line/fixed link network, nodes other than those to which a message is directed will usually receive the message. By way of example, messages transmitted by remote unit 26c and directed to unit 26d may be received by surrounding units, including units 26b, 26i, 26g and 26e. Messages receive by a node, but which are not directed to the node, are sometimes referred to as ancillary messages. Although ancillary messages are not acted upon or stored and forwarded, the messages are processed for the purpose of obtaining information relating to network conditions. Such messages serve an important function in enabling the receiving remote unit to determine optimum Intermediate Destination Addresses for down link messages transmitted by the unit.

The foregoing can be further illustrated by again referring to the FIG. 2 diagram. Assume that remote unit 26k has transmitted a down link message for which a reply is expected. The presently-preferred down link address for unit 26k is unit 26l. Unit 26l will store and forward the message followed by unit 26m. If the expected reply message is timely received by unit 26l, all further messages transmitted by unit 26l will include a set Link confirmed flag. Remote units capable of receiving messages transmitted by unit 26l will examine the Link confirmed flag and will be able to ascertain, that, at least with respect to the last attempt to communicate with the master unit, unit 26l was successful. This information will be used by the receiving remote units in selecting preferred down link addresses such as the address of unit 26l.

If a remote unit does not receive an expected reply message, further messages transmitted by the unit will contain a cleared Link confirmed flag if the failure timer has expired, as previously described. However, a substantial amount of time may pass prior to the issuance of such a further message. In order to acquire more current information regarding the status of other remote units, each remote unit is adapted to monitor expected reply messages not only expected by the subject unit but expected by other units. For example, when unit 26l transmitted the down link for which a reply message is expected, other remote units receiving the down link messages will monitor unit 26l to verify that unit 26l transmits the expected reply up link message to unit 26k.

The foregoing can be illustrated as follows. If, for example, remote unit 26j is capable of receiving messages transmitted by unit 26l, it will receive the down link message directed to unit 26m. Unit 26j will monitor unit 26l to verify that unit 26l transmits the expected reply message to unit 26k. If the expected transmission by 26*l* is not received by unit 26*j*, unit 26*j* will be less likely to select unit 26*l* for forwarding down link messages. Other remote units capable of receiving messages transmitted by unit 26*l* will function in a similar manner.

Preferably, many other parameters are used for the purpose of selecting optimum down link addresses. As a further example, each remote unit is capable of estimating the signal-to-noise ratio (SNR) of received messages. Remote units transmitting messages with a high SNR will be preferred over those transmitting messages with a low SNR. Another parameter is the Hop Count of the node, with the Hop Count being included in messages transmitted by the unit. The Hop Count value of a node is indicative of the number of down link message transmissions that are required to transfer a data package, such as meter data, from the node to the master unit. The master unit, by definition, has a fixed Hop count of zero. Unit 26*d* presently has a Hop Count of three, for example, and unit 26*m* has a Hop Count of one. With other parameters being equal, unit 26*l* will select unit 26*m* over unit 26*d* for down link messages because of the lower Hop Count. These and other network parameters used in selecting down link addresses will be described later in greater detail.

It should be further noted that each remote unit is adapted to initiate a down link message sequence for the purpose of assisting other remote units in selecting down link addresses. The data package in such down link messages may or may not include meter data.

At initial power on, none of the remote units have determined optimum down link addresses. The units are implemented to initially automatically transmit a down link message. The message will have the address of the master unit as the Intermediate Destination Address. Referring again to FIG. 2, it can be seen that initial messages transmitted by remote unit 26*f* will be received by the master unit and the master unit will transmit a reply up link message which unit 26*f* will receive.

Assume that unit 26*e* also transmitted an initial message which was not received by the master unit as a result of, for example, noise present in the power line section between the two units. Unit 26*e* will not receive an acknowledgement from the master unit. For the network conditions depicted in the diagram, unit 26*e* is capable of receiving messages from unit 26*f*. Messages transmitted by unit 26*f* will contain information, such as Hop Count value, and the Link confirmed flag which indicates that the unit has successfully communicated with the master unit. Accordingly, unit 26*e* will utilize the address of unit 26*f* as the Intermediate Destination Address for down link messages rather than the address of the master. This process continues with each of the remote units establishing an optimum down link Intermediate Destination Address.

The subject communication system is also capable of transmitting commands from the master unit to one or more remote units. The commands, referred to as Global Sequence Commands, are typically directed to all remote units or a group of units. Each command has an associated unique Global Sequence Number. As will be subsequently described, the Global Sequence Number is used to ensure that each remote unit receives all Global Sequence Commands.

Inasmuch as all nodes are coupled to a common data path network and operate relatively asynchronously, it is possible that collisions between messages will occur. Such collisions are likely to obliterate one or both messages. The subject system includes numerous features which reduce the likelihood that collisions will occur. By way of example, most transmissions by a node are initiated in response to a randomly generated number. In addition, the probability that some transmission of a node initiating a message sequence will occur at a particular event time is a function of the amount of message traffic on the network. If the amount of message traffic is heavy, the probability of the transmission per event time is reduced. Thus, the likelihood of a collision is correspondingly diminished.

System collisions are further reduced utilizing a channel allocation scheme. As will be further described, many messages contain information commanding other remote units to refrain from transmitting messages on the network for a fixed or variable time period. For example, remote unit 26*b* may initiate a down link message sequence for which a reply is expected. The initiating message will typically include transmit hold delay information to be acted upon by other remote units. If unit 26*i* receives the message, the unit will refrain from transmitting on the network for a period of time which is sufficiently long so as to permit the expected reply message to be received by originating unit 26*b*. Down link remote units storing and forwarding the data package originating from unit 26*b*, including units 26*c*,26*d*,26*e* and 26*f* will also transmit messages instructing the surrounding units to temporarily refrain from transmitting.

Having set forth a brief overview of the operation of the subject communication system, a more detailed description of the construction and operation of the system will now be given. Referring now to FIG. 3, a simplified block diagram of a communication unit is depicted. The remote and master units are similarly constructed, with the primary difference residing in the associated programming rather than in hardware. In addition, one or more of the remote or master units may have an optional associated display (not depicted) for displaying various messages, which is used exclusively for diagnostic purposes.

A communication unit, generally designated by the numeral 28, includes a transmitter section 34 having an output coupled to the power line 32. Transmitter section 34 typically utilizes a 36 kHz carrier which is phase modulated by digitally-encoded baseband data provided on input line 42. The baseband data rate is typically 180 bits per second.

The communication unit further includes a receiver section 30 having an input coupled to power line 32. Receiver section 30 receives 36 kHz phase modulated signals present on the power line 32 and provides a demodulated baseband digitally-encoded output on line 40. Receiver section 30 also provides digital data on separate outputs represented by line 44 which are used to produce a figure of merit signal which represents the estimated signal-to-noise ratio of a particular received message.

The communication unit further includes a suitably-programmed central processing unit (CPU) 36 which is coupled to the receiver and transmitter section through conventional input/output devices (I/O) represented by block 38. I/O 38 also receives digitally-encoded data on line 48 from external sources such as an electronic power meter 46 in the event the communication unit is a remote unit, rather than the master. Other data sources can also be used, such as alarms and the like.

The I/O may be further coupled to a fixed link 22. The I/O receives and transmits unmodulated messages over the link. The apparatus for converting the electrical signals from the I/O to optical signals and the optical signals on the link to electrical signals is conventional and not depicted. For purposes of simplification, the fixed link can be assumed to be a hardwired data path which introduces substantially no noise.

Figure 4A:
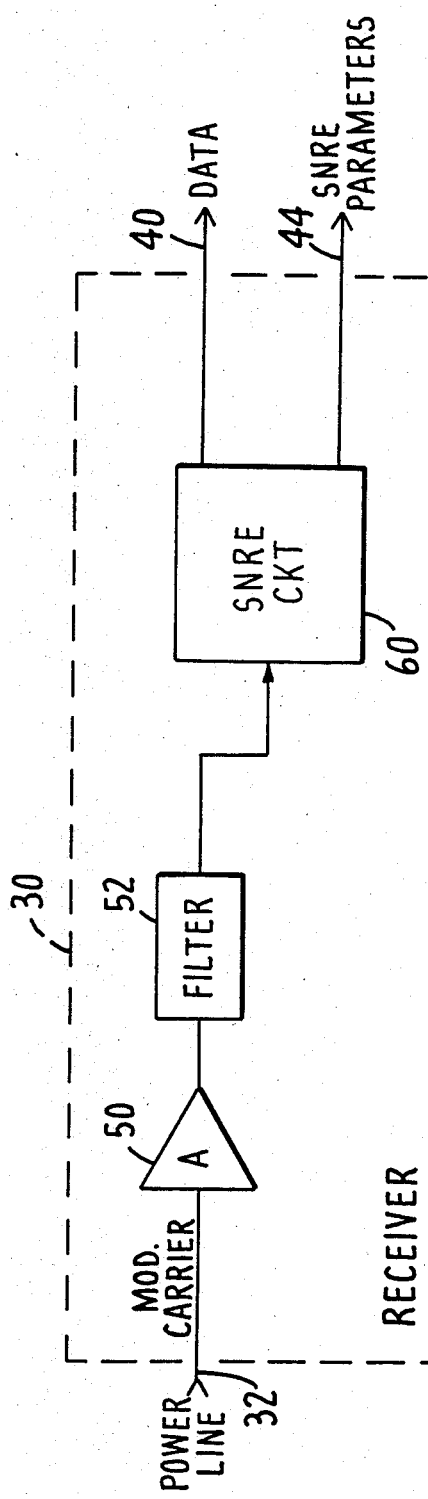
FIG. 4A is a block diagram of the receiver section of the communication units of the subject communication system.

Further details of receiver section 30 of the communication units are shown in the block diagram of FIG. 4A. The receiver section includes a input amplifier 50 coupled to the power line 32 for amplifying the 36 kHz phase modulated carrier. Amplifier 50 also includes conventional amplitude limiting circuitry.

The output of amplifier 50 is connected to the input of a bandpass filter 52 having a center frequency of 36 kHz. The receiver circuit further includes an SNRE circuit 60 which is fully described in a U.S. patent application entitled "Apparatus and Method for Producing a Signal-to-Noise Ratio Figure of Merit for Digitally Encoded-Data", naming the same inventor as the present application, the contents of which are hereby fully incorporated herein.

Ciruit 60 serves two functions. The first function is to demodulate the phase modulated carrier present at the output of filter 52. The baseband data are outputted on line 40. Circuit 60 further provides Signal-to-Noise Ratio Estimator (SNRE) parameters on output lines represented by 44. As set forth in the above-noted application, the SNRE paramters are utilized by CPU 36 to produce an SNRE value which is indicative of the signal-to-noise ratio of the received message.

Figure 4B:
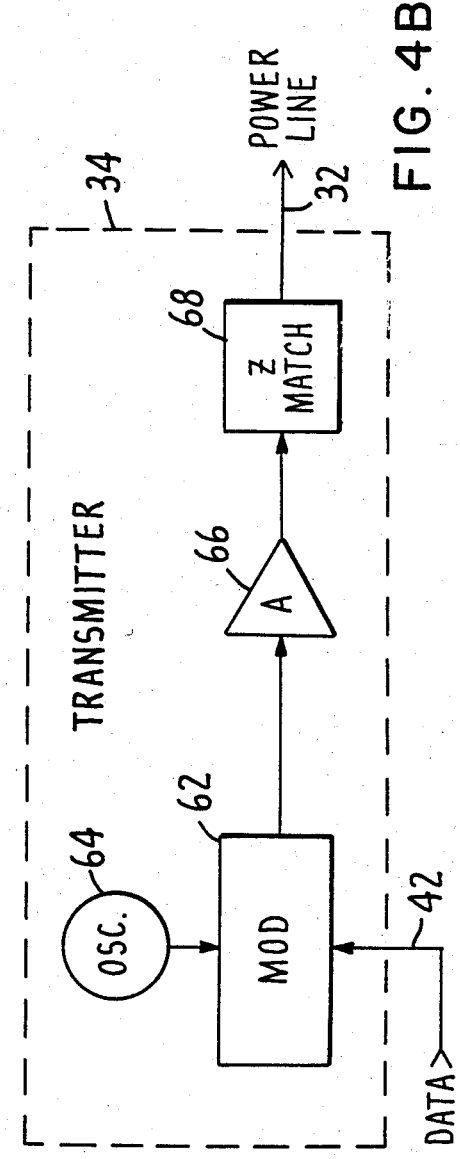
FIG. 4B is a block diagram of the transmitter section of the communication units of the subject communication system.

FIG. 4B shows further details of the construction of the transmitter section 34. The transmitter section includes an oscillator 64 which provides a digital output signal having a frequency of 36 kHz. The output of oscillator 64 is connected to the carrier input of a digital modulator 62. The modulating input is coupled to line 42 which carries digitally-encoded data from I/O 38. The output of modulator 62 is a phase-shift-keyed (PSK) signal wherein the phase of the carrier is reversed in accordance with the data on line 42. Modulator 62 may be implemented utilizing an exclusive OR gate, as is well known.

The modulated 36 kHz signal is then amplified by a conventional amplifier 66, with the output of the amplifier being fed to an impedance matching circuit 68. The output of circuit 68 is coupled to power line 32.

Figure 5:
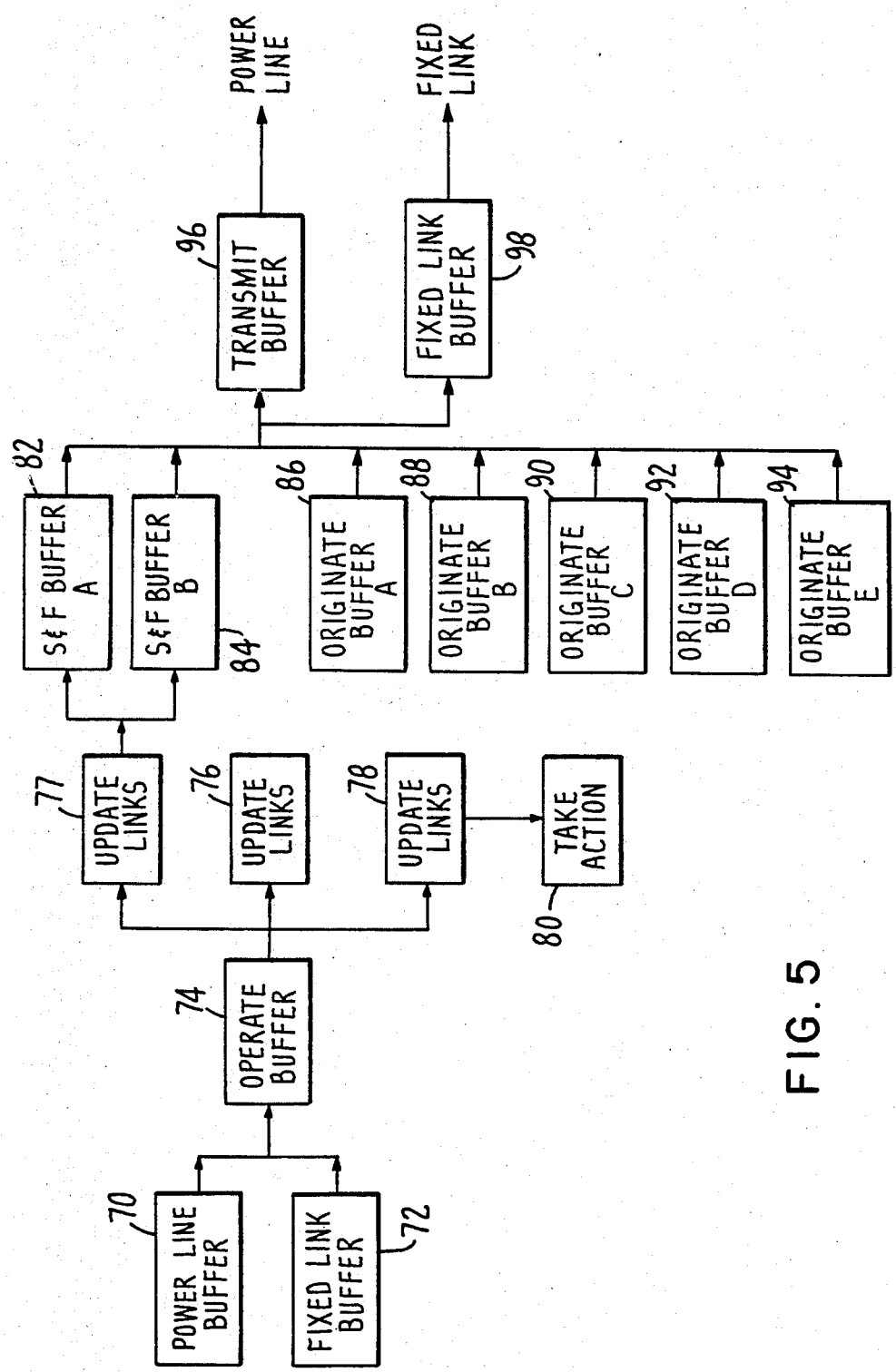
FIG. 5 is a diagram depicting the various registers of the communication units of the subject communication system.

FIG. 5 is a simplified block diagram illustrating the buffer or register configuration of an exemplary communication unit. The unit is provided with two message input buffers for receiving demodulated messages. Messages received over the power line are transferred to power line buffer 70 and messages received over the fixed link are transferred to fixed link buffer 72.

Messages are transferred from the input buffers 70,72 to an operate buffer 74. If the received message is not directed to the subject communication unit, i.e., the message Intermediate Destination Address is different than the address of the receiving remote unit, the message will be processed for the purpose of selecting preferred down link addresses, as represented by block 76. Since the message is not directed to the subject unit, no further action will be taken with respect to the message. As will be subsequently described, certain types of commands originating from the master unit will be directed to more than one remote unit, depending upon the message type and certain associated data flags, as will be described later. If a command is directed to one or more remote units, such units act upon the command, if appropriate.

If the subject communication unit is the final destination for the data package, the message will also be processed for the purpose of optimizing the down link addresses, as represented by block 78. In addition, the message will be acted upon in accordance with the contents of the data package, as indicated by block 80.

If the message is directed to the subject unit, but the unit is not the final destination of the data package, the data package in the message will be stored and forwarded in a subsequent message. As represented by block 77, the message first will be processed for the purpose of updating the down link addresses. The message will then be transferred to one of two store and forward buffers 82, 84. The messages will remain in either buffer 82, 84 until the transmit sequence is initiated. At that time the message will be transferred to transmit buffer 96.

If the subject unit is coupled to a fixed link, the message containing a data package to be stored and forwarded is transferred to a fixed link buffer 98. The message is then transmitted over the power line utilizing transmitter 34 (not shown). If there is a fixed link, the message will also simultaneously be transmitted over the link. As will be subsequently described in greater detail, the power line baseband message is substantially identical to the fixed link message with the primary difference being that the power line message is hashed and includes a hashing constant, which is used for unhashing the message, and synchronization bits.

The communication unit further includes five buffers, 86, 88, 90, 92 and 94 for holding data packages originating from the subject unit. The data packages are held in the buffers until the unit is ready to initiate a down link message sequence by transmitting a message containing one of the data pacakges. Since the probability for transmiting a sequence-initiating message at a particular event time may be a function of the amount of message traffic, a substantial amount of time, on the order of two to three hours, may pass before the message is actually transmitted. Accordingly, a plurality of originate buffers are utilized to accommodate data packages which may accumulate.

As will be subsequently described, once transmission commences, all waiting originating data packages will be successively transmitted so as to maximize network message throughput, with each message causing a down link message sequence followed by an up link reply sequence. Once actual transmission commences, the message is transferred from the associated originate buffer to the transmit buffer and transmitted over the power line in the same manner as previously described in connection with store and forward messages. Transmission will also occur over the fixed link utilizing buffer 98 if a fixed link is present.

Operation of the subject communication network will now be described in connection with the flow charts of FIGS. 6-35. Table 1 below shows the content of the messages which are transmitted and received by the communication units in the subject communication network.

TABLE 1

MESSAGE CONTENTS

Preamble (16 bits)
Sync (8 bits)

Hashing Constant (5 bits)
Hop Count (4 bits)
Global Sequence Number (8 bits)
Message Type (6 bits)
Sequence Number (5 bits)
Message Following Flag (1 bit)
Quality of Back Link (2 bits)
Data Flags (3 bits)
Link Confirmed (1 bit)
Measured Priority (4 bits)
Intermediate Destination Address (10 bits)
Source/Destination Address (10 bits)
Intermediate Source Address (10 bits)
System Number (8 bits)
Data Field (104 bits)
Cyclic Redundancy Check (16 bits)

Each message includes a total of 221 bits. As set forth in Table 1, 16 bits of each message include a preamble followed by 8 synchronization bits. An additional 5 bits represent a hashing constant used to decode the message at the receiver. Approximately 80 bits of the message comprise various control fields which will subsequently be described. The message further includes a data field of approximately 100 bits for holding message data. The last 16 bits of each message serve as Cyclic Redundancy Check bits, which, as is well known, are used for data verification.

Table 2A contains a list of definitions of the terms used in the messages, some of which have been previously mentioned. These terms will be further explained in connection with the overall description of the invention.

TABLE 2A

| MESSAGE TERM | DEFINITION |
|---|---|
| Global Sequence Number (GSN) | A number which identifies commands originated by the master unit. |
| Hop Count (HC) | The number of message transmissions required to transfer a data package from the remote unit which transmitted the message to the master unit. |
| Intermediate Destination Address (IDA) | The address of the communication unit intended to receive the message, i.e., the unit to which the message is directed. |
| Intermediate Source Address (ISA) | The address of the communication unit which transmitted the message. |
| Link confirmed flag (L) | Indicates whether the remote unit transmitting the message successfully completed the last communication sequence to the master unit. |
| System Number (SYN) | Identifies a system comprised of a master unit and associated remote units. |
| Message Following Flag (MFF) | A flag which indicates that another message sequence follows immediately from the remote unit identified by the Source/Destination Address of the message. |
| Measured Priority (MP) | A measure of the busiest average message traffic experienced by any remote unit within the virtual link (Table 2B) of the message. |
| Quality of back link (Q) | A measure of the worst case figure of merit for the signal-to-noise ratio for all segments of the virtual link (Table 2B) of the message. |
| Source/Destination Address (SDA) | The address of the remote unit associated with the data package in the message (Table 2B) or the address of the remote unit which is the final destination of the message. |
| Sequence Number (SN) | A number which remains constant for all messages in a down link message sequence and responding up link sequence and used to identify the data package. |

Table 2B contains a list of definitions of some of the other terms, in alphabetical order, which will be used to describe the operation of the subject communication network.

TABLE 2B

| OTHER TERMS | DEFINITIONS |
|---|---|
| Actual Command Received (ACR) | A value indicative of the last Global command Number received by the remote unit. |
| Broadcast Message | A message having no particular destination and an Intermediate Destination Address of all zeros. |
| Calculated Priority (CP) | A measure of the average message traffic experienced by a remote unit. |
| Down Link Message | A message transmitted by a remote unit having a data package to be transferred to the master unit. |
| Expected List (XPLST) | A list of addresses of remote units for which a responding message is expected together with an associated flag for each entry which indicates whether the message for which a response is expected was transmitted by the remote unit associated with the list. |
| Failure List (FLST) | A list of worst performing down link addresses which have been or are on the Good List. |
| Failure Quotient (FQ) | A figure/merit for the failure/success ratio of a remote unit over time to receive an expected responding up link message. |
| Global Sequence Command (GSC) | A message containing command information originating from the master unit to be acted on by one or more remote units. |
| Good List (GOODLST) | A list comprised of addresses used as down link Intermediate Destination Addresses in order of preference. |
| Last Address (LSTADD) | The last Source/Destination Address (SDA) which caused the communication channel to be allocated. |
| Link List (LNKLST) | A list comprised of addresses used as Intermediate Destination Addresses during the up link message sequence of a virtual link which are |

TABLE 2B-continued

| OTHER TERMS | DEFINITIONS |
|---|---|
| | set during the previous down link message sequence. |
| Semaphore List (SEMLST) | An indexed list for all message types which provides various information for each type (Table 4). |
| Signal-to-Noise Ratio Estimator (SNRE) | A value which represents an estimate of the signal-to-noise ratio for a received message. |
| Store and Forward Operation (S & F) | The transmission of a of a message by a remote unit containing a data package obtained from a received message to be transferred to another remote unit or to the master unit. |
| System Priority (SP) | A value used by a remote unit to govern the probability of transmission of certain messages. |
| Up Link Message | A message containing a data package originating from the master unit and intended to be received by one or more remote units. |
| Virtual Link | The path between communication nodes for a message sequence. |

An executive program is utilized for controlling the sequence which various tasks or jobs are performed by the communication units. As is well known, executive programs assign a priority to the various jobs once the jobs have been queued. In the present system, the jobs include, for example, the processing of messages received over the power line, the processing of messages received over the fixed link, the storing and forwarding of a data package and the computation of a value which is an estimate of the signal-to-noise ratio of a received message. Other jobs controlled by the executive program will be subsequently described.

Figure 6:
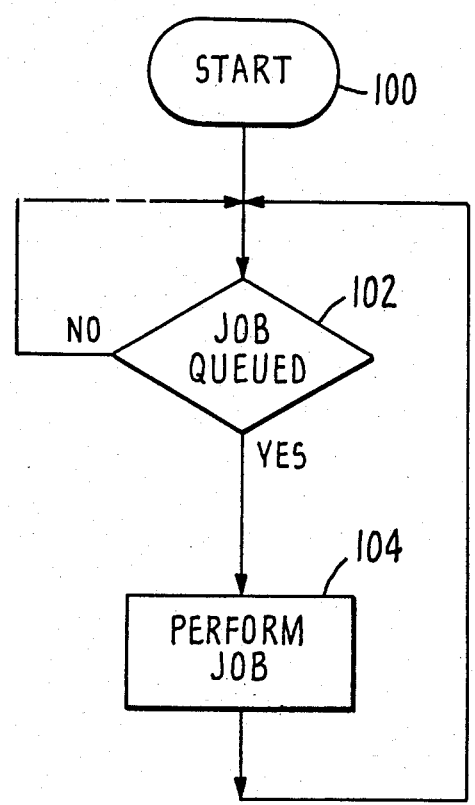
FIG. 6 is a simplified flowchart depicting the executive program for controlling overall operation of the communication units of the subject system.

A simplified flowchart depicting the operation of the executive program is shown in FIG. 6. The beginning of the sequence is represented by element 100. As indicated by element 102, a determination is made as to whether any of the various jobs controlled by the executive program have been queued. If no jobs have been queued, the sequence remains in a loop.

Assuming that one or more jobs have been queued, the jobs are then performed as indicated by block 104. If there is more than one job to be performed, the sequence of performance takes place in accordance with a predetermined priority. Once the job(s) have been performed, the sequence returns to the starting point and a determination is made as to whether any further jobs have been queued. The program will remain in a loop until a job is queued.

The sequence for initial processing of received messages is depicted in the flowcharts of FIGS. 7A–7E. When a received message is detected, a job is queued for carrying out such initial message processing. The executive program causes the sequence to be commenced. If the message is received over the power line, the beginning of the sequence is represented by element 106 of FIG. 7A. The demodulated message is transfered to the power line input buffer 70 (FIG. 5). As represented by block 108, an internal pointer is directed to the power line buffer.

If the remote unit under consideration is connected to a fixed link, the beginning of the sequence for processing message received over the link is represented by element 110. The received message is transferred to fixed link buffer 72 (FIG. 5). As represented by block 112, an internal pointer is then directed to the fixed link buffer.

A determination is then made as to whether a received message is currently being processed, as indicated by element 114. This determination is made by examining a flag asociated with operate buffer 74 (FIG. 5). If another message is being processed, the received message will remain in the input buffer. A job will be queued to attempt to process the received message at a later time. As indicated by element 118, the sequence then returns to the executive program which will control when the retry job will be performed.

Assuming that another message is not being processed, the received message will be transfered to the operate buffer. Various groups of information will then be extracted from the message and transfered to preassigned registers.

Messages received over the power line and fixed link are generally treated identically, with a few exceptions. In the event the message is received over the fixed link, an internal flag is set, as also represented by block 122, indicating that fact.

As indicated by block 124, the six bits in the received message representing message type are extracted. In the present embodiment there are sixty-four possible message types. These types include, for example, down link messages of a down link message sequence initiated by remote units which contain a data package such as electrical consumption data. Another type of message is the up link messages of an up link message sequence initiated by the master unit in response to receipt of a previous down link message. The previously-described Global Sequence Commands GSCs containing command information originating from the master unit comprise a still further message type. These and other message types will be discussed later in greater detail.

As indicated by block 126, the Hop Count HC value is also extracted from the received message. As previously noted and as set forth in Table 2A, the value of HC in a received message represents the number of message transmissions required to transfer a data package from the transmitting remote unit to the master unit. Messages transmitted by the master unit have a zero value of HC, as previously stated.

In the event the received message is a message containing a data package to be stored and forwarded in the up link direction, the value of HC in the transmitted message will be set equal to the value of HC in the received message, plus one. Accordingly, as indicated by block 128, the value of HC will be saved for use in the event the message information is to be stored and forwarded in the up link direction. The manner in which the value of HC is determined for messages transmitted in the down link direction will be subsequently described.

As indicated by block 130, the five Sequence Number SN bits are then extracted. As set forth in Table 2A, the SN remains constant for all messages in a particular down link message sequence and responding up link sequence and is used by remote units to identify the particular message sequence.

The foregoing can be further illustrated by reference to the FIG. 2 diagram. Assume that remote unit 26h has initiated a down link message sequence and transmitted a message of the type for which a reply is expected. The SN associated with unit 26h will be incremented so that the responding reply message can be distinguished from reply messages resulting from previous down link message sequences initiated by the unit. The incremented SN will be inserted in the transmitted message. In addition, the value of SN will be stored in the corresponding one of originate buffers 86, 88, 90, 92, 94 (FIG. 5).

The down link message will be transmitted to unit 26e, given the present status of the system as depicted in the diagram. Unit 26e will store and forward the data package by transmitting a message to unit 26f. The value of SN in the message transmitted by unit 26e will not be changed since the data package in the message was originated by unit 26h. Unit 26e will store and forward the data package by transmitting a message to unit 26f and unit 26f will store and forward the data package by transmitting a message to master unit 24 with the original value of SN.

Master unit 24 will transmit a reply up link message back to unit 26f. The value of SN will be will be the same as the down link messages. Units 26f and 26e will successively transmit up link messages until initiating unit 26h receives the terminating up link message. The value of SN in the received message will be examined at unit 26h and compared with values of SN stored in the originate buffers for the purpose of identifying the message as the expected reply to the original down link message Returning to the FIG. 7A flowchart, the Quality of back link value Q is then extracted from the received message, as indicated by block 132. As set forth in Table 2A, the value of Q represents a measure of the worst case figure of merit derived from the signal-to-noise ratio for all messages of a virtual link. Q is one of the network parameters utilized in selecting preferred down link addresses and in the present embodiment may vary from 3 (least noise) to 0 (most noise).

As previously noted, each remote unit is adapted to produce a SNRE value which represents an estimate of the signal-to-noise ratio for each received message. The signal-to-noise ratio estimated value, referred to as the SNRE value, is another network parameter utilized in selecting preferred down link addresses. In addition, the SNRE value is used to produce the Quality of back link value Q.

Each remote unit contains a list of preferred down link addresses used for transmitting down link messages. As set forth in Table 2B, the list of addresses is referred to as the Good List GOODLST, with each address entry having a set of associated parameters, including SNRE and Q. The addresses are listed in order of preference, with the preferred address being located at the top of the GOODLST. The top GOODLST entry is used by a remote unit for transmitting all down link messages The addresses of the list and the address order may be altered if network conditions change, as will be subsequently described.

Each time a message is received from a remote unit, the receiving unit will examine the message for the purpose of determining whether the transmitting unit should be added to the Good List GOODLST or, if already present in the list, whether the list order should be changed.

The manner in which the GOODLST is updated with an SNRE value and Q will now be briefly described. Referring to the FIG. 2 diagram, assume, for example, that unit 26e has received an up link message from unit 26f. The value of Q in the message transmitted by unit 26F is taken from the top entry in the unit 26f GOODLST. This is true for all messages transmitted by the communication nodes, with the exception of the master unit. Messages transmitted by the master unit always contain a best case Q value of 3 (least noise). For the network conditions depicted in the FIG. 2 diagram, it can be seen that the top GOODLST entry for unit 26f is the master unit 24. This is because the arrow indicates that the preferred down link address for unit 26f is the master unit. The value of Q for this entry represents the amount of noise present in the communication link between the master unit and unit 26f.

Receiving unit 26e will compute an SNRE value which is indicative of the amount of noise introduced into the message in the link between unit 26f and unit 26e. If transmitting unit 26f is present on the GOODLST of receiving unit 26e, the computed SNRE value will be averaged with the SNRE value in the GOODLST. If the transmitting address is not present on the unit 26e GOODLST, no averaging takes place and the computed SNRE value is used. It can be seen from the FIG. 2 diagram that for present network conditions, unit 26f is present on the unit 26e GOODLST.

The SNRE value may range from 0 to 45, with the larger value representing a higher estimated signal-to-noise ratio to-noise. A local value of Q is determined from the SNRE value in accordance with Table 3 below.

TABLE 3

| Q | SNRE |
|---|------|
| 0 | 0–11 |
| 1 | 12–23 |
| 2 | 24–35 |
| 3 | 36 and up |

The local value of Q for unit is indicative of the amount of noise present in the communication link between unit 26e and 26f. The local value of Q is compared with received value, and the lower or worst case value of Q is retained. If the transmitting unit is present on the GOODLST of the unit, the list entry is updated with the worst case value of Q and the computed SNRE value. If there is no present GOODLST entry, a conditional entry will be made containing the two values. As will be subsequently described, the conditional entry may be retained if the associated parameters indicate that the entered address would be suitable for use as a down link address.

All messages transmitted by unit 26e will contain a value of Q taken from the top GOODLST entry for the unit. In the present example, unit 26f is the top GOODLST entry; therefore the previously described worst case value of Q will be inserted in the messages. All remote units receiving messages from unit 26e will be able to determine the quality of the communication link between the unit and the master unit by examining the value of Q. This information, along with other information to be subsequently described, is utilized by receiving remote units for selecting preferred down link addresses for the receiving unit GOODLST.

Referring again to FIG. 7A, once the value of Q of the received message is extracted, a set of semaphores for the message are obtained The semaphores are obtained from a semaphore list SEMLST stored in the remote unit. The SEMLST is a look up table which contains pertinent information regarding the received message, based upon the message type. Table 4, below, set forth exemplary information contained in the SEMLST for each of the sixty-four possible message types Any particular message type may have one or more of the characteristics set forth in the SEMLST, provided the characteristics are consistent. By way of example a Global Sequence Command GSC is also an up link message A GSC cannot be a down link message, by definition.

TABLE 4

Semaphore List Information

Global Sequence Command
Up link message
Down link message
Response expected
Elapsed timer required
Fix transmit hold delay for one message time
Fix transmit hold delay for two message times
Fix transmit hold delay for three message times
Fix transmit hold delay for four message times
Variable transmit hold delay=HC*message times
Variable transmit hold delay=2*HC*message times As can be seen from Table 4, the SEMLST indicates whether the message is a Global Sequence Command GSC. As described in Table 2B, a GSC is a message originated by the master unit and intended to be acted upon by one or more remote units As will be subsequently explained, there are four types of GSCs, with the particular command type being indicated by the three data flag bits present in the message (Table 1).

The SEMLST also contains message direction information for each message type. The message will typically be either an up link or a down link message. As will be subsequently described, one message type is not assigned a message direction.

The SEMLST further contains information as to whether the message is of the type which requires a response or reply. Down link messages, which by definition contain information having the master unit as the final destination, typically are of the type for which a response is expected. Up link message typically are of the type for which a response is not expected.

Some messages are also of the type which are time critical. In those instances, information relating to the amount of time required for messages to travel over the network is produced utilizing an elapsed application timer. As set forth in Table 4, the semaphores for the particular message type will indicate whether an elapsed timer is required. The operation of the elapsed timer function will be subsequently described.

As previously noted, network message collisions are reduced by causing selected remote units to temporarily refrain from transmitting. Many of the message types will indicate that such a transmit hold delay is required for certain units receiving the message.

The semaphores for the message type will indicate whether a transmit hold delay is required, and, if so, the duration of the delay. As set forth in Table 4, certain message types call for a fixed hold delay of one, two, three or four message times, with a message time in the present embodiment being approximately 1.3 seconds. Other message types call for a variable hold delay which is a function of the Hop Count HC value present in the received message. The magnitude of the hold delay may be either the value of the HC multiplied by one message time or the value of HC multiplied by two message times As previously noted, the likelihood of message collisions is reduced by controlling the probability of transmitting a message at any particular event time, sometimes referred to as a slot time. The probability of transmission is generally inversely proportional to the amount of message traffic on the network and is controlled by a timer referred to as a probability transmit timer. Each received message contains information regarding traffic on the network; therefore, when a message is received, a determination is made as to whether the probability transmit timer should be updated The sequence for updating the probability transmit timer will now be briefly described. In the present embodiment, the transmit timer includes a seventeen bit counter which is clocked every approximately 88 milliseconds by a slot timer. The counter is started at an initial value which is randomly selected A message transmission will commence when certain bits of the counter become zero The probability of transmission at a given slot time is governed in accordance with the following equation:

$$P = 1/(2^{NT}) \qquad (1)$$

where P is the probability of transmission and NT is the number of counter bits examined and varies from ∅ to 17.

It can be seen from the foregoing that if NT is set to ∅, none of the counter bits are examined. Messages will be transmitted at the next slot time tick with a probability P of one. If NT is set to 17, all counter bits are examined. The probability P will be approximately $8 \times 10^{-6}$. Since the slot timer has a period of 88 milliseconds, it can be seen that if NT is equal to 17, a transmission may not commence for approximately three hours.

It should be noted that the slot timer is resynchronized each time the communication unit receives a message. The timer clock will tend to occur at the beginning of each message, so that the various slot timers throughout the system will be substantially synchronized with one another.

Messages transmitted over the network have varying priority depending upon various factors including the type of message. The messages can be grouped into messages having a floating priority and messages having a fixed priority. The probability of transmitting messages having a floating priority will change if message traffic over the network changes. The probability of transmitting fixed priority messages will not change with network traffic changes.

Messages sequences initiated by a remote unit are almost invariably down link messages having a data package which, by definition, has the master unit as the final destination. Once a message has been successfully transmitted onto the network without collision, the hold delay instruction in the message and in subsequent store and forward messages will cause other remote units to refrain from transmitting. As will be subsequently explained, once a message from a sequence initiating remote unit has been transmitted, the channel will be allocated to the initiating unit and other remote units will refrain from transmitting until the reply up link message has been received.

Messages transmitted by a remote unit which is initiating a down link message sequence sometimes fall within the floating priority category. In that event the probability of transmission is a function of the System Priority SP value as set forth in Table 2B. System Priority SP is an indication of the worst case network message traffic at any particular time. The greater the value of SP, the lower the probability of transmission of floating priority messages.

The foregoing can be further illustrated by referring again to the FIG. 2 diagram. Assume, for example, that remote unit 26k is about to initiate a down link message sequence. It is possible that unit 26c is experiencing a large amount of message traffic which unit 26k cannot detect. Both units will be transmitting messages having the master unit 24 as the final destination, with the master unit forming a bottleneck in the network. The function of the System Priority SP value is to provide message traffic information to remote units which can be utilized for controlling the probability of transmission.

Floating priority messages transmitted by a sequence initiating remote unit are transmitted with a probability determined by the current value of System Priority SP. The number of counter bits examined NT, sometimes also referred to as message priority, is determined for such floating priority messages in accordance with the following equation:

$$NT = NTO + PCF \quad (2)$$

where NTO is an original priority value and PCF is a priority correction faction equal to the value (SP−17).

The original priority value NTO of the equation is, in the present embodiment, equal to 17. For certain sequence initiating messages where a fast response is desirable, NTO is set to 6.

The priority adjustment factor PCF=(SP−17) is updated each time a message is received and is also updated periodically. The System Priority SP may vary from a minimum value of 6 to a maximum value of 17. In the present embodiment, NT computed in accordance with equation (2) has a minimum value of 6, independent of PCF. Thus, for example, if message traffic is very high at any location on the network, SP will ideally approach the maximum of 17 for all remote units. PCF will be ∅ so that message priority NT will be equal to the original priority value NTO of 17. Thus, in accordance with equation (1), the probability of transmission P at any slot time will be at the minimum value (approximately $8 \times 10^{-6}$). If the value of SP is small thereby indicating that traffic is light, the probability of transmission will increase in accordance with equations (1) and (2).

Once the counter of the probability transmit timer has been set with an initial random value for a floating priority message, a substantial amount of time may pass before an actual transmission is attempted. If the network traffic conditions change while the transmit timer is running, the actual probability of transmission P can be varied in accordance with equation (1) by simply changing the number of counter bits examined (NT), as previously described.

Messages transmitted by a remote for store and forwarding a data package in a down link message fall within the fixed priority category. Once the probability of transmission P has been determined, the value remains fixed and does not vary in accordance with equation (2).

Down link messages which store and forward data packages have a fixed priority which is determined in accordance with the following equation:

$$NT = \text{Log}_2 SP \quad (3)$$

Although message priority NT is a function of System Priority SP, once NT has been initially computed and the transmit timer is running, NT will not change with changes in System Priority Since NT is an integer, the exact relationship between NT and SP of equation (3) is set forth in Table 5 below.

TABLE 5

| NT | SP |
|---|---|
| 4 | 16, 17 |
| 3 | 8–15 |
| 2 | 6–7 |

It can be seen from Table 5, and equation (1), the probability of transmission of store and forward down link messages is fairly high in comparison to sequence initiating floating priority messages. The minimum value of NT for fixed priority messages is 2 whereas the minimum value for floating priority messages is 6, as previously noted. Thus, if message traffic is low, SP will be 6 and NT will be 2 indicating that the message will be transmitted with a probability P of 0.25 at the next slot timer tick, in accordance with equation (1).

Up link store and forward messages are also fixed priority, with certain exceptions. These messages are transmitted with message priority NT set to ∅, independent of SP. As will be subsequently described, remote units which have failed to the extent that the unit is not capable of receiving messages, periodically transmit data packages to the master unit. The messages are referred to as deaf node messages. A deaf node is implemented to periodically transmit four identical messages and to then discard the message. The four messages are transmitted with an NT of 17, 16, 15 and 14, respectively. A remote unit receiving a deaf node message transmitted by the deaf node will transmit a subsequent deaf node message containing the data package originated by the deaf node. The receiving remote unit will initiate a down link sequence of deaf node messages with the sequence initiating message being transmitted with NT equal to 12. Any subsequent messages of the deaf node message sequence will be transmitted as any normal down link store and forward message with NT determined in accordance with equation (3).

Broadcast messages, messages that have no particular destination (Table 2B), are transmitted with a floating priority NTO of 6. The master unit sends up link messages in response to down link messages with a fixed priority of ∅.

System Priority SP is derived from Calculated Priority CP and Measured Priority MP values. As will be described later in greater detail, each remote unit and the master unit computes a local Calculated Priority CP value which is indicative of the local message traffic (Table 2B). In the present embodiment, CP is substantially proportional to the average number of messages received and transmitted by a communication unit within a sixty-four second time interval. CP has a minimum value of 2 and a maximum value of 17.

A Measured Priority MP value (Table 2A) is inserted in each message transmitted by a remote unit or by the master unit. MP is calculated by a remote unit when a message is received by comparing the received MP value with the local CP value. The larger of the two values, which represents a greater amount of message traffic, is inserted as the MP value in messages transmitted by the unit. SP is also set equal to the transmitted MP of up link messages for controlling the probability transmit timer in accordance with equation (2) for variable priority messages and equation (3) for certain fixed priority messages. As will be subsequently described, SP will be periodically updated each time a local value of CP is calculated.

The transmitted MP serves to inform a receiving remote unit of message traffic conditions elsewhere in the network. Since the transmitted value of MP is the larger of the received MP value and the local CP value, the transmitted MP and SP are an indication of the maximum message traffic at any location in the network. Although the values of SP for all remote units in the network will not necessarily be the same, all values of SP will have a tendency to rise and fall with the worst case message traffic at any network location Information regarding network traffic conditions is accumulated when messages are traveling down link from the originating remote units. Accordingly, the values of SP for the remote units are only updated by up link messages since such messages containing traffic information which is more complete than the corresponding down link messages.

Figure 7A:
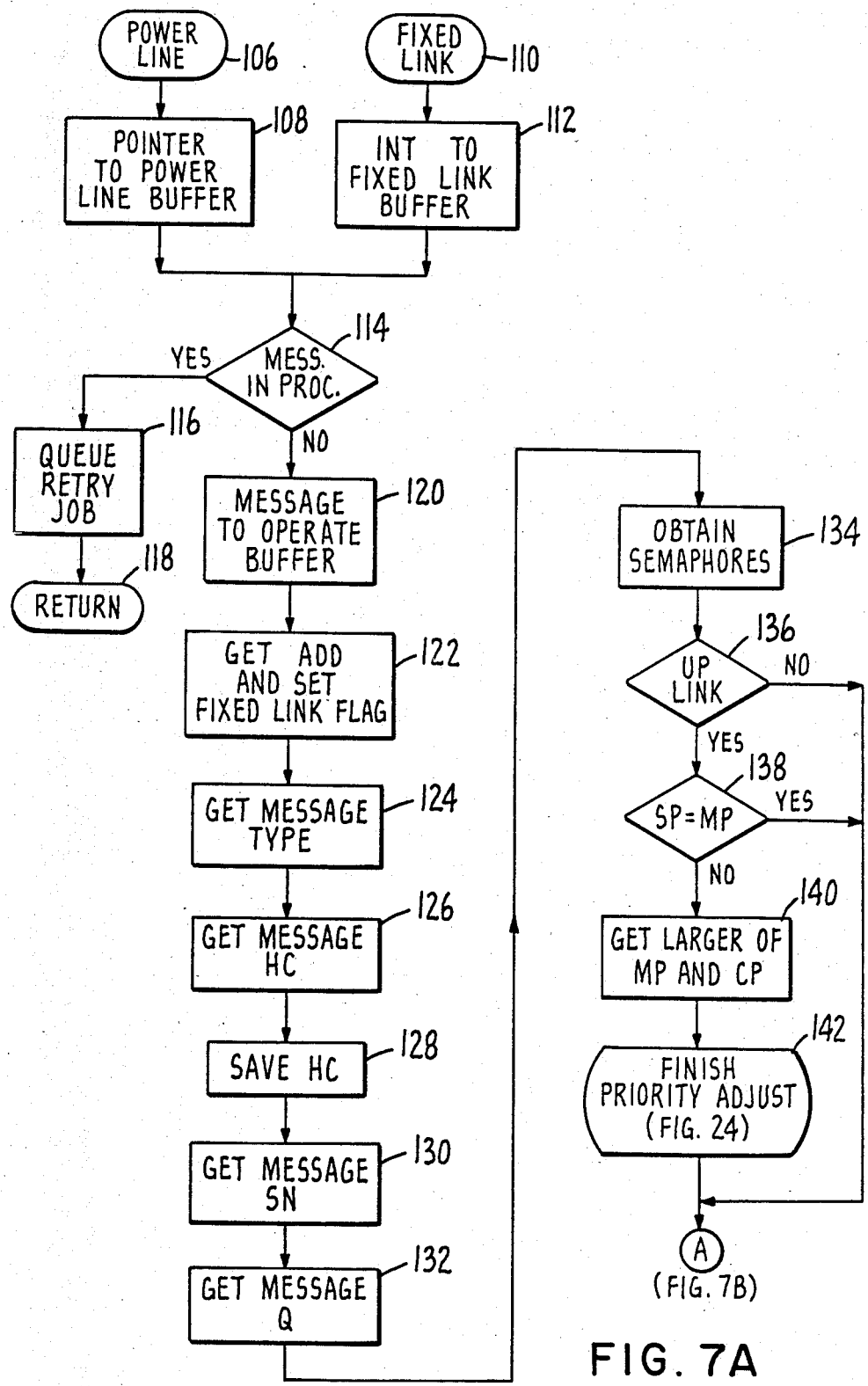
FIG. 7A-7E is a flowchart depicting the manner in which remote units initially process received messages.

Returning to the flowchart of FIG. 7A, the semaphores for the received message type are obtained so that a determination can be made as to whether the received message is an up link message, as indicated by element 136. If the message is up link, a sequence will be entered for updating the value of SP for the receiving remote unit. If the message is down link, the value of SP is not updated for the reasons previously set forth.

Assuming that the message is an up link message, the received value of MP is compared with the local value of SP, as indicated by element 138. If the two values are the same, there is no requirement to change SP. If SP is not equal to the received MP, a preliminary adjusted value of SP is set equal to the larger of the received MP and the local Calculated Priority CP, as represented by block 140. Once the preliminary value of SP is determined, a subroutine is entered for completing the priority adjust sequence, as indicated by element 142.

Figure 24:
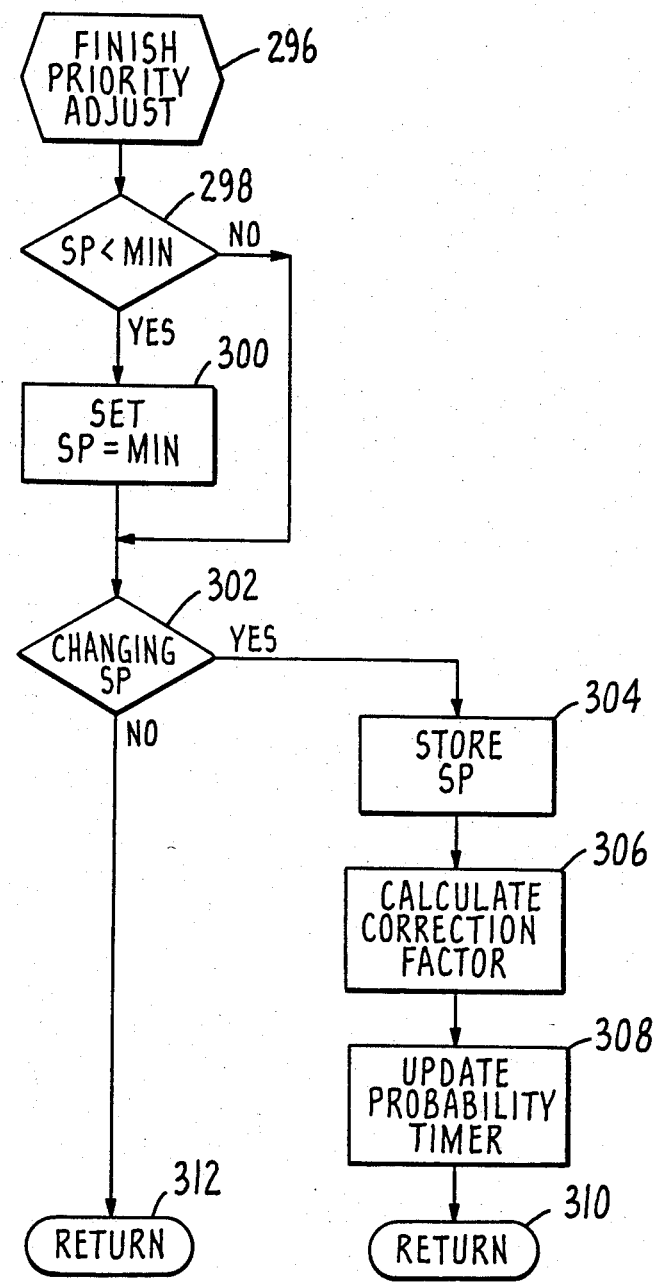
FIG. 24 is a flowchart for a subroutine for completing a sequence which controls a probability transmit timer.

A flowchart for the completion of the priority adjust subroutine is depicted in FIG. 24. Entry into the subroutine is represented by element 296. As indicated by element 298, a determination is first made as to whether the preliminary value of SP is less than the minimum value of 6. If the value is less than 6, the minimum value is used, as shown by block 300

Once the new value of SP is determined, the preliminary value of SP is compared with the present value of SP. As indicated by element 302, if the two values do not differ, it will not be necessary to change the present value of SP. Accordingly, the sequence will return to the calling program which continues on the FIG. 7B flowchart as represented by element 312.

Assuming that the two values of SP are different, the new value of SP will be stored, as represented by block 304. Once the new value of SP has been stored, the adjustment factor PCF is computed by subtracting the number seventeen from the new value of SP as represented by block 306. As previously noted in connection with equation (2), PCF represents the change in the number of probability timer bits NT which are to be examined. The actual number of bits examined is then computed in accordance with equation (2).

As set forth in equation (1), the value of NT controls the actual probability of transmission at a given slot time. Once NT is computed, the probability transmit timer is updated and the sequence returns to the calling program, as represented by block 308 and element 310, respectively. As previously noted, the updated priority value will not be used unless the message to be transmitted is a floating priority message. For fixed priority messages, the priority value NT is not changed once set.

As defined in Table 2A, each message contains a System Number SYN, which identifies the network associated with the message. Each remote unit in the system will be programmed with the appropriate SYN so that messages from other systems, referred to as foreign messages, can be identified. Such foreign messages are utilized for limited purposes, as will be subsequently described.

Figure 7B:
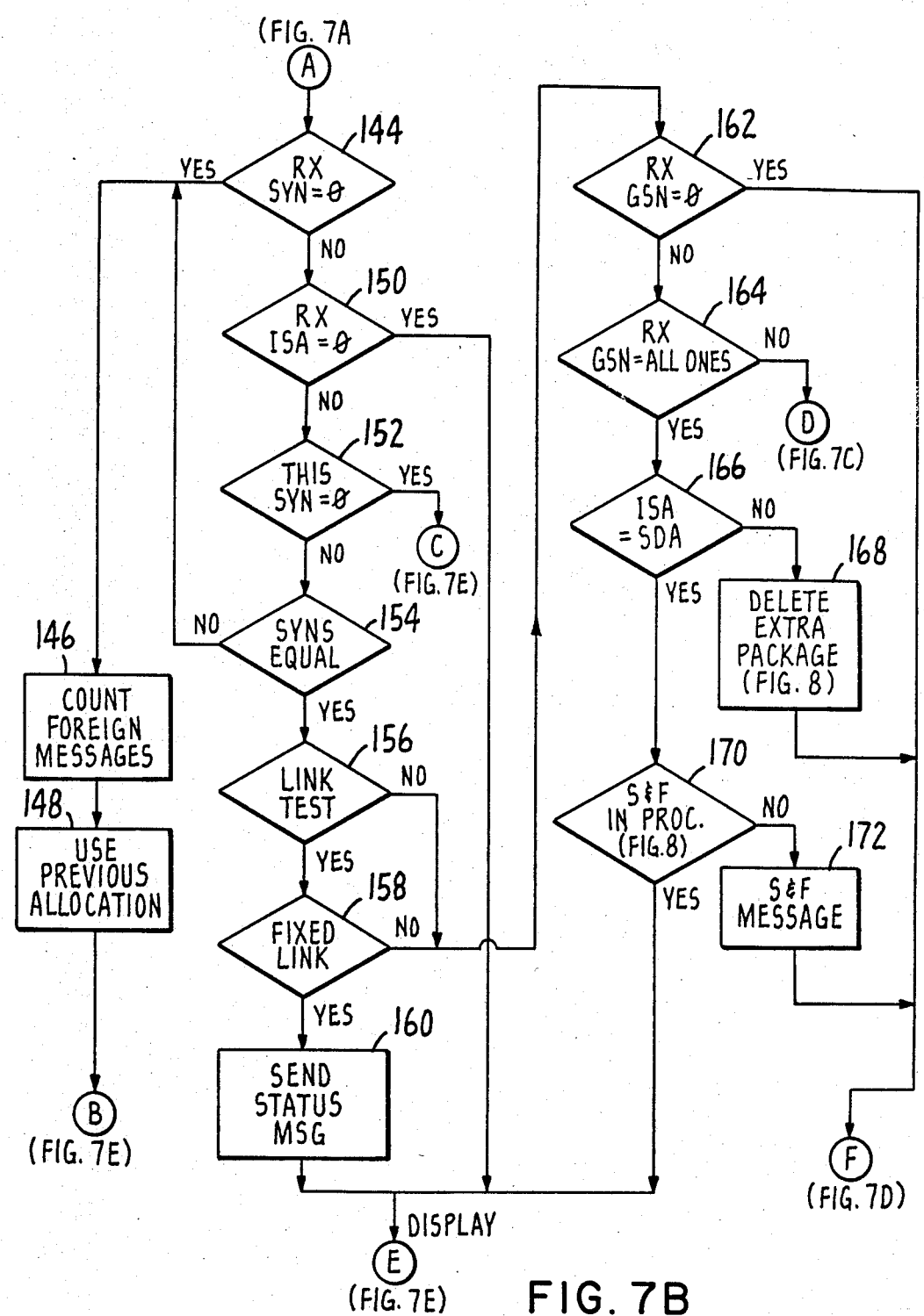

As represented by element 144 of FIG. 7B, a determination is first made as to whether the SYN in the received message is all zeros. A SYN of all zeros is an indication that the remote unit which transmitted the message is inoperative. Such messages are treated as foreign messages. As represented by block 146, a foreign message counter, used for diagnostic purposes, is incremented.

It is possible that a foreign message may collide with local messages. As will be subsequently described, all received messages, including foreign and local, will be processed for controlling a transmit hold delay timer which may prevent the receiving unit from transmitting on the network. If the received message is a foreign message the channel will not be allocated to a foreign unit transmitting a foreign message even though a hold delay may be set, as indicated by block 148. As previously noted, the channel is allocated to a remote unit initiating a message sequence so as to prevent other remote units from transmitting messages which are likely to cause a collision. The sequence will then proceed to the FIG. 7E flowchart, at which time the transmit hold delay timer will be updated, as required.

Assuming that the received SYN is non-zero, the Intermediate Source Address ISA of the received message is examined. As previously described, the ISA is the address of the remote unit which transmitted the received message. Such unit may or may not be the unit which initiated the message sequence Remote units which transmit messages with an ISA of all zeroes are not operating properly. As represented by element 150, if the received ISA is all zeroes, the sequence will proceed to flowchart of FIG. 7E. The message will be discarded and the display associated with the system will be udpated to reflect receipt of a message from an inoperative remote unit.

If the ISA is non-zero, the SYN associated with the subject remote unit will then be examined, as indicated by element 152. A SYN of all zeroes indicates that the subject remote unit has not yet been programmed. In that event, the unit will refrain from further processing of the received message, with the exception of updating the Good List GOODLST. As previously described, the GOODLST is utilized in selecting preferred down link addresses and will subsequently be described in greater detail in connection with the FIG. 7E flowchart.

If the subject remote unit has been programmed, the local SYN will be non-zero As indicated by element 154, the received SYN is compared with the local SYN to determine whether the message is a foreign message. If the message is foreign, the message is treated in the same manner as if the received SYN were all zeros. The foreign message counter is incremented (block 146), the channel allocation remains unchanged (block 148) and the transmit hold delay timer is updated (FIG. 7E), if required Assuming that the SYNs match, the message type is examined to determine whether the message is what is termed a link test message. This message, which is neither an up link or down link message, serves to test a fixed link 22 (FIG. 1) in the system. If a remote unit is connected to a fixed link, the unit should periodically receive a message over the link if the network is functioning normally. If such a message is not received within a predetermined time period, the remote unit will transmit a link test message requesting a remote unit coupled to the fixed link to transmit a responding message. All remote units coupled to a fixed link are implemented to respond to link test messages provided the message is received over a fixed length, regardless of the IDA of the message. Accordingly, the address of the unit coupled to the link need not be known by the transmitting unit.

If a responding message is not received over the fixed link by the unit transmitting the link test message, it is assumed that the link, or the receiver section connected to the link, has failed.

As represented by element 156, the message type is examined to determine whether the received message is a link test message. If the message is a link test message, a determination is then made as to whether the message was received over a fixed link, as represented by element 158. This determination is made by examining the previously-noted internal fixed link flag which is set when a message is received over the link, as opposed to the power line If the message was not received over the link, it is assumed that the message was transmitted to test another link in the system and is ignored.

If the message was received over the fixed link, a job will be queued for the unit to transmit a responding message over both the fixed link and the power line, as represented by block 160. The particular type of responding message is not critical since the purpose of the message is to enable the remote unit transmitting the link test message to ascertain whether it is capable of receiving any message over the fixed link. Once the job has been queued, the display will be updated, as will be subsequently described in connection with the FIG. 22 flowchart. The executive program will cause the job to be executed based upon the job priority. Link test messages are transmitted to test a link connected to the transmitting remote unit; therefore, such messages do not cause a store and forward operation.

If the received message is not a link test message, the message will be processed further. The data package in the message will typically be stored and forwarded, as will be subsequently described.

The next step involves a Global Sequence Number GSN processing sequence. As set forth in Table 2A, each Global Sequence Command GSC issued by the master unit has an associated GSN. The GSN is utilized to ensure that all remote units intended to receive command information in a GSC will actually receive the information.

Each message transmitted by a remote unit includes a local GSN which reflects the latest GSN present in messages received by the unit. If a remote unit receives a further message containing a GSN which is greater than the local GSN, a job will be queued to notify the master unit of the last Global Sequence Command. The local GSN of the remote unit will then be updated, even though the unit may not yet have received any missing commands. A separate value, an Actual Command Received ACR value, is stored to maintain a record of the commands actually received by the subject remote unit, as set forth in Table 2B. It is also possible that the received message itself comprises the missing command information, thereby eliminating any requirement to request a command Referring back to the FIG. 7B flow diagram, the GSN of the received message is examined as represented by element 162. If the GSN is all zeros, further Global Sequence processing will not be performed and the received message will be processed as a conventional message, as will be subsequently described in connection with the flowchart of FIG. 7D.

If a remote unit has determined that it is not capable of receiving messages, the unit will commence transmitting messages, referred to as deaf node messages, containing an associated data package which has the master unit as the final destination. Steps will be taken to ensure that only one remote unit will come to the assistance of the deaf node by initiating a down link message sequence whereby a data package associated with the deaf node is transferred to the master unit. Ther messages of the message sequence contain a SN provided by the deaf node rather than by the sequence-initiating remote unit. Once a first store and forward operation has been completed, any subsequent store and forward operations will be carried out in the same manner as a conventional message.

Deaf node messages are identified by examining the GSN contained in the message, with a GSN of all ones indicating that the message contains a data package associated with a deaf remote unit. As indicated by element 164, a determination is made as to whether the message is a deaf node message. If the message is a deaf node message, a determination will then be made as to whether the subject remote unit should initiate a down link message sequence. If the GSN is not all ones, the GSN will be examined further, as will be described in connection with the flowchart of FIG. 7C.

The Intermediate Destination Address IDA of messages transmitted by a deaf remote unit are ignored. This is because the transmitting unit is not capable of receiving messages and is, therefore, not capable of selecting preferred down link addresses utilizing a GOODLST. Accordingly, any remote unit receiving a message transmitted by a deaf node may initiate a message sequence independent of any IDA which may be present in the message.

As represented by element 166, a determination is made as to whether the unit transmitting the deaf node message is the deaf node. This is done by comparing the Intermediate Source Address ISA with the Source/Destination Address SDA of the received message. As set forth in Table 2B, the ISA is the address of unit transmitting the message. The SDA is the address of the unit associated with the data package in the message.

If the two addresses do not match, another remote unit has already come to the assistance of the deaf node by initiating a down link message sequence. Accordingly, it will not be necessary for the subject remote unit to initiate a further down link message sequence, although the subject unit may be required to store and forward the data package contained in the deaf node message as it would for any conventional down link message directed to the subject unit.

If the subject remote unit had also previously received an identical deaf node message transmitted by the deaf node, and has not yet initiated a down link message sequence, the duplicate message for initiating the sequence will be deleted, as indicated by block 168. As will be further described in connection with the flowchart at FIG. 8, the extra message is identified by examining the SDA and SN of any message present in either store and forward buffer. The message will be processed further, as will be described in connection with FIG. 7D flowchart. If the message is directed to the subject node, as determined by the message IDA, the data package in the message will eventually be stored and forwarded in the conventional manner.

If the ISA and SDA do match, the deaf node message was transmitted by a deaf node and the subject remote unit will store and forward the data package in the message, under certain circumstances, by initiating a down link message sequence. As represented by element 170, the data package will not be stored and forwarded if a store and forward sequence for the same deaf node message is already in process. This may occur in the event the deaf node had transmitted another deaf node message at an earlier time and the subject remote unit had undertaken to initiate a down link sequence. The sequence for checking to determine whether a down link message sequence for the deaf node message is being initiated will be described in connection with the FIG. 8 flowchart. As will be subsequently described in connection with the FIG. 7E flowchart, the display will be updated, indicating that the received data package will not be stored and forwarded.

If a store and forward sequence of the deaf node data package is not already in process, a job will be queued for storing and forwarding the deaf node data package by initiating a down link sequence, as represented by block 172. The GSN of the messages in the down link sequence will remain all ones to indicate that the message contains a data package originated by a deaf node. Once the job has been queued, the received message will be processed further, as will be described in connection with the flowchart of FIG. 7D.

A deaf node sequence is entered when a deaf node message is received to determine whether there is already a down link message sequence about to be initiated by the subject remote unit (element 170) and for deleting any duplicate data package in the event another remote unit has already initiated a down link message sequence to assist the deaf node (block 168). Entry into the sequence is represented by element 314 of the FIG. 8 flowchart. As indicated by block 316, the first step of the sequence is to examine the contents of the Store and Forward (S&F) Buffer A 82 (FIG. 5).

Figure 9:
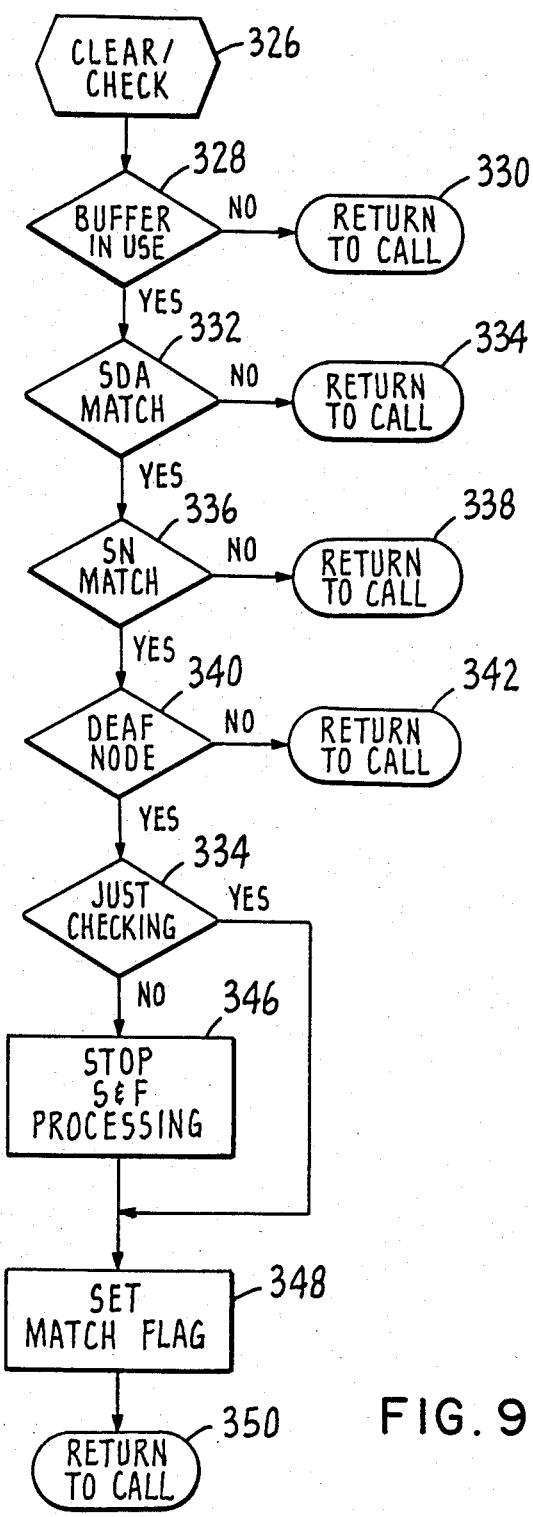
FIG. 9 is a flowchart for a subroutine for checking/clearing store and forward buffers.

A check/clear subroutine, depicted in the flowchart of FIG. 9, is then called, as represented by element 318. Entry into this routine is represented by element 326. If the buffer under consideration does not contain a message, the sequence returns to the calling program of FIG. 8, as indicated by elements 328 and 330, respectively.

Assuming that the store and forward buffer does contain a message, a comparison is made between the SDA of the message in the operate buffer 74 (FIG. 5) and the SDA of the message found in the store and forward buffer under consideration. If there is no match, the sequence will return to the calling program, as represented by elements 332 and 334, respectively.

Assuming that the addresses match, a determination is then made as to whether there is a Sequence Number SN match, as indicated by element 336. As previously noted, the SN uniquely identifies the data package in a down link message sequence and responding up link sequence so that remote units can identify the reply up link message. If there is no match, the data package in the store and forward buffer is not a duplicate of the data package present in the operate buffer. Accordingly, the sequence will return to the calling program, as shown by element 338.

If there is a SN match, the data package is a duplicate. The GSNs of the messages are again examined to reconfirm that the messages are deaf node messages, as indicated by element 340. If the messages are not from a deaf node, an anomaly has occurred and the sequence returns to the calling progam, as represented by element 342.

Assuming that the messages are deaf node messaoes, a determination is then made as to whether the subroutine was entered for the purpose of both checking and clearing the store and forward buffers or just checking, as indicated by element 344. If the subroutine was entered only to determine whether the subject remote unit has already commenced a down link message sequence to assist the deaf node (FIG. 7B, element 170), then the store and forward buffers will be checked only. If the subroutine was entered to delete a duplicate data package (FIG. 7B, block 168), the store and foreward buffers are both checked and cleared.

Assuming that the store and forward buffers are only to be checked, a flag indicating a match between the operate and store and forward buffers is set, as indicated by block 348. If the extra data package is also to be deleted, the store and forward buffer is cleared, as represented by block 346, followed by the setting of the match flag. The sequence then returns to the calling program depicted in FIG. 8.

Once the S&F Buffer A has been checked and cleared, as required, S&F Buffer B is examined, as represented by block 320. The check/clear subroutine of FIG. 9 is then called, as represented by element 322. The sequence conducted in connection with Buffer A is then repeated for Buffer B. Once the subroutine is completed, the sequence returns to the program depicted in the FIG. 7B flowchart, as represented by element 324 of FIG. 8.

The SDA indicates the final destination for up link data packages. In the event the up link message sequence is in response to receipt of a down link deaf message, the address of the deaf node will be the SDA of the up link messages even though the deaf node will not be able to receive the final message transmitted by the down link sequence initiating remote unit. However, such final message is useful for permitting other remote units receiving the message to update their respective GOODLSTs.

Figure 7C:
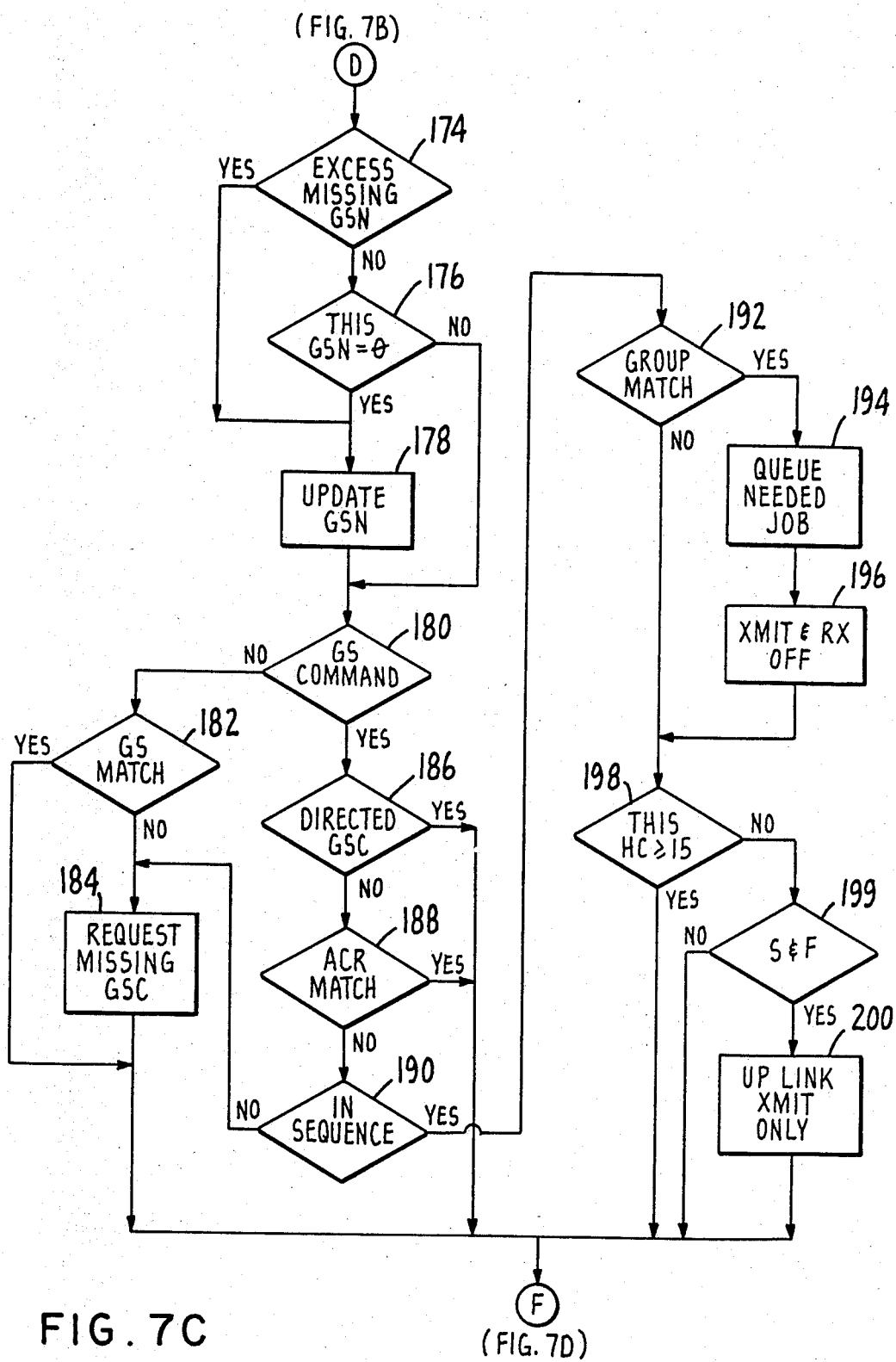

If the GSN in the received message is not all ones (FIG. 7B, element 164), the message is not a deaf node message. Referring now to FIG. 7C, the GSN of the received message is processed further. The GSN of the received message is compared with the local GSN of the subject remote unit.

If the GSN of the received message is less than the local GSN, the transmitting unit has been informed of fewer commands than the subject unit. No action is taken by the receiving remote unit. If the local GSN is less than the received GSN, it is possible that the subject unit has missed one or more commands. It is also possible that the received message constitutes one of the missing commands. As represented by element 174 of FIG. 7C, if a large number of transmitted commands have not been received by the subject unit, no attempt is made to obtain the missing commands. In the present embodiment, no action will be taken if there are over one hundred twenty-eight command numbers missing. The GSN of the subject unit will now be updated to the value of the received GSN, as represented by block 178.

If the number of missing commands, if any, is less than the maximum value, a determination is made as to whether the local value of GSN is all zeros, as indicated by element 176. An all zero local GSN indicates that the subject unit just started operation. In that event, no attempt will be made to obtain the missing commands and the present value of GSN will be updated.

Assuming that the present value of GSN is greater than zero, or after the local value of GSN has been updated, the message type of the received message is examined to determine whether the message is a Global Sequence Command GSC, as indicated by element 180.

If the message is not a GSC, the ACR (Table 2B) and received GSN value are compared, as shown by element 182. If the ACR value is less than that of the received GSN value, a job will be queued for the subject unit to initiate a down link message sequence to notify the master unit of the last command received by the unit, as represented by block 184. The master unit will then respond to the final message of the sequence, with the response being a function of the particular command(s) missed. If, for example, it is too late for the remote unit to properly act upon the command, an up link message sequence will be initiated by the master unit for the purpose of only updating the Actual Command Received ACR value of the remote unit. If the remote unit should act upon the command(s), the missing commands will be forwarded to the remote unit. The message, which is not a command (element 180), will then be processed further, as will be described in connection with the flowchart of FIG. 7D.

Assuming that the received message is a GSC (element 180), a determination will be made as to which type of command has been received. The command type is determined by examining the three data flags of the command. In the present embodiment, there are four basic types of commands, although other types of commands could also be used. The four commands include two flood and two non-flood commands. The flood commands include total flood commands which contain command information which is stored and forwarded in the up link direction by every remote unit receiving the command and where the receiving unit also has a valid up link address present in the associated Link List or is coupled to a fixed link. The IDA of total flood commands is all zeros, with every remote unit receiving the command also acting upon the command.

The second flood command is a fixed link flood command. This command has an IDA of all zeros and contains command information which is stored and forwarded if the receiving remote unit is connected to a fixed link. All remote units receiving a fixed link flood command act upon the command.

The two non-flood commands include directed commands. Directed commands contain command information which is stored and forwarded in the same manner as a data package in ordinary up link messages and have a non-zero IDA. Only the remote unit having an address which matches the SDA of the command message will act upon the command information.

The second non-flood command is referred to as a store and forward only command. The command has a non-zero IDA and the command information is stored and forwarded in the same manner as a conventional message. Unlike a directed command, all remote units which receive a store and forward only command act upon the command information if appropriate. For example, a directed command may be transmitted in response to a data package sent by a remote unit for the purpose of informing the master of the ACR value of the remote unit. The ACR value informs the master unit of the last Global Sequence Command GSC received by the remote unit, as previously described. If one or more GSCs have been missed and it is still appropriate for the remote unit to act upon the commands, the master may reply to the remote unit with one or more directed GSCs having an SDA of the remote unit and IDA equal to the ISA of the remote unit which transmitted the data package to the master. The SDA and IDA of other non-flood GSCs are selected in a similar manner.

As indicated by element 186, if the command is a directed command, the message will be processed further as will be described in connection with FIG. 7D. The command will eventually be acted upon, as will subsequently be described.

If the command is not a directed GSC, but rather is either one of the two types of flood commands or is a store and forward command, a determination is made as to whether the ACR value of the subject unit and the received GSN match, as represented by element 188. Matching GSN and ACR values is an indication that the received GSC was received earlier. However, the command will not be stored and forwarded or acted upon since the command was previously received. In that event, the message will be processed further, as will be described in connection with FIG. 7D.

Assuming that there is no match between the ACR value and received GSN, a determination is then made as to whether the received command is in the proper sequence, as shown by element 190. By way of example, if the GSN of the received message is eioht and the ACR value is six, the subject unit has not received the GSC associated with the GSN of seven. The present command should not be acted upon until the missing command has been received and acted upon since the order in which the commands are processed may be critical. In that event, the sequence will proceed to block 184, and a job will be queued to transmit a down link message informing the master unit of the last command received in the proper sequence. As previously described, the master unit may provide the missing commands in the proper sequence if appropriate, or simply update the remote unit with the most recent ACR value. The sequence will then proceed to the FIG. 7D flowchart, as will be subsequently described.

If the received GSC is in sequence, a determination is then made as to whether the subject remote unit falls within the group of units intended to act upon the command information, as shown by element 192. In the event the subject unit falls within the group, a job will be queued to act upon the command, as represented by block 194. The transmitter and receiver section of the subject unit will then be disabled, as shown by block 190 so that the message in the operate buffer will be preserved.

It had previously been determined that the received command was one of the three types of commands other than a directed command (element 186). In that event, the received command information will be stored and forwarded by the subject remote unit in the up link direction, if appropriate. By way of example, if the command is a flood command and the subject remote unit has a valid up link address present in the LNKLST, the command information will eventually be stored and forwarded. This procedure ensures that remote units intended to act upon the command information, but not capable of communicating directly with the master unit, will receive the command information.

In order to minimize the number of transmissions on the network, the remote units are implemented to refrain from transmitting messages in the up link direction if the Hop Count HC of the unit is equal to or greater than the maximum value for the system. In the present embodiment, the maximum value is fifteen. The transmitted value of HC in this instance is determined by adding one to the value of HC in the received message. If the new value of HC is equal to or exceeds the maximum value, the command will not be stored and forwarded, as represented by element 198. The message will then be further processed, as will be described in connection with FIG. 7D.

In the event the new value of HC is less than the maximum value, a determination is made, based upon the type of command, whether the message information is to be stored and forwarded, as indicated by element 199. This is determined by examining the three data flags of the command, as previously described.

As represented by block 200, if the data package is to be stored and forwarded, a job will be queued to transmit a message in the up link direction, as will be subsequently described.

Once the Global Sequence processing depicted in the FIG. 7C flowchart has been completed, the command message is processed further, as will be described in connection with the flowchart of FIG. 7D. Such further message processing will also take place for most other messages, as previously described in connection with the flowchart of FIG. 7B.

Figure 7D:
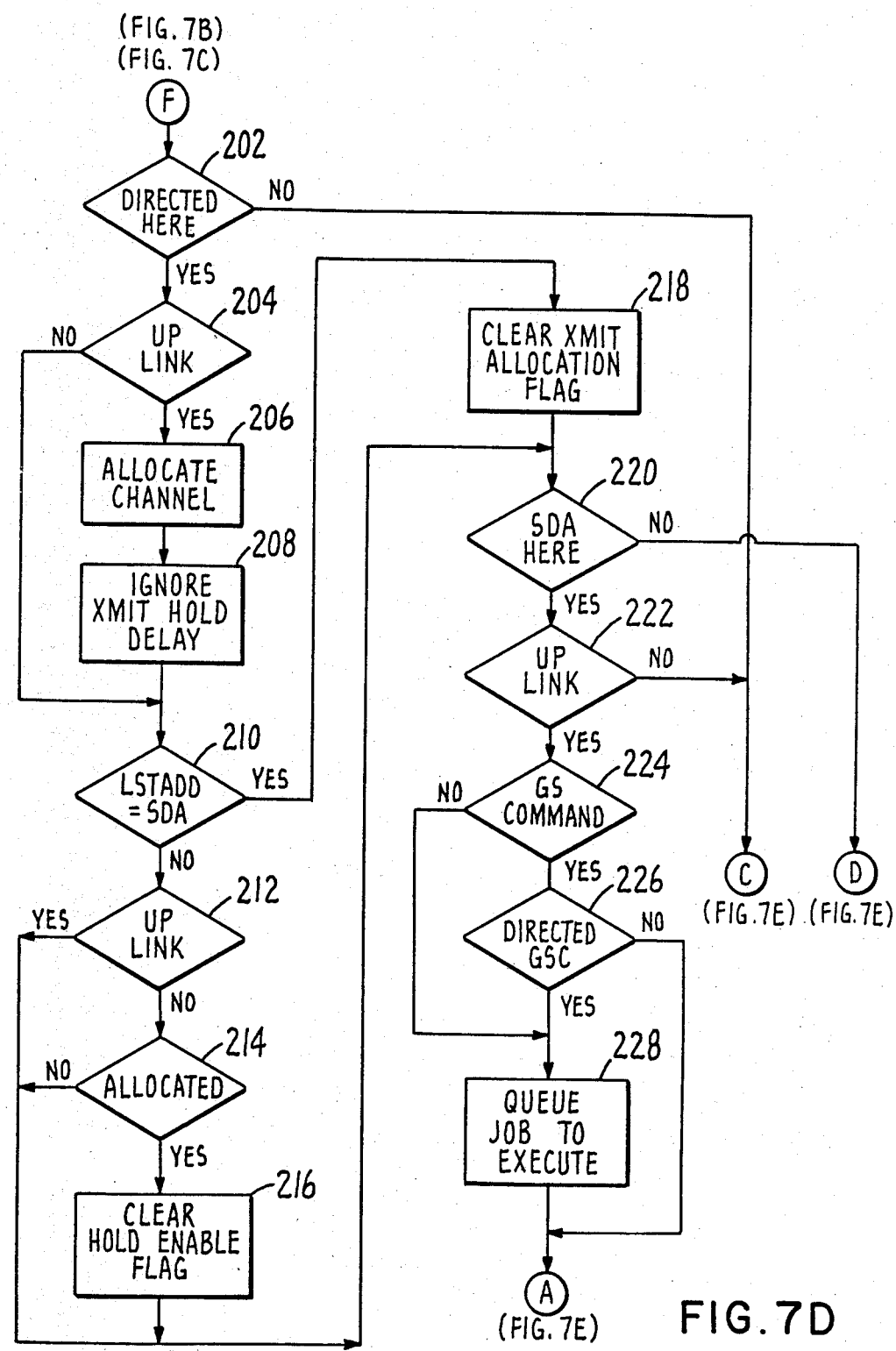

As shown by element 202 of FIG. 7D, a determination is first made as to whether the message is directed to the subject remote unit. This determination is made by examining the Intermediate Destination Address IDA of the received message. If the message is not directed to the subject unit, the message will not be acted upon further except for the purpose of updating the Good List GOODLST. As previously noted, the GOODLST is utilized in selecting optimum down link address, and will be described in connection with the FIG. 7E flowchart.

Assuming that the message is directed to the subject remote unit, a determination will then be made as to whether the message information should be stored and forwarded in the up link direction. This will occur only if the message is an up link message and the subject remote unit is not the final destination of the message information, as is determined by the Source/Destination Address SDA of the message.

As previously described, each remote unit is provided with a transmit hold delay timer which is used to reduce message collisions on the network. The hold delay timer is set in response to receipt of a message, with the duration of the hold delay being determined by the message type, as set forth in Table 3, above. The Source/Destination Address SDA of the last message to which the communication channel was allocated is referred to as the Last Address LSTADD, as described in Table 2B.

The LSTADD is used to identify the remote unit to which the channel has been allocated and which may include either the SDA of the remote unit which originated the data package in the message sequence or the remote unit to which the data package is the final destination. If the channel has not been allocated to the message SDA, the hold delay will prevent the message from being stored and forwarded, thereby avoiding collisions with allocated messages, i.e., messages containing an SDA which matches the LSTADD. The hold delay will be ignored for allocated messages.

As represented by element 204, a determination will be made as to whether the message is an up link message. Assuming that the message is an up link message, the channel will be allocated to the remote unit which is the final destination of the message information. Thus, the Last Address LSTADD is set equal to the SDA of the message, thereby allocating the channel to messages containing such SDA. As previously noted, the present message is most likely an up link reply message. In that event, the channel would have been already allocated to the SDA during the down link message sequence of the virtual link.

Once the channel has been allocated, the transmit hold delay is ignored, as represented by block 208. Thus, if the received data package is to be stored and forwarded and the channel allocated to the remote unit identified by the SDA, the hold delay will not prevent the transmission.

If the message is not an up link message, a determination is again made as to whether the channel has been allocated to the remote unit identified by the SDA. As represented by element 210, this is determined by comparing the SDA of the message with the LSTADD. If the channel had been allocated to the remote unit identified by the SDA of the received message, a transmit allocate flag is cleared, as indicated by block 218. As will be subsequently described, the transmit allocate flag will be set when an allocated message is transmitted and will be cleared when an allocated message is received. The flag is only utilized by a remote unit preparing to initiate a message sequence which contains a data package originating with the remote unit. If a previous message sequence had been initiated and an expected reply message not yet received, the transmit allocate flag will be set. The sequence initiating remote unit will not transmit further messages until the expected reply message is received with such message clearing the flag or until the hold delay has expired. Thus, the sequence initiating unit will not transmit a message, even though the channel is allocated to it, which is likely to collide with a message of an earlier down link message sequence or reply message.

A hold enable flag will have been unconditionally set when a message is received. When this flag is set, it is possible to update the hold delay timer associated with the remote unit. The hold enable flag will be cleared in the event the channel is not allocated to the remote unit identified by the SDA of the message and the message is not an up link message. If the channel is not allocated to the remote unit identified by the SDA in the message (element 210), a determination is made as to whether the message is an up link message, as indicated by element 212. If the message is not up link, a determination will be made as to whether the hold flag has been set, as indicated by element 214. As previously noted, the hold flag will have been previously set unless an anomaly has occurred. Next, the hold flag is cleared, as represented by block 216.

A determination will then be made as to whether the subject remote unit is the final destination of the data package contained in the message. As indicated by element 220, if the SDA of the received message does not match the address of the subject node, another node is the final destination. The data package will be stored and forwarded either in the up or down link direction, as will be described in connection with FIG. 7E.

Assuming that the subject remote unit is the final destination, the message should be an up link message. If the message is not an up link message, as determined by element 222, an anomaly has occurred. The data package will not be stored and forwarded, but the message will be used to update the Good List GOODLST, as will be described in connection with FIG. 7E.

If the message is up link, a determination will be made as to whether the message is a Global Sequence Command GSC by examining the message type, as indicated by element 224. If the message is a GSC, a determination is made as to whether the command is a directed GSC by examining the three data flags. If the command was one of the three types of non-directed commands, the job would have been previously queued to act upon the command information, if appropriate (FIG. 7C, block 194). If the command is a directed command, it had been previously established that the subject remote unit is the final destination of the command (element 220). Accordingly, a job will be queued to act upon the directed command, as represented by block 224.

If the subject remote unit is the final destination of the data package, but is not a GSC, the message will also be acted upon at this time. Such a message may have been initiated by the master in response to an earlier data package issued by the subject remote unit advising the remote unit of the latest Global Sequence Number.

Once the job has been queued, a sequence will be entered for the purpose of examining the Sequence Number SN of the received message, as will be described in connection with the FIG. 7E flowchart.

Messages from a remote unit initiating a down link message sequence are typically of the type which cause a reply message to be transmitted by the master unit. If the reply message is not received within a predetermined time period, the initiating unit will initiate another sequence. As previously noted, each sequence initiated by a remote unit includes a Sequence Number SN which, together with the SDA, is utilized to identify an expected reply message. In the event the sequence was initiated in response to receipt of a deaf node message transmitted by a deaf node, no attempt will be made by the initiating remote to initiate another sequence. As previously noted message sequences initiated in response to receipt of messages transmitted by deaf nodes contain the SDA, SN and data package of the deaf node.

At the present stage of message processing, a determination has been previously made that the message is an up link message (element 222) and the subject remote unit is the final destination of the message information (element 220). Referring now to the FIG. 7E flowchart, a determination will then be made as to whether the message is a reply to a message having an SDA which corresponds to the subject unit. If the SDA matches a reply, an associated retry timer will be cleared so that no attempt will be made to initiate a further message sequence.

Assuming that there is an SDA match and the message is up link, each of the five transmit originate buffers 86,88,90,92 and 94 (FIG. 5) is then examined, as indicated by block 230. As indicated by element 234, each originate buffer is examined until a Sequence Number SN is found which matches the SN of the received message. If an SN match is found the SN in the buffer is cleared along with the associated retry timer, as represented by block 238.

In most cases, a SN match will eventually be found. However, in some instances, there will not be a match. By way of example, it is possible that two or more reply messages will be produced in response to a single down link message sequence. In that event, a match will not be found for the second reply, because the originate buffer will have been previously cleared by the first reply message.

As previously noted, once a channel has been allocated to a particular remote unit address, message throughput is maximized if data packages present in the unit are transmitted during a single allocation period by the initiation of successive down link message sequences. If a plurality of data packages are present in the five originate buffers, all of the message sequences except one will contain a set Message Following Flag MFF, as defined in Table 2A. The message sequences with a set MFF will cause the master to reply with a message also containing a set MFF. As represented by element 240, if the received message contains a set MFF, usually at least one additional data package awaits transmission. As shown by block 242, a job will be queued to transmit the next data package present in the originate buffer. All data packages in the originate buffer will be transmitted until the final data package is transmitted, with the final message sequence having a cleared MFF.

Once the job has been queued to transmit the next message containing the next pending data package (block 242), or in the event MFF is not set (element 240), a job will then be queued to update the Good List GOODLST, as shown by block 246. Similarly, a GOODLST update job will be queued at this point in the sequence for other messages containing data packages which require store and forward operations, as represented by block 248. Such messages include messages not directed to the subject remote unit (FIG. 7D, element 202), anomalous down link messages having the subject unit as a final destination (FIG. 7D, element 222) and messages received when the System Number SYN for the subject remote unit is all zeros (FIG. 7B, element 152). The sequence for updating the Good List GOODLST will be subsequently described.

Figure 7E:
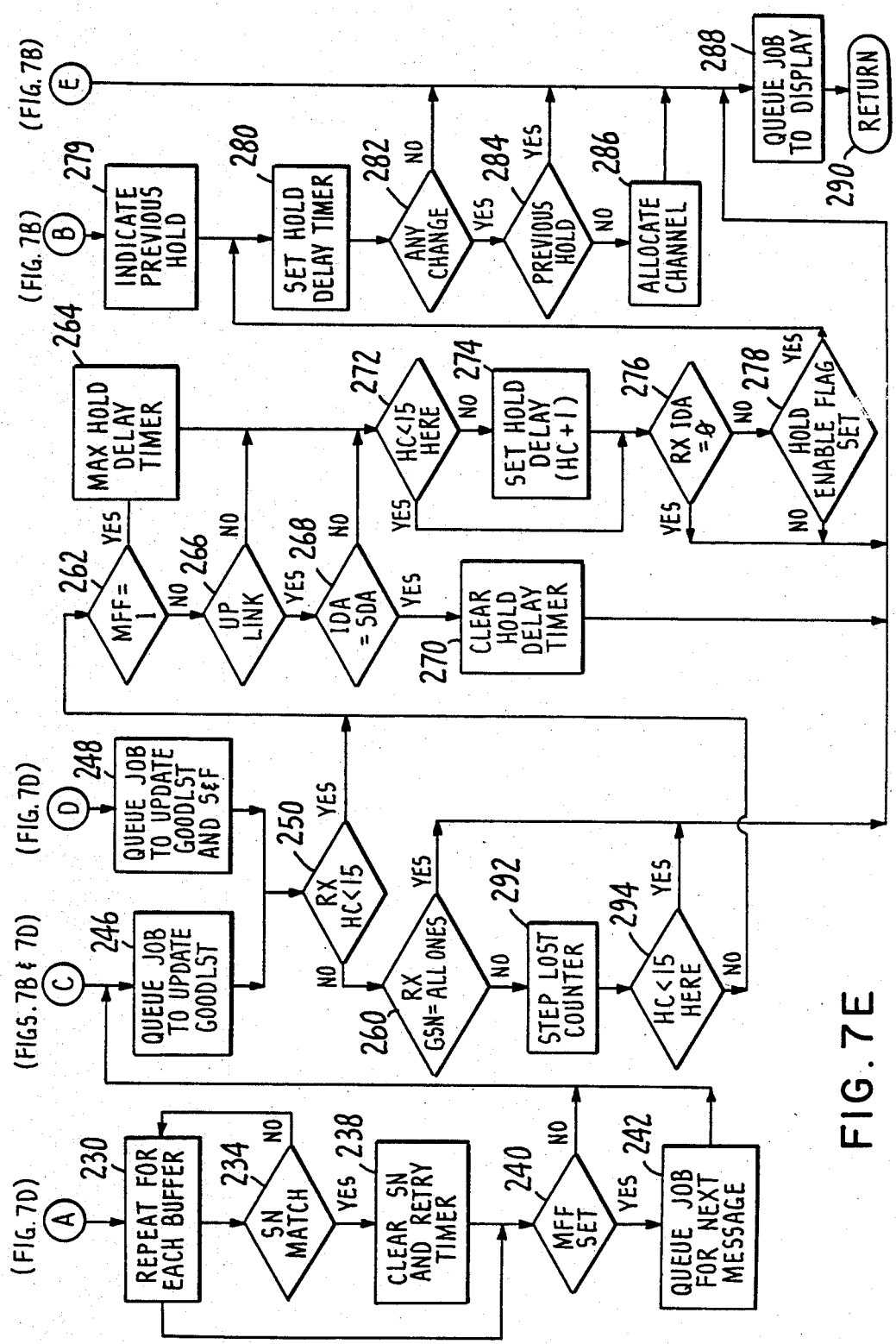
Figure 8:
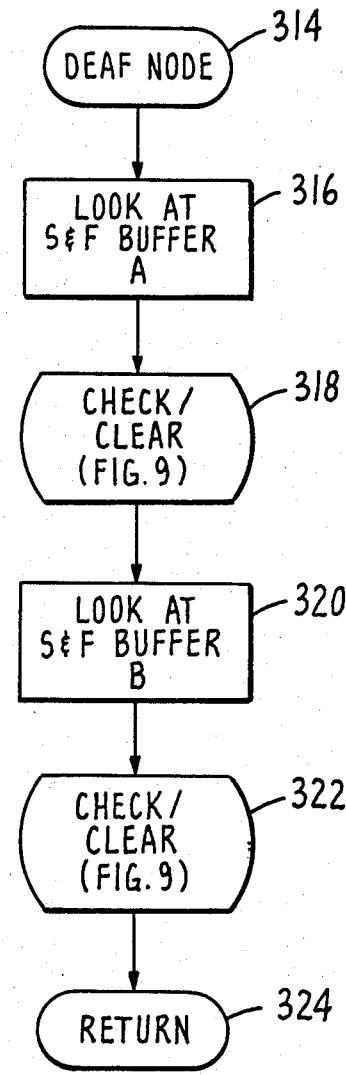
FIG. 8 is a flowchart for a sequence called by the executive program (FIG. 6) for determining whether a received message was transmitted by a communication unit, sometimes referred to as deaf node, which is incapable of receiving messages.

Messages containing data packages to be stored and forwarded include messages which are both directed to the subject remote unit, as determined by the IDA (FIG. 7E, element 202), and which do not have the subject unit as the final destination for the data packages, as determined by the message SDA (FIG. 7E, element 220). As represented by block 248, a job is queued to store and forward such data package in either the up link or down link direction, as required. In addition, a job will be queued to update the Good List GOODLST. Both jobs will be subsequently described.

Once the job to update the Good List GOODLST has been queued, the transmit hold delay timer is adjusted, if required. The duration of the hold delay timer may be modified for the purpose of assisting in the transmission of messages having a Hop Count HC which equals the maximum value, with such messages being referred to as lost messages As indicated by element 250, a determination is first made as to whether the received message is a lost message. Messages from lost remote units will normally not cause the receiving unit to set a transmit hold delay. A lost remote unit is defined by a unit which transmits messages having a Hop Count HC equal to the maximum value, which, in the present embodiment, is 15. By refraining from setting a hold delay, the subject unit will not delay in the transmission of its own message. Such a message is likely to provide valuable information to the lost node, namely a useable down link address.

If the message is lost, but the subject remote unit is also lost, the subject unit will act upon any transmit hold delay and refrain from transmitting, provided the lost message is not a deaf node message. In doing so, the lost node transmitting the message will have an opportunity to attempt to communicate with the master. If successful, the node transmitting the message will be in a position to provide assistance to the subject remote unit.

The foregoing can be further illustrated by reference to FIG. 7E. As indicated by element 250, a determination is made as to whether the received message was transmitted by a lost node. If the received HC is less than 15, the transmitting node is not lost and the hold delay sequence is carried out in the normal manner.

If the value of the received HC is not less than 15, the transmitting node is lost. A determination will then be made as to whether the received message is a deaf node message. As indicated by element 260, this is determined by verifying that the GSN of the received message is not all ones. If the lost message is also a deaf node message, the transmit hold delay information in the message is ignored. A job will be queued to update the display, as represented by block 288. The initial message processing will then be completed and the sequence will return to the calling program, as represented by element 290.

If the lost message was not a deaf node message, a lost message counter is incremented, as represented by block 292. It is likely that a transmission of any message by the subject unit will provide useful information to surrounding lost nodes. If the information of the received message is not to be stored and forwarded, and the lost message counter is nonzero, a message will be transmitted to assist lost nodes, as will be subsequently described.

Once the lost counter has been incremented, a determination is made as to whether the subject remote unit is also lost, as represented by element 294. If the Hop Count HC of the subject unit is not less than the maximum value of fifteen, the subject unit is lost and is not in a position to provide assistance to the transmitting unit. Accordingly, the subject unit will act upon the hold delay instruction in the message and refrain from transmitting. If the transmitting unit is not lost, the message will be used by the subject unit in establishing a path to the master. If the subject unit is not lost, the hold delay information is issued and the display is updated (block 288).

If the hold delay information in the message is to be acted upon, the Message Following Flag MFF of the message is examined, as shown by element 262. If the flag is set, the Hop Count HC value is set to a maximum value of 15. In addition, the message type of the message is forced to be the type which requests a variable transmit hold delay (Table 4) in accordance with the following equation:

$$\text{Hold Delay} = (HC * 2) \text{ Message Times} \quad (4)$$

Thus, if the received message contains a set MFF, the subject until will refrain from transmitting for a long duration, thereby avoiding a collision with the message which will follow the present message. As will be subsequently explained, the value of HC in equation (4) may be modified in certain circumstances. If the MFF is not set (element 262), a determination is made as to whether the message is an up link message, as represented by element 266. If the message is an up link message, a determination is then made as to whether the message is terminating. This is determined by comparing the IDA with the SDA of the message, as represented by element 268. If the addresses match, the hold delay timer is cleared, as shown by block 270 since the timer is no longer required. The display is the updated (block 288) and the initial message processing is completed.

If the message is not a terminating up link message, or in the event the MFF of the message is not set, the subject remote unit Hop Count HC is examined, as represented by element 272. If HC equals the maximum of fifteen, the subject remote unit is lost. The subject unit will refrain from transmitting any message a sufficiently long period to enable the remote unit which transmitted the received message to provide assistance. This is achieved by setting the value of HC used to control the delay timer to the received HC value plus one, as represented by block 274. If the received message is of the type which requests a fixed delay, rather than a variable delay, the increased value of HC will have no effect on the hold delay. If the message contains a set MFF, the message will be treated as a variable hold delay message (block 264), regardless of the actual message type.

Once the value of HC for the delay timer has been increased by one if the subject remote unit is lost, a determination is made as to whether the received message is a broadcast message. As represented by element 276, any message containing an IDA of all zeros is referred to as a broadcast message (Table 2B). These messages include both types of flood Global Sequence Commands and the echo up link message transmitted in response to receipt of an echo up link command which will be subsequently described. As represented by element 276, if the message is a broadcast message, any hold delay request in the message, as determined by the message semaphores (Table 4), will be ignored. This prevents broadcast messages, which by definition tend to be transmitted by a large number of remote units, from monopolizing the network. The display will then be updated, thereby ending the initial message processing.

An echo up link command is a message type originated by the master unit and which is typically a reply to a down link message. A remote unit which both initiates a down link message sequence and which receives an echo up link command in reply, will generate an echo up link message. The purpose of the message is to assist surrounding remote units by informing such units that the initiating unit has successfully communicated with the master unit. The IDA of the echo up link message is all zeros.

If the message is not a broadcast message, a determination will then be made as to whether a hold enable flag had been previously set for the received message, as indicated by element 278. If the flag is not set, the hold command in the message will be ignored and the display updated.

If the hold enable flag had been set, the transmit hold delay timer will be set, as represented by block 280. The delay timer will also be set in response to receipt of foreign messages, as previously described in connection with FIG. 7B. As represented by block 279, a flag will have been unconditionally set to indicate that there was a previous hold. The purpose of the flag will be subsequently explained.

The magnitude of the delay will be set to the larger of any present delay or the computed delay as determined by the Hop Count HC (if the message type calls for a variable delay) or the maximum HC value which is used if the MFF is set (block 264), either of which may be increased by one (block 274).

Once the hold delay timer is set, a determination is then made as to whether the new value of the delay timer differs from the original value, as represented by element 282. If there is no change, the display will be updated and the initial message processing will be completed.

If there is a change in hold delay, a determination will be made as to whether the hold delay timer had originally been active, as indicated by element 284. As previously noted, if the received message is a foreign message, the flag indicating that the hold delay timer had been active will have been set block 279). This serves to prevent a channel to be allocated to the foreign message. If the hold delay timer had not been active, the channel will be allocated to the received message, as represented by block 286. This is accomplished by setting the Last Address LSTADD equal to the SDA of the message. Once the allocation has been made, or in the event the timer was previously active, the display is updated thereby ending the initial message processing sequence. If the delay timer had been active, no change in allocation will be made.

As previously noted, with few exceptions, a received message is utilized for the purpose of possibly updating the Good List GOODLST associated with the remote unit (FIG. 7E, blocks 246,248). The Link List LNKLST, which contains up link addresses, will also be updated in the event data package contained in the message is to be stored and forwarded, as will be subsequently described.

Figure 12A:
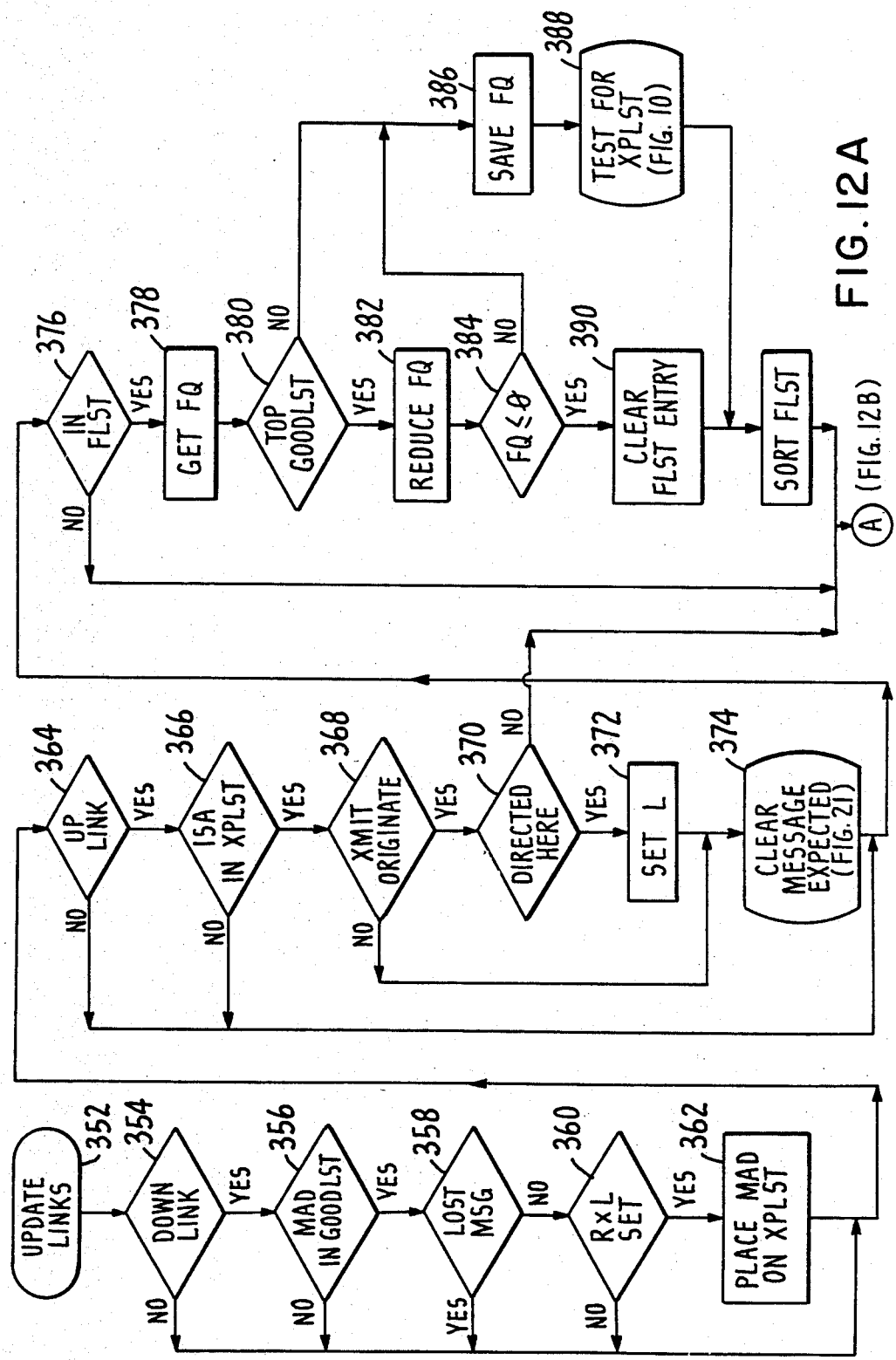
FIG. 12A-12C is a flowchart for a sequence called by the executive program (FIG. 6) for selecting optimum addresses to be used for transmitting messages in either the up link or down link direction.

The initial sequence for updating the GOODLST and LNKLST, sometimes collectively referred to as updating the links, is depicted in the flowchart of FIG. 12A. Entry into the sequence for updating the links is represented by element 352. The first portion of the sequence is devoted to determining whether the master unit should be placed of the Expected List XPLST. As previously noted, the XPLST contains a list of node addresses which are expected to transmit a reply message. The expected message is an up link reply message in response to a down link message. A primary function of the XPLST is to provide information utilized in forming the GOODLST.

The master unit is unique among the network nodes in that, by definition, the master is only capable of transmitting up link messages. Accordingly, the master unit would normally be placed on the XPLST of a remote unit only if the unit which transmitted a message for which a reply is expected transmitted directly to the master unit. Thus, information regarding the ability of a remote unit to successfully transmit directly to the master unit is infrequently obtained. If the master unit address is present on a remote unit GOODLST, the GOODLST is less likely to reflect current network conditions.

The foregoing can be further illustrated by reference to the diagram of FIG. 2. Unit 26d, given present network conditions, communicates with the master unit through intermediate units 26e and 26f. Assume, for example, that at one time remote unit 26d was capable of successfully transmitting messages directly to the master unit 24. It is possible that the master unit address will still be present on the GOODLST of unit 26d even though, because of a change in network conditions, the unit is no longer capable of transmitting directly to or receiving directly from the master unit. Unless special steps are taken to place the master unit address on the XPLST, the address will remain on the GOODLST until unit 26d unsuccessfully attempts to transmit directly to the master unit.

As will be described, the master unit address will be placed on the XPLST for unit 26d whenever the unit receives a down link message for which a reply is expected. If the unit does not receive the reply transmitted by the master, the master unit address will be removed from the GOODLST of unit 26d.

Assume that remote unit 26l has received a down link message from unit 26k for which a reply is expected. Unit 26l will store and forward the message information to unit 26m. If unit 26d is capable of receiving the message transmitted by unit 26l, the address of the unit 26l will be placed on the XPLST for unit 26d. Unit 26l will monitor unit 26l to verify that unit 26l transmits the expected reply message to unit 26k.

In the event that the master unit address is present on the GOODLST of unit 26d, the down link message transmitted by unit 26l will also cause the master unit address to be entered on the XPLST for unit 26d. Thus, unit 26d will also monitor the master unit to verify that it is capable of directly receiving the reply up link message transmitted by the master to unit 26m. If the message is not received by unit 26d, it is assumed that the master unit address is no longer a preferred down link address. Accordingly, the master unit address may be removed from the unit 26d GOODLST, as will be subsequently described.

Returning to FIG. 12A, a determination is first made as to whether the received message is down link, as shown by element 354. If the message is down link, a determination is then made as to whether the master unit address is present in the GOODLST for the subject remote unit, as indicated by element 356. If the address is present, the Hop Count HC of the received message is examined to verify that the message is not a lost message, as represented by element 358. The message is considered lost if HC is equal to the maximum value of fifteen. The master address will not be placed on the XPLST for a lost message, since there is a high probability that any expected reply will not occur.

If the message is not lost, a determination will then be made as to whether the link confirmed flag L present in the message is set, as shown by element 360. As previously described, flag L will be set if the unit transmitting the message was successful in communicating with the master unit the last time an attempt was made. If the flag is not set, the master unit address will not be added to the XPLST, since there is a high probability that any expected reply will not be received. In the event the flag L has been set, the master unit address will be added to the XPLST, provided a reply is expected, as indicated by block 362.

Once the master unit address has been added to the XPLST, if required, a further sequence is entered to determine whether the received message is an expected reply message. If the message is expected, the XPLST will be cleared, as will be described.

Expected reply messages are up link messages. Accordingly, as represented by element 364, a determination will be made as to whether the message is up link, as shown by element 364. If the message is up link, a determination is made as to whether the address of the unit transmitting the message is present in the XPLST. As shown by element 366, this is ascertained by examining the ISA of the message. The XPLST is not cleared if the address is not present.

If the ISA is present on the XPLST, a determination is then made as to whether a transmit originate flag associated with the entry is set, as represented by element 368. A set transmit originate flag indicates that the subject remote unit transmitted the message for which a reply is expected. A cleared flag indicates that the subject unit observed another remote unit transmitting the message for which a reply is expected.

If the originate flag is set, a determination is then made as to whether the received message was directed to the subject remote unit, as represented by element 370. This is performed by examining the IDA of the message. If the message is directed to the subject unit, it has been established that the received message is an up link reply message in response to a down link message transmitted by the subject unit. Accordingly, as represented by block 372, the link confirmed flag L associated with the subject unit is set.

If the received message was not directed to the subject unit, but the message ISA is present in the XPLST with the transmit originate flag cleared, no change will be made to the XPLST. The message will then be further processed for a possible update of the GOODLST, as will be described in connection with FIG. 12B.

Once the link confirmed flag L has been set (block 372), a subroutine is entered for clearing the XPLST, as represented by element 374. The same subroutine is entered in the event the transmitting unit address (ISA) is on the XPLST, but the originate flag was cleared (element 368) The subroutine will be described in connection with the flowchart of FIG. 21.

Figure 21:
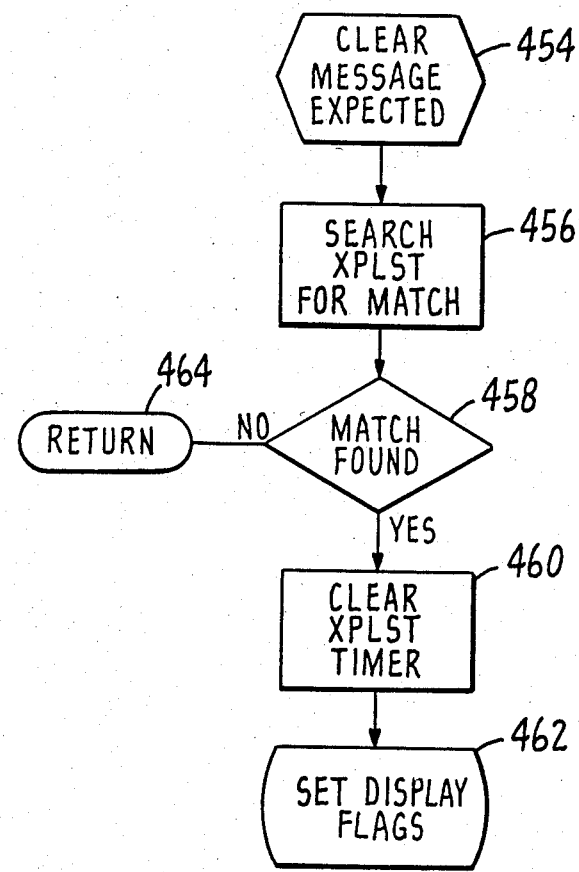
FIG. 21 is a flowchart for a subroutine depicting the manner in which the Expected List is cleared.

Referring now to FIG. 21, entry into the subroutine for clearing the XPLST is represented by element 454. The XPLST is first searched to locate the ISA of the message in the list, as represented by block 456. It was previously determined that the address was present, therefore, an anomaly will occur if a match is not found. As indicated by elements 458 and 464, if a match is not found, the sequence returns to the calling program.

Assuming that an address match is found, the failure timer associated with the entry is cleared, as shown by block 460. As previously described, the purpose of the timer is to control the time period in which an expected reply message should be received. Once the timer has been cleared, a subroutine is entered for setting various display flags for updating the display, as represented by element 462. As previously noted, the display is for diagnostic purposes only.

Referring back to the FIG. 12A flowchart, once the XPLST has been cleared (element 374), if required, the Failure List FLST is examined to determine whether the list should be updated in view of the received message. As previously described, the FLST is a list of node addresses which are pertinent to the subject remote unit to the extent that such addresses were or are presently on the Good List GOODLST of the subject remote unit. Thus, the FLST entries are or were potential down link addresses. The purpose of the FLST is to maintain a record over time of the performance of potential down link addresses which have performed poorly, based upon various criteria to be subsequently described.

Each FLST entry has an associated Failure Quotient FQ which is indicative of the performance of the associated node. The larger the value of FQ, the poorer the performance. In the present embodiment, the unscaled value of FQ may range from 0 to 131.

If a message is received from a remote unit present on the FLST, the value of the associated FQ will be decreased (improved) to reflect that the unit was successful in transmitting a message to the subject unit. As represented by element 376, the FLST is examined to determine whether the ISA of the received message is present. If the address is present, the associated FQ is obtained, as shown by block 378.

The value of FQ will be reduced only if the listed node is also present at the top of the GOODLST, as shown by element 380. A presence at the top of the GOODLST indicates that the node is the preferred down link address for the subject remote unit. In the present embodiment, the unscaled value of FQ is decreased by four, as represented by block 382.

An FLST entry will be deleted from the list if the status of the entry has improved to the extent that the value of FQ is zero or less. As shown by element 384 and block 390, a determination is made as to whether present value of FQ is zero or less, and, if so, the entry is cleared.

If the reduced value of FQ is greater than zero, the entry will remain on the FLST. As represented by block 386, the new value of FQ will be retained. A subroutine will then be entered for the purpose of determining whether the received message should result in an addition to the XPLST, as represented by element 388. The subroutine will be entered for all received messages which happen to be present on the FLST. The subroutine will also be entered at another stage in the sequence for received message ISAs which are also present on the GOODLST for the subject remote units. Messages from nodes which are not present on either list will not be tested for the XPLST, since such nodes are not as pertinent to the subject remote unit.

Once the test for the XPLST is completed (element 388), or in the event the FLST entry is deleted (block 390), the FLST is sorted, as indicated by block 392. The sort is in accordance with the magnitude of the associated FQ for each entry, with the entry having the lowest non-zero value FQ being present at the top of list.

In the event the received message is not on the FLST (element 376) or not directed to the subject remote unit (element 370), the message ISA will be examined to determine whethe it is present on the GOODLST. If the message ISA is present on the GOODLST, a determination will be made as to whether the XPLST should be updated. The sequence, which will be described in connection with the flowchart of FIG. 12B, will also be entered subsequent to the sorting of the FLST (block 392).

Figure 10:
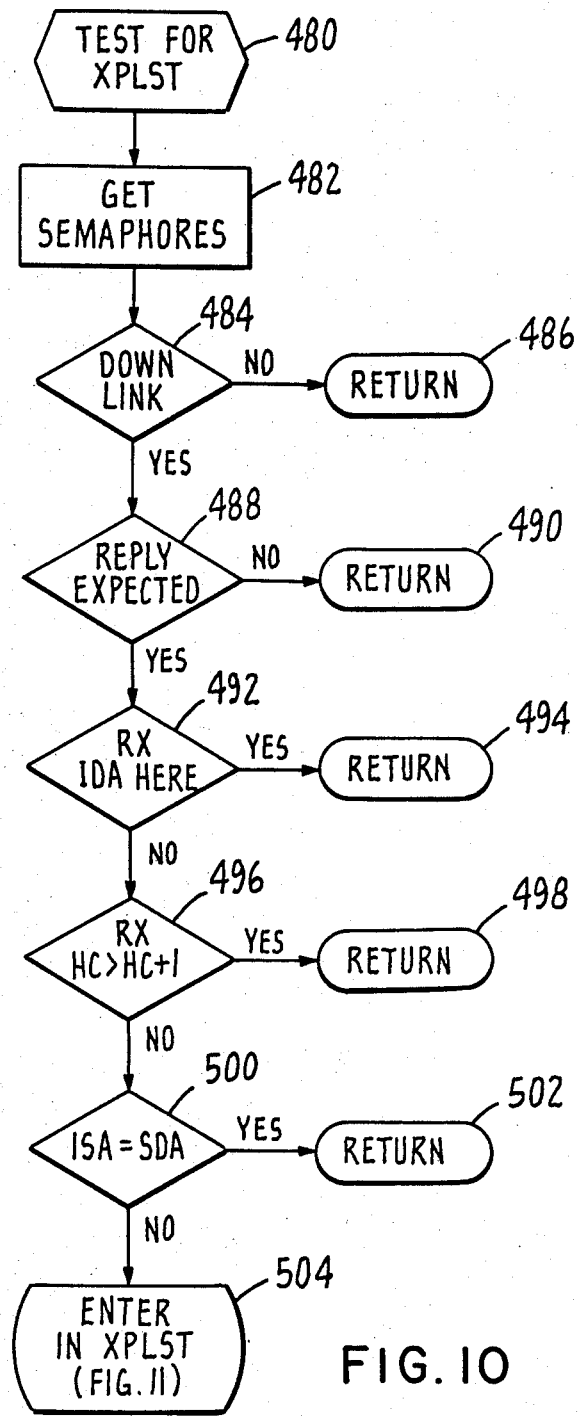
FIG. 10 is a flowchart for a subroutine which depicts the manner in which a received message is tested to determine whether an entry is to be made into an Expected List used for monitoring messages for which a reply message is expected.

The subroutine for testing whether the received FLST message should be used for updating the XPLST (element 388) will be described in connection with the FIG. 10 flowchart. Entry into the subroutine is represented by element 480. Reply messages are transmitted only in response to down link messages. Accordingly, a determination is made as to whether the received message is down link, as indicated by element 484. If the message is not down link, the sequence returns to the calling program, as represented by element 486.

If the message is down link, the message is usually of the type for which a reply is expected. As represented by elements 488 and 490, if a reply is not expected, the sequence will return to the calling program.

If the down link message is directed to the subject remote unit, the data package will be stored and forwarded by the unit. The XPLST will be updated during the store and forward operation, as will be subsequently described. Accordingly, as represented by elements 492 and 494, if the IDA of the message matches the address of the subject node, the XPLST will be updated later and the sequence will return to the calling program.

A received message will not cause an addition to the XPLST if the HC in the message exceeds that of the subject remote unit by more than one. If the received HC is too great, it is possible that the message will cause premature addition of an address to the XPLST. The foregoing can be further illustrated by reference to the FIG. 2 diagram. Assume that remote unit 26d has transmitted a down link message directed to unit 26e, which is also received by unit 26a. The HC of the transmitted message will be three, whereas the HC of node 26a is one. Unit 26e will store and forward the data package to unit 26f with a message HC of two. It is preferable that the message transmitted by unit 26e, rather than by unit 26d, will cause addition to the XPLST of unit 26a. Similarly, it is possible that unit 26f will receive the message transmitted to unit 26e. It is preferable that the XPLST for unit 26f be updated during the subsequent store and forward sequence of the data package by unit 26f rather than by the message transmitted by unit 26d. Thus, as represented by elements 496 and 498 (FIG. 10), if the received HC exceeds the HC of the subject unit by more than one, the sequence returns to calling program.

A remote unit initiating a down link message sequence will not store and forward the data package in the subsequent up link reply message. Accordingly, there will be no reply message transmitted by the sequence initiating unit to be received by other units; therefore, no addition should be made to the XPLST. A determination is made as to whether the message was transmitted by the remote unit originating the data in a down link message by comparing the ISA with the SDA of the message. As represented by elements 500 and 502, if the addresses match, no change will be made to the XPLST and the sequence will return to the calling program. In the event the addresses do not match, a subroutine is called for entering the address (ISA) of the transmitting node on the XPLST, as represented by element 504.

Figure 11:
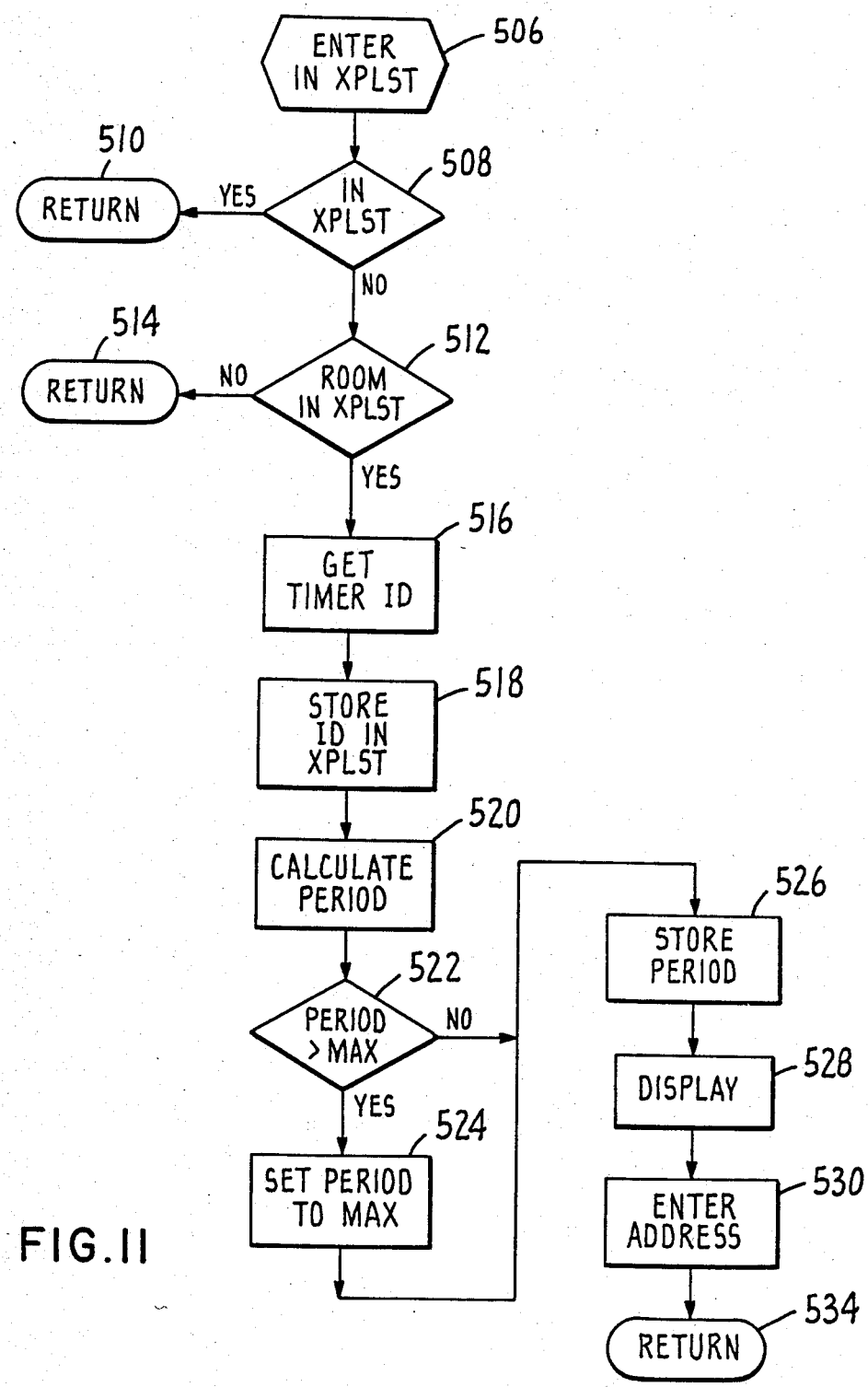
FIG. 11 is a flowchart for a subroutine which depicts the sequence for setting a failure timer associated with an entry in the Expected List for determining whether an expected reply message is received within a predetermined time.

The subroutine for making XPLST entries is depicted in the flowchart of FIG. 11. Entry into the subroutine is represented by element 506. If the address of the transmitting node is already entered, the sequence will return to the calling program, as represented by elements 508 and 510, respectively.

If the address is not present, a determination is then made as to whether there is room in the XPLST for an additional entry, as represented by element 512. In the present embodiment, the XPLST may have up to fourteen entries. If there is no room, the sequence will return to the calling program, as represented by element 514.

Assuming that there is room in the XPLST, a failure timer function will be obtained which determines the time period in which the expected reply message should be received. The timer function is provided by a conventional timer program which is dedicated to providing timer functions used to time various events. Each timer function has a unique identifier. As represented by blocks 516 and 518, respectively, the identifier is obtained and stored in the XPLST at the location where the new entry is to be made.

The time period in which the expected reply should be received is then calculated, as represented by block 520. If the reply is not received within time period, it is assumed that a failure to communicate with the master unit has occurred. The duration of the failure timer period is a function of the Hop Count HC of the received message and the System Priority SP of the subject remote unit, in accordance with the following equation:

$$\text{Failure Period} = (HC + (SP+1))*8 \text{ Seconds} \quad (5)$$

In the present embodiment, the maximum allowed period is 255 seconds. As represented by element 522, a determination is then made as to whether the calculated period exceeds the maximum. If the maximum is exceeded, the calculated period is set equal to the maximum and stored, as represented by blocks 524 and 526, respectively. If the maximum is not exceeded, the calculated value is stored (526).

The stored value is then used for initializing the associated failure timer. The address of the received message is then stored in the XPLST, as represented by block 530. Once the address has been stored, the sequence returns to the calling program, as represented by element 534.

If the XPLST is to be updated because of receipt by the subject remote unit of a message for which a reply is expected, the ISA of the message is entered on the list. In the event the XPLST is updated because the subject unit is about to transmit a message for which a reply is expected, the IDA of the message will be entered on the list. In addition, the previously-noted transmit originate flag will be set to indicate that the subject remote unit is to receive an expected reply message contining the IDA of the subject remote unit.

Figure 12B:
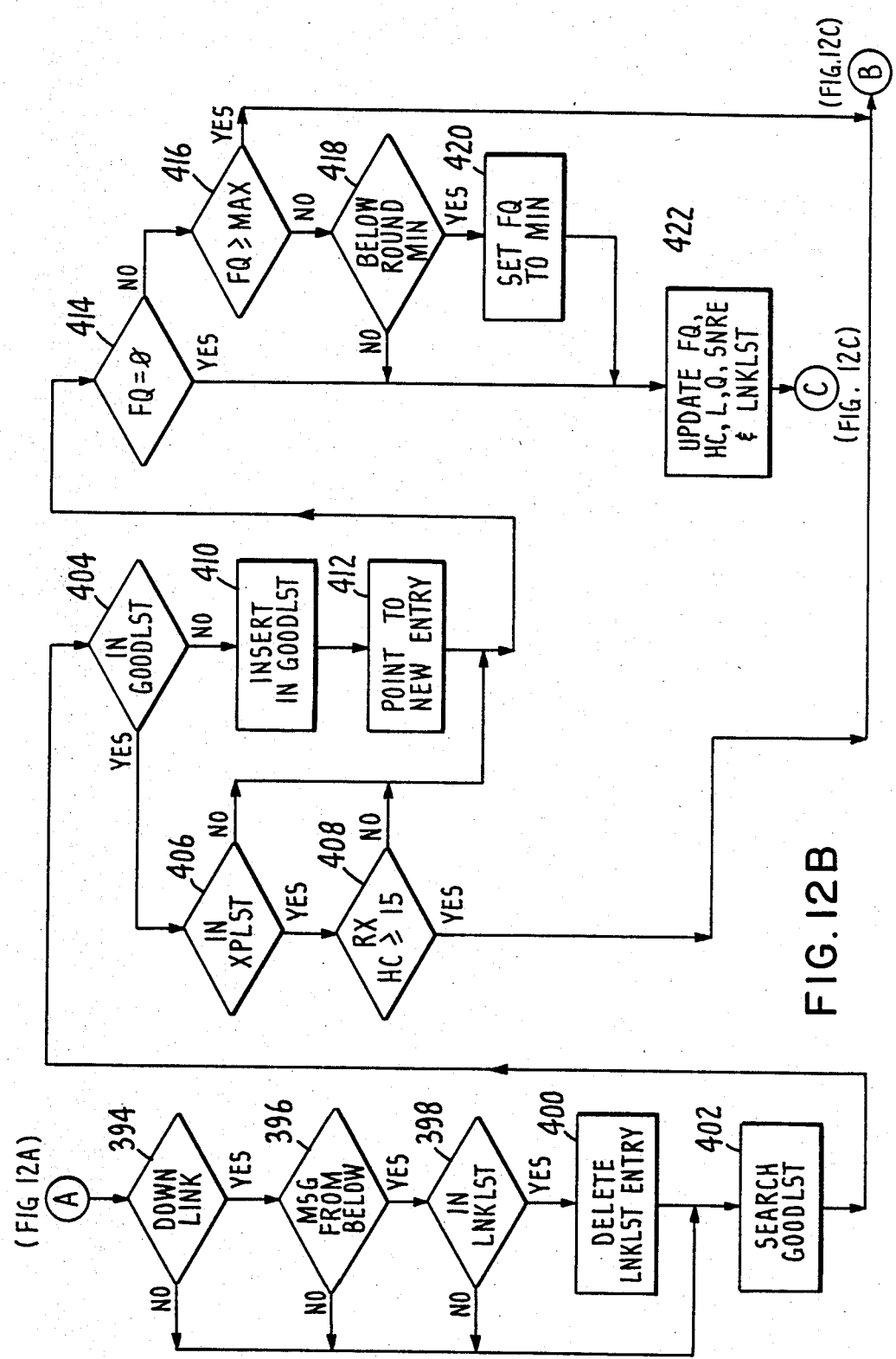

The initial sequence for possible updating of the XPLST in the event the received message is present on the Good List GOODLST or is to be added to the list will now be described in connection with the flowchart of FIG. 12B. A preliminary sequence will be entered for the purpose of reducing the likelihood of undesirable message loops. Such loops are likely when a down link message is received from a node which is below the subject remote unit in terms of Hop Count HC.

As indicated by element 394, the type of the received message is examined to determine whether the message is down link. If the message is down link, the HC of the message and that of the subject remote unit are compared to determine whether the message was transmitted from below, as shown by element 396. The Link List LNKLST for the subject unit is then examined to determine whether the list contains an up link address which matches the ISA of the received message, as represented by element 398. Since the HC of the transmitting remote unit is less than that of the subject remote unit, the transmitting unit is no lonoer ideal for receiving up link messages from the subject unit. Accordingly, the address is deleted from the LNKLST, as represented by block 400, thereby reducing the likelihood of message loops.

Once the LNKLST entry has been deleted, if required, the GOODLST is searched to determine whether the ISA of the received message is present, as indicted by block 404. As represented by block 410, if the address is not present, the address is conditionally inserted in the GOODLST as the last entry. A pointer is then directed to the new list entry, as indicated by block 412. It is possible that the new entry will be removed from the list after the list is sorted, as will be subsequently described. If the entry is removed from the GOODLST, no addition will be made to the XPLST.

If the unit transmitting the received messaoe is present in the Good List GOODLST (element 404), a determination is made as to whether the node transmitting the message is in the XPLST, as represented by element 406. As previously described, if the node is present, the subject remote unit is awaiting transmission by the node of an up link message to the subject or another node. A determination is then made as to whether the HC in the message is equal to the maximum of fifteen. If the HC is equal to the maximum, the transmitting remote unit is lost and steps will be taken, as will be described in connection with the flowchart of FIG. 12C, to remove the node from the GOODLST.

A sequence is then entered to determine whether the GOODLST entry under consideration should be deleted for other reasons. The current value for the Failure Quotient FQ in the FLST for the entry is then examined to determine whether the value is greater than zero, as represented by element 414. If the GOODLST entry is a conditional entry or if there is no FLST entry, the value of FQ will be assumed to be zero.

As represented by element 414, if FQ is greater than zero, a determination is made as to whether FQ exceeds the allowed maximum for remaining on the GOODLST. Although FQ may have a maximum value of 131, the maximum permissible value of FQ for a GOODLST entry is 127 (unscaled). As represented by element 416, if the value of FQ is equal to or greater than 128, the sequence will advance to the flowchart of FIG. 12C, at which time the entry will be deleted from the GOODLST, as will be subsequently described.

If the value of FQ is less than the GOODLST mimimum, a scaling operation takes place. The value of FQ in the FLST is represented by seven bits whereas the value is represented only by four bits in the GOODLST. The scaled value serves to simplify the GOODLST sorting routine, as will be subsequently described. The scaling routine is accomplished by deleting the three LSBs of the FLST entry.

In order to prevent a non-zero FLST entry from being scaled or rounded down to zero, a determination is made as to whether the FLST value is below the rounding minimum of eight. A value of eight would result in a scaled value of one. If the non-zero value is less than this minimum of eight, the value of FQ is set to eight, as represented by block 420, so that the scaled value is one.

The various performance parameters associated with the GOODLST entry under consideration are updated, as represented by block 422. These parameters include the Failure Quotient FQ, Hop Count HC, Link confirmed flag L, Quality of back link Q, Signal-To-Noise Ratio Estimator SNRE. The LNKLST status of each GOODLST entry is not stored in the GOODLST, but is a GOODLST sort parameter.

Figure 12C:
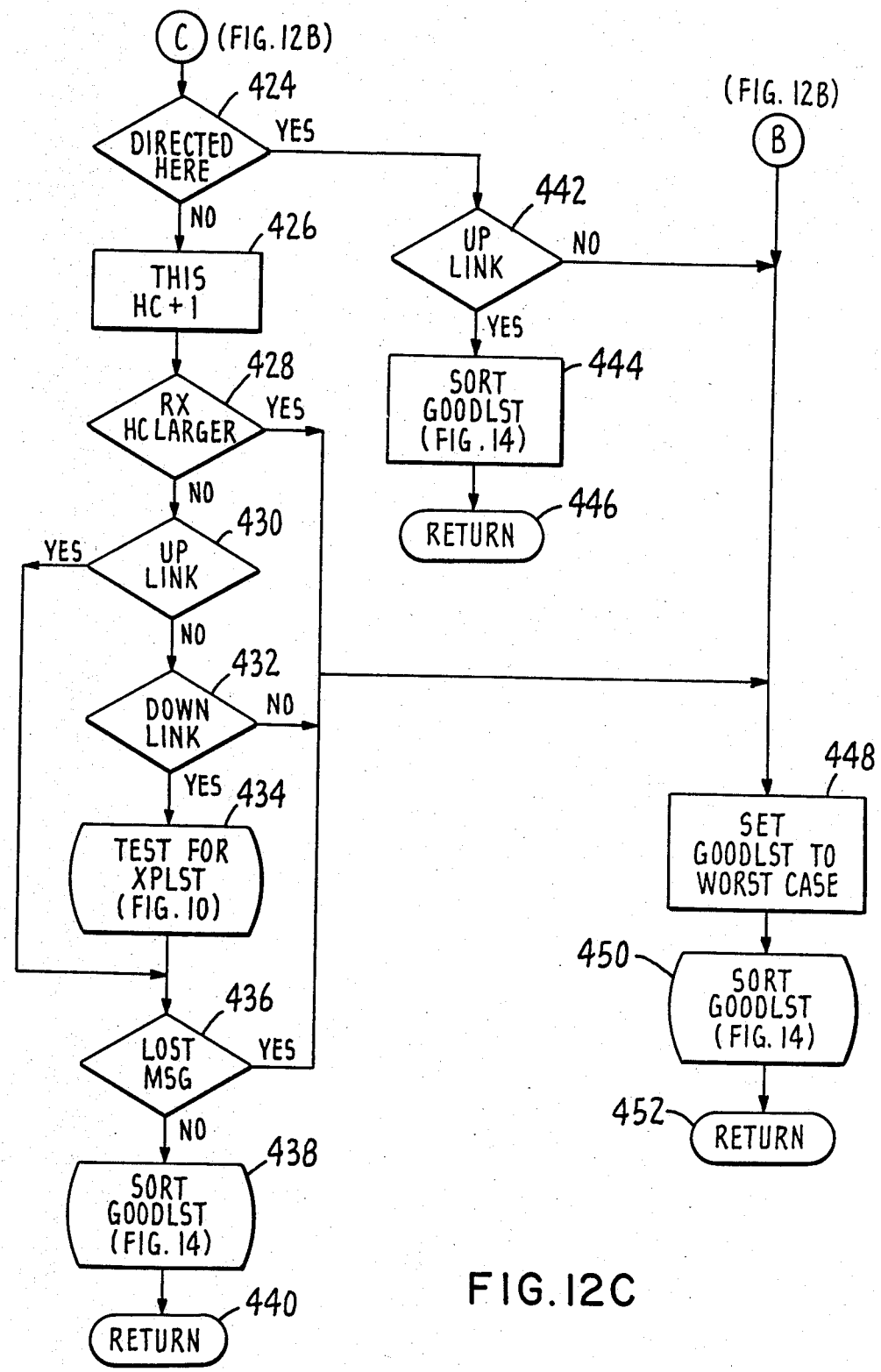

Further processing of the received message is continued on the FIG. 12C flowchart. As represented by element 424, a determination is made as to whether the message is directed to the subject remote unit by examining the IDA of the message. If the message is directed to the subject unit, the message type is examined to ascertain whether the message is an up link message, as indicated by element 442.

If the message is up link, in order to reduce the likelihood of message looping, the address will be effectively deleted from the GOODLST. This is accomplished by setting the GOODLST parameters to worst case value as set set forth in Table 6 below.

TABLE 6

| ENTRY | STATE |
| --- | --- |
| FQ (scaled) | 15 |
| SNRE | 0 |
| Q | 0 |
| L | 0 |
| HC | 15 |

Once the GOODLST entries have been set to worst case values, a subroutine will be entered for sorting the list, as represented by block 450. As will be subsequently described, the GOODLST will be sorted in order of preference, with the most preferred address being located at the top of the list. The list has a capacity of storing six entries in the present embodiment. If a conditional entry has been made such that there are seven entries, the bottom or least preferred entry will be deleted. Once the sort has been accomplished, the sequence for updating the links is completed, as represented by element 452.

If the message is directed to the subject remote unit, and is an up link message (element 442), then the message information is either to be stored and forwarded or the subject unit is the final destination of the message information. In the former case, the XPLST will be updated during the subsequent transmission of the message. In neither case will it be necesary to update the XPLST at this time. The GOODLST will then be sorted and the sequence will return to the executive program, as represented by block 444 and element 446, respectively.

If the received message is not directed to the subject unit (block 424), a value equal to the local Hop Count HC of the subject unit plus one is computed, as represented by block 426. Next, as represented by element 428, a comparison is made between the computed value and the received Hop Count HC. If the received value is greater than the HC of the present unit plus one, the message was transmitted by a node located above the subject unit, in terms of HC. To reduce the likelihood of message loops, the address of the node will not be added to the GOODLST. The associated GOODLST entries will then be set to the worst case value of Table 6 and the GOODLST will be sorted, as previously described, so as to effectively delete the entry.

In the event the message was not transmitted from above (element 428), a determination is made as to whether the received message is an up link message, as represented by element 430. If the message is up link, no additions are made to the XPLST. As shown by element 436, a determination is then made a to whether the up link message was transmitted by a lost remote unit. A unit is considered lost, as previously noted, if the received HC is greater than the maximum value of fifteen. If the transmitting unit is lost, the GOODLST parameters for any conditional entry are set to the worst case value (block 448), and the list is sorted, as previously described. If the unit is not lost, the GOODLST is sorted and the best six entries are retained, as represented by block 438. The sequence then returns to the executive program, as represented by element 440.

If the message is not an up link message (element 430), a determination is then made as to whether the message is down link, as represented by element 432. Certain message types are not designated as either up or down link. If this type of message has been received, the GOODLST entires are set to worst case values (block 448), the GOODLST is sorted and the executive program is returned to (element 452).

If the message is down link, the subroutine is entered for determining whether an entry on the XPLST is to be made, as represented by element 434. As previously described in connection with the FIG. 10 flowchart, a determination is made as to whether the XPLST is to be updated. If the list is to be updated, the address of the transmitting node is inserted in the list and the period for setting the failure timer is calculated, as previously described in connection with the flowchart of FIG. 11.

Once the subroutine for updating the XPLST has been completed, a determination is made as to whether the message is from a lost remote unit, as indicated by element 436. If the unit is lost, the conditional GOODLST entry is deleted, otherwise the list is sorted and the sequence returns to the calling program.

The manner in which the GOODLST is sorted will be initially described in connection with the flowchart of FIG. 13. The criteria for sorting the GOODLST are set forth in Table 7 in order of preference.

TABLE 7

Entries not present on LNKLST
Entries with lower FQ
Entries with L = 1
Entries with non-zero Q
Entries with lower HC
Entries with higher Q
Entries with higher SNRE As set forth in Table 7, the GOODLST entries are first sorted based upon the status of the entries with respect to the LNKLST. Undersirable message looping is likely to occur if an address is present on both the GOODLST and LNKLST for a particular remote unit. Accordingly, GOODLST entries which are present on the LNKLST are not preferred as GOODLST entries.

Entries having a similar LNKLST status are further sorted based upon the magnitude of the Failure Quotient FQ of the entry. If the entry is not present on the Failure List FLST, FQ is set to zero. Entries with the lower FQ are preferred.

Entries within the same value of FQ are sorted based upon the status of the Link confirmed flag L, with a set flag being preferred. The process will continue based upon each sort parameter, as set forth in Table 4.

Figure 13:
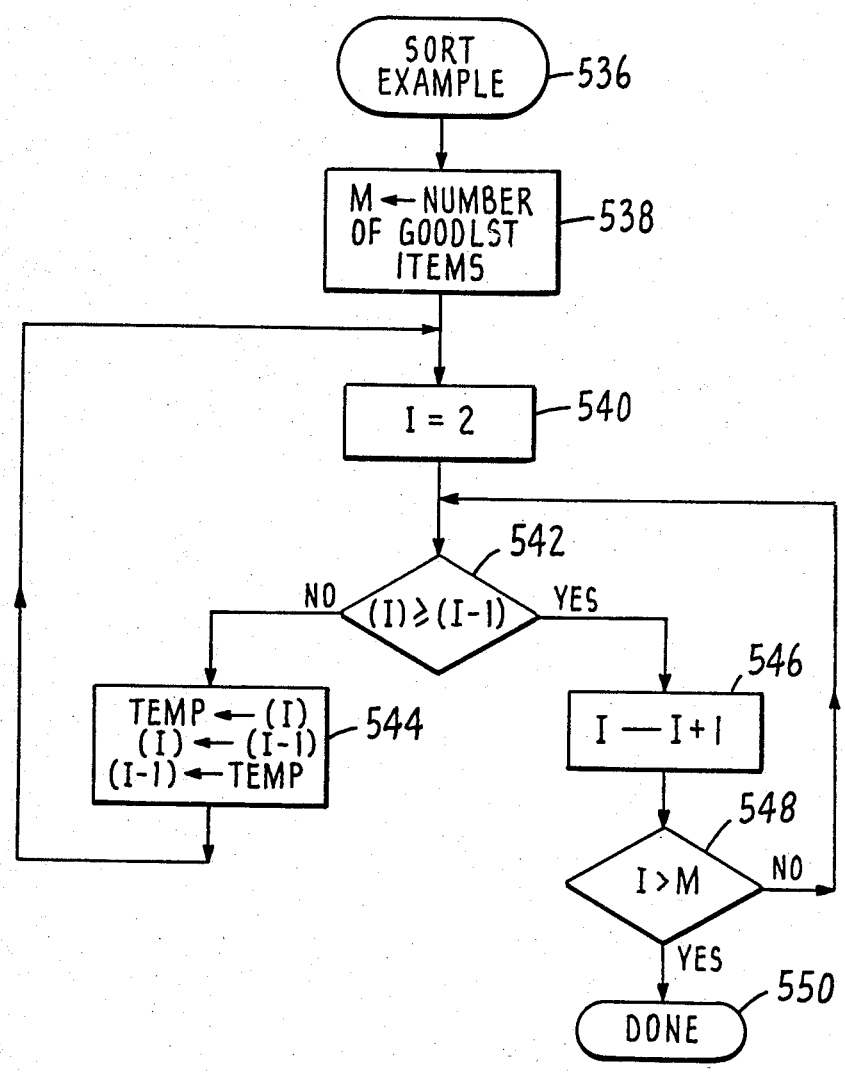
FIG. 13 is a simplified flowchart depicting the manner in which the Good List containing down link addresses is sorted based upon a single sort parameter.

An example of the manner in which any list may be sorted in accordance with the value of a given parameter is illustrated in the FIG. 13 flowchart. The sequence is for a single parameter, and it is assumed that the sort is to be performed based upon the magnitude of such parameter.

The beginning of the exemplary sorting sequence is represented by element 536. It is assumed that the GOODLST has M number of entries (N or N+1), as indicated by block 538. An index I is initially set to 2, as indicated by block 540, with the number 2 representing the second entry from the bottom of the GOODLST and M representing the top entry. The second from bottom list entry (I=2) is then compared with the bottom entry (I=1), as represented by element 542. If the second from bottom entry has a magnitude greater or equal to that of the bottom entry, the bottom entry is in the proper position and no change is made.

If the magnitude of the bottom entry is not greater than or equal to the second from bottom entry, the two entries are interchanged or swapped. As represented by block 544, the contents of the second from bottom entry (I=2) are transferred to a temporary register. Next the contents of the bottom entry (I=1) are transferred to the previous location of the second from bottom entry. Finally, the contents of the temporary register are transferred to the bottom entry.

Once the interchange between the last two GOODLST entries are made, the sorting sequence is repeated from the beginning at block 540. The reason for the repeat can best be illustrated by an example. Assume that there are three list entries, with the top entry being zero and the bottom two entries being one. When the two final entries are compared, no interchange is required since the magnitudes are equal. When a comparison between the middle and top entries is made, the middle entry of one will be interchanged with the top entry of zero. It is necessary to repeat the sort from beginning so that the bottom and next to bottom list entries can be compared and interchanged in order for the final list to be in the desired order.

Once the interchange has taken place, the sort sequence is repeated and the index I is set back to the starting point, as represented by block 540. The sequence is repeated. If no interchange is required the index I is increased by one, as represented by block 546. A determination is then made as to whether the new value of I is less than or equal to the value of M, as represented by element 348. If the value does not exceed M, the sort sequence is repeated with the new value of I, beginning at element 542. A comparison will then be made between the third and second from last entries. If an interchange is required, the value of I will be set back to 2 and the entire sort sequence will be repeated, beginning at block 540. The process continues until I is greater than M, at which time the sort sequence is completed, as represented by element 548.

The sequence is modified if more than one sort parameter is used. A sort will not be performed on a pair of entries unless the sort parameters having higher precedence are equal. Thus, if it is determined that the respective sort parameters for two entries under consideration are the same (element 542), the two entries are then sorted based upon the next least significant sort parameter.

Further details of the GOODLST sort subroutine will be described in connection with the flowchart of FIGS. 14A-14B. If the list contains N entries, the sequence is entered at element 552 and the index for the number of items in the list is set to N. If there are N+1 entries to be sorted, the subroutine is entered at element 554 and the index is set to N+1 items. The number of items to be sorted, either N or N+1 is saved, as represented by block 560.

As indicated by element 562, the list entries are then sorted based upon whether the address under consideration is also present on the LNKLST. Units which are used for transmitting up link messages, as indicated by a presence on the LNKLST, are not preferred for use in transmitting down link messages. As set forth in Table 7, entries present on the LNKLST will be placed at the bottom of the list and all other entries are placed at the top of the list.

Figure 14A:
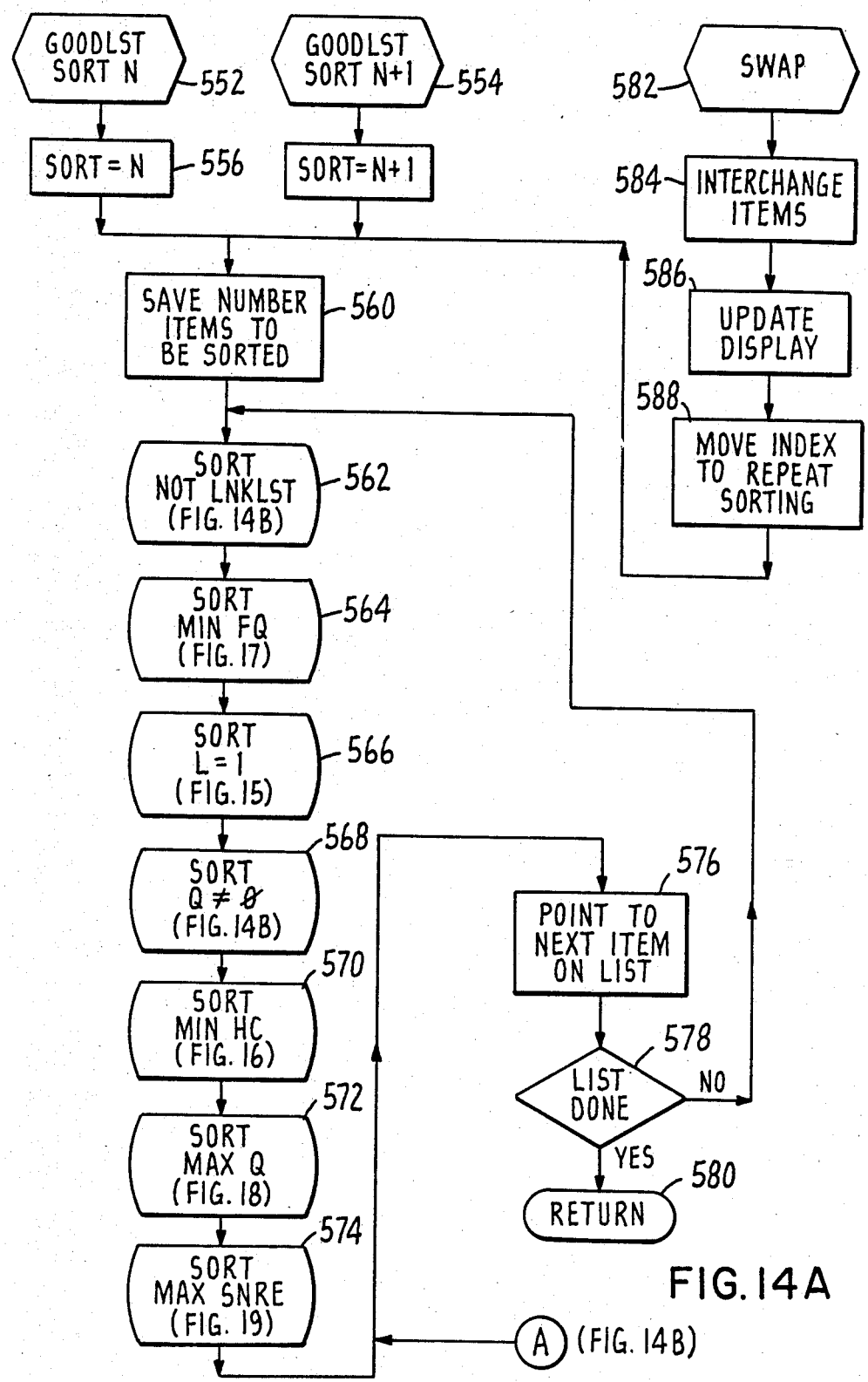
FIG. 14A-14B is a detailed flowchart of a subroutine wherein Good List addresses are sorted based upon a plurality of sort parameters, with the order of the list determining preferred down link addresses.
Figure 14B:
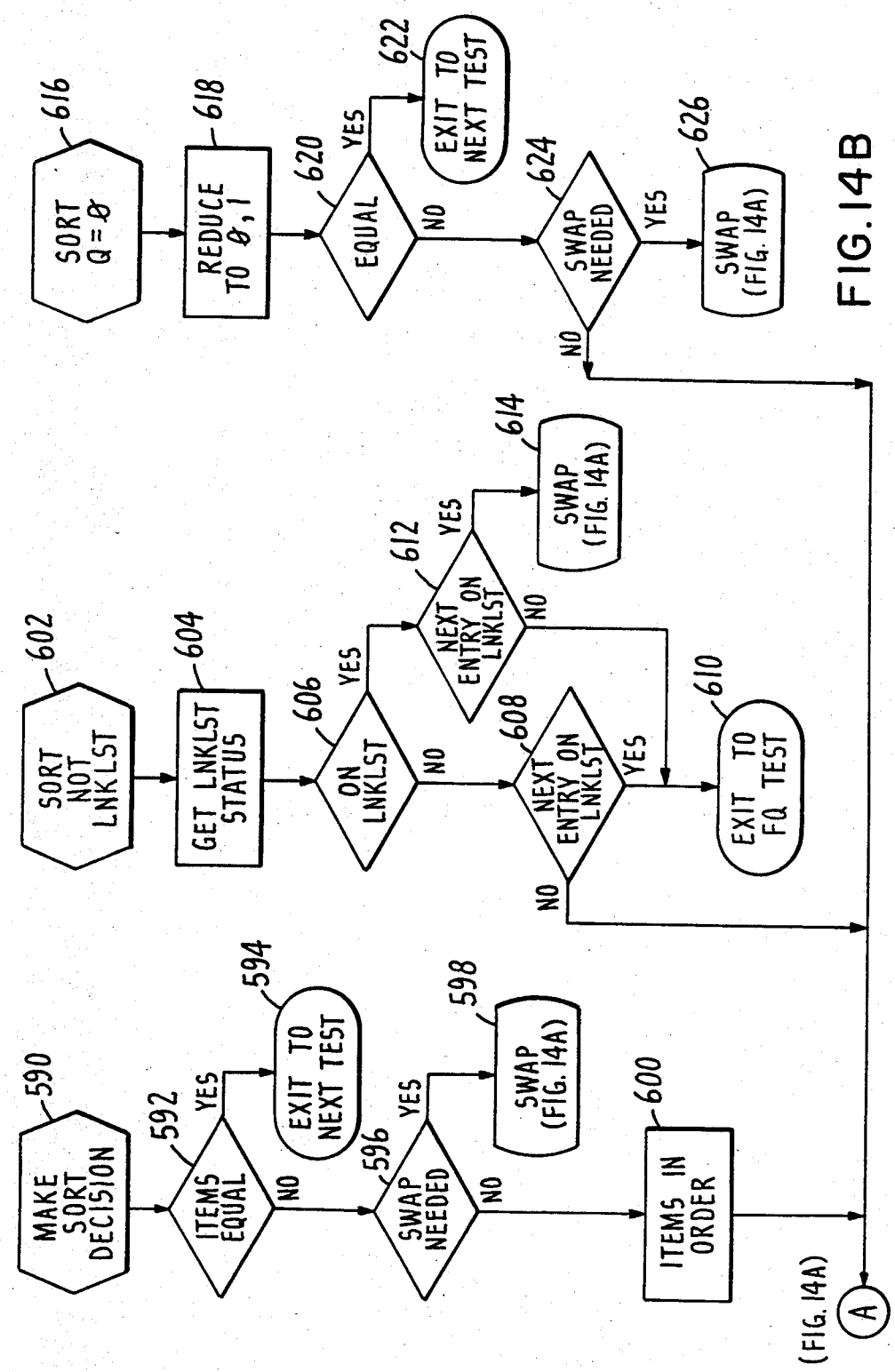

The subroutine for sorting on LNKLST status is entered at element 602 of the FIG. 14B flowchart. The status of the next GOODLST entry with respect to the LNKLST is obtained, as represented by block 604. A determination is then made as to whether the current entry is present on the LNKLST, as indicated by element 606. If the current entry is not on the LNKLST, a determination is made as to whether the next entry is on the LNKLST, as represented by element 612. If the next entry is present on the LNKLST, the two entries need to be interchanged or swapped.

The subroutine for interchanging the two entries is represented by element 614 and entry into the subroutine is represented by element 582 of the FIG. 14A flowchart. Once the subroutine is entered, the two entries are interchanged, as represented by block 584. The display is then updated to indicate that a change has been made to the GOODLST, as indicated by block 586. The index will then be reset to the start so that the entire sorting sequence beginning with a sort on for LNKLST status, will be repeated for the reasons previously set forth in connection with the FIG. 13 flowchart.

If neither of the two entries are on the LNKLST (elements 606, 612), there is no requirement to interchange the entries. Similarly, if both entries are on the LNKLST, no interchange is required. As represented by element 610, the two identical entries will be sorted in accordance with the next sort criteria, based upon minimum FQ. Entry into the subroutine for sorting on FQ is represented by element 564.

If the two entries under consideration have differing LNKLST statuses, it may be necessary to interchange the items. In any event, the two items will not be sorted with respect to FQ, since the LNKLST status has precedence over FQ. If the present entry is entered on the LNKLST and the next up entry is not, the entries are in proper order. The sequence will proceed to block 576, and a pointer will be directed to the next entry up on the GOODLST. A determination will be made as to whether there is a next entry. As represented by elements 578 and 580, if there is no next entry, the GOODLST sort is completed and the sequence returns to the calling program. If there is a next entry, the next entry and the present entry are sorted based upon LNKLST status, in the manner previously described.

As noted earlier, if the LNKLST status for the two entries under consideration are the same, the entries are then sorted based upon minimum value of FQ (element 610), as represented by element 564. The subroutine is depicted in the FIG. 17 flowchart. Entry into the subroutine is represented by element 640. The values of FQ for the two entries under consideration are compared, as indicated by block 642. Next, a subroutine for making a sort decision is entered, as shown by element 644.

Entry into the sort decision subroutine, which is depicted in FIG. 14B, is represented by element 590. The two values of FQ are compared, as represented by element 592. If the values are equal, there is no requirement to interchange the entries. As indicated by element 594, the two entries will then be sorted in accordance with the next criteria, which is the state of flag L, as represented by element 566.

If the two values of FQ are not equal, a determination is made as to whether an interchange is required. In any event, the items will not be sorted based upon the next sort paramter. If the entry higher on the GOODLST has the lower value of FQ, no interchange is necessary. As represented by block 600, the items are in the proper order, therefore, the next item up on the GOODLST will be sorted (block 576) based upon LNKLST status (element 562). In the event the items are not in the proper order, the previously-described swap subroutine is entered into, as represented by element 598.

A sort based upon the state of the Link confirmed flag L is performed for entries having similar LNKLST status and identical values of FQ, as represented by element 566. Entry in the subroutine for sorting on L, depicted in the FIG. 15 flowchart, is represented by element 628. The respective values of L for the entries under consideration are compared, as represented by block 630. The previously-described sort decision subroutine is the entered, as represented by element 632. If the state of flag L for the two entries is not the same (element 592), the entries are interchanged, if required, and the next up entries are compared. If the status is the same, a sort based upon the value of "Q not equal to zero" is performed, as represented by element 568.

Entry into the subroutine for sorting on Q is represented by element 616 of FIG. 14B. Non-zero values of Q for the two entries are reduced to one, as represented by block 618. As shown by elements 620 and 622, if the two respective values of Q are equal, a sort will be performed on the next least significant parameter, namely, the value of HC (element 570).

In the event the values of Q are not equal, a determination is then made as to whether it is necesary to interchange the two entries. If the entry having a value of Q=1 is higher on the GOODLST, no interchange is required. In that event, the item next up on the GOODLST is examined with respect to the LNKLST status (element 562). If an interchange is required, the sorting sequence based upon Q is started over.

The subroutine for sorting on HC is represented by element 570. Entry into the routine is represented by element 634 of the FIG. 16 flowchart. The HC bits of the two entries are compared, as represented by block 636, and the subroutine for making the sort decision is entered into, as represented by element 638. If the entry higher on the list has the lower value of HC, no interchange is required. If the values of HC are identical, a sort based upon the unreduced value of Q is commenced, as represented by element 572 of FIG. 14.

As previously noted, Q may vary from 0 to 3, with the higher value representing a larger signal-to-noise ratio. Entry into the subroutine is represented by element 646 of the FIG. 18 flowchart. The values of Q for the two entries under consideration are compared and the sort decision subroutine is entered, as represented by block 654 and element 656, respectively.

If the value of Q on the upper GOODLST entry is the greater of the two entries, no interchange is required and the next GOODLST entry will be sorted based upon the LNKLST status. If the bottom entry is greater, the entries will be interchanged and the sort-based upon Q restarted. If the two values of Q are the same, no interchange is required. The two entries will then be sorted based upon the value of SNRE, as represented by element 574.

Figures 15, 16, 17, 18, 19:
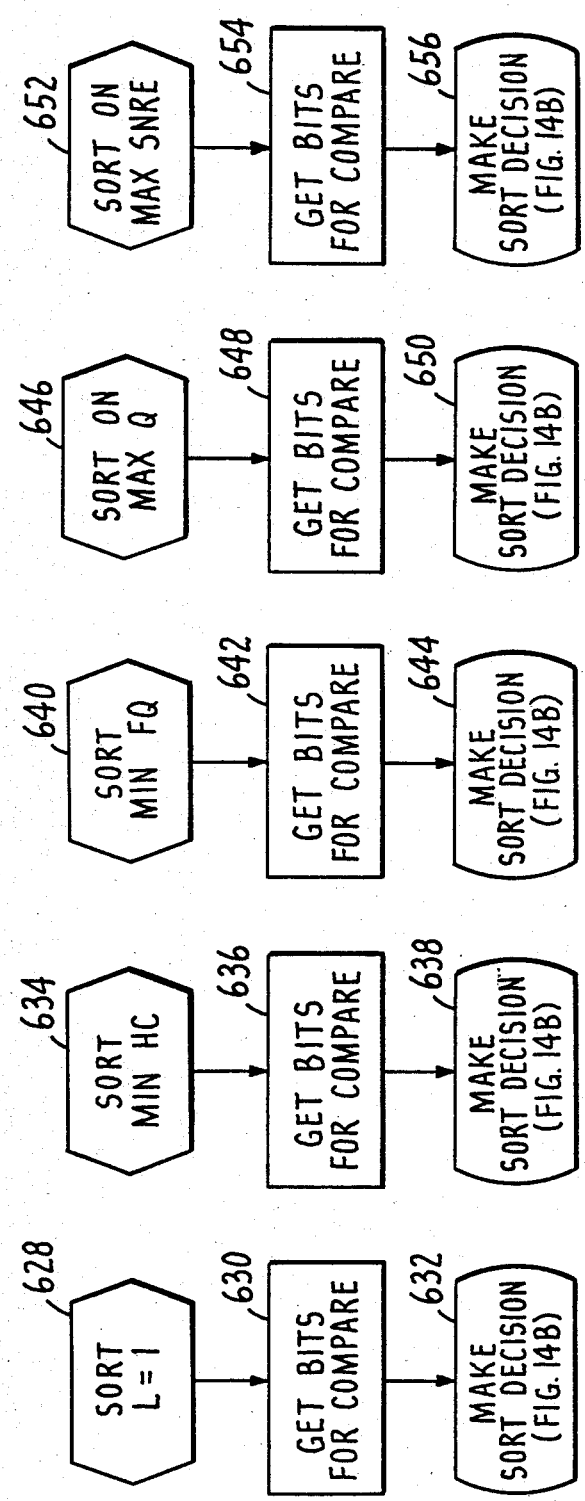
FIG. 15 is a subroutine called by the Good List sort sequence (FIG. 14) for the Quality of link sort parameter.
FIG. 16 is a subroutine called by the Good List sort sequence (FIG. 14) for the Hop Count sort parameter.
FIG. 17 is a subroutine called by the Good List sort sequence (FIG. 14) for the Failure Quotient sort parameter.
FIG. 18 is a subroutine called by the Good List sort sequence (FIG. 14) for the Quality of back link sort parameter.
FIG. 19 is a subroutine called by the Good List sort sequence (FIG. 14) for the Signal-To-Noise Ratio Estimator sort parameter.
Figure 20A:
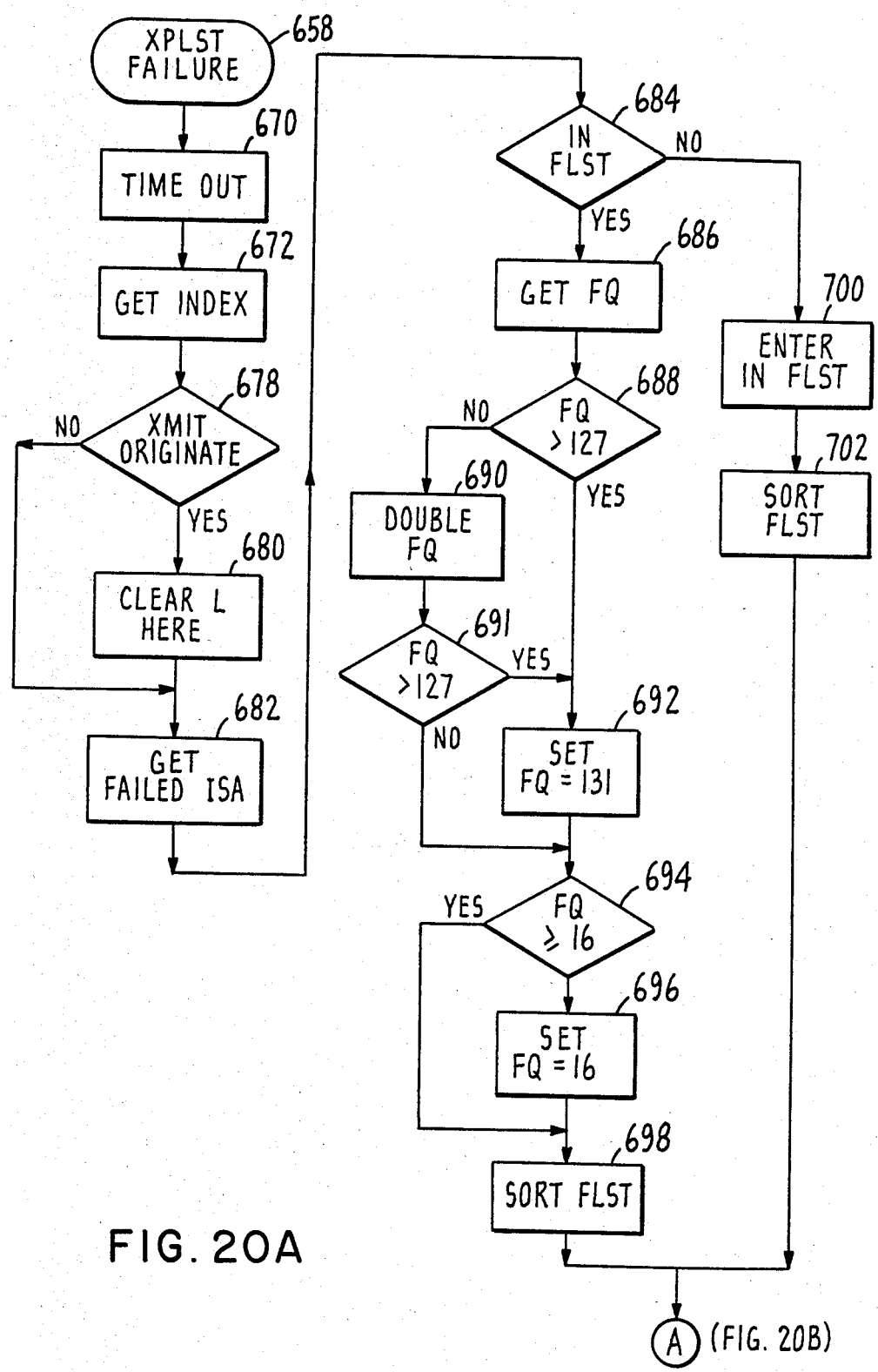
FIG. 20A-20B is a flowchart which depicts the sequence which occurs when an expected reply message is not timely received
Figure 20B:
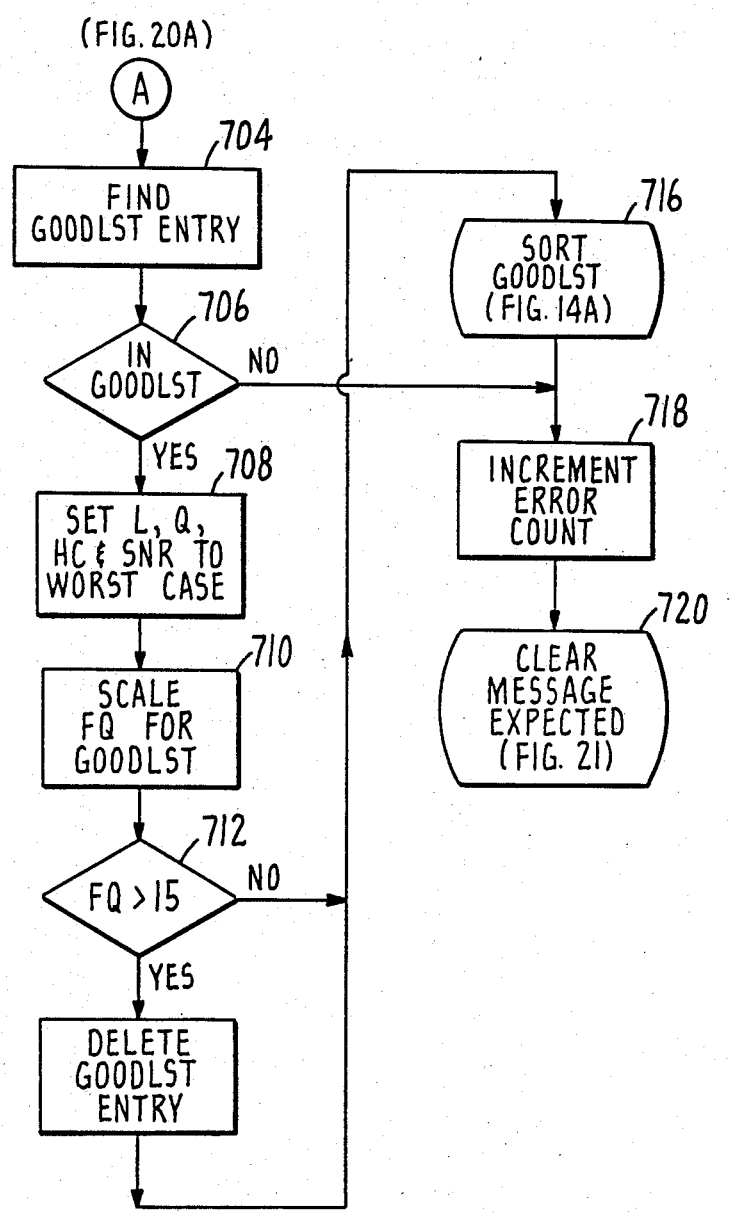

The subroutine for sorting based upon the magnitude of the SNRE value, the least significant sorting criteria, is depicted in the FIG. 19 flowchart. Entry into the subroutine is represented by element 652. As represented by block 654 and element 650, the two values of SNRE are compared, and the sort decision subroutine is commenced. Since the SNRE is the final sort criteria, if the two values of SNRE are equal, the sort decision subroutine is modified to the extent that the sequence will return to block 576. At that time, the next entry on the GOODLST will be sorted based upon the LNKLST status and the subsequent sort parameters. If the values differ, the entries are interchanged, if required, as previously described.

The GOODLST sort sequence is completed when the number of items actually sorted is equal to the number of items to be sorted (block 560), as represented by elements 578 and 580. The six entries at the top of the list are retained, and any possible additional entry is discarded. Once the XPLST has been updated with a new entry, if appropriate, and the GOODLST and FLST have been updated, the initial received message processing is completed.

The executive program periodically examines XPLST entries to verify that expected reply messages are received within the time period set by the failure timer associated with each list entry. Referring now to the flowchart of FIG. 20A, entry into the sequence which occurs whenever a failure timer time-out takes place is represented by element 658. The time-out is represented by block 670. The XPLST index associated with failed entry is obtained, as indicated by block 672.

The associated transmit originate flag is then examined, as shown by element 678. As previously described, the flag will be set if the subject remote unit transmitted the down link message for which the reply was expected, rather than having merely observed the transmission. If the originate flag is set, then the Link confirmed flag L for the subject unit is cleared, as indicated by block 680, thereby indicating that the subject unit was not capable of successfully communicating with the master unit. The flag L will be in a cleared state for all further messages transmitted by the subject unit and will remain cleared until the unit successfully receives a reply message in response to a message transmitted by the unit.

Once flag L has been cleared, if appropriate, the address of the XPLST entry, which is the address of the node which failed to transmit the reply message, is obtained, as represented by block 682. A determination is then made as to whether the failed address is present on the Failure List FLST of the subject remote unit, as shown by element 684.

If the failed address is not present, it is entered on the FLST. The new entry is assigned a Failure Quotient FQ of 16, this being an unscaled value. The FLST is then sorted based upon the magnitude of the associated FQ, as indicated by block 702. The best performing address, the entry having the lowest value of FQ, is placed at the top of the list. The FLST has a capacity of eight entries; therefore, if the new entry exceeds this capacity, the entry having the largest FQ is deleted. Further XPLST and related GOODLST processing will then take place, as will be described in connection with the FIG. 20B flowchart.

If the failed address is presently on the FLST, the FQ for the entry is obtained, as indicated by block 686. The value of FQ for the failed entry will then be doubled, provided the increased value does not exceed the maximum of 127. As indicated by element 688, a determination is made as to whether the present value of FQ is greater than 127. If the value is not greater, the value is doubled, as shown by element 690, otherwise the value is set equal to 131, as indicated by block 692. If the value of FQ is doubled (block 690), a determination is made as to whether the increased value of FQ is greater than 127, as represented by element 691. If the increased value does not exceed 127, the value is left unchanged, otherwise FQ is set to 131 (block 692). With an FQ of 131, the address is precluded from being entered on the GOODLST.

As will be subsequently described, the FQ for each FLST entry is periodically automatically reduced by one so as to eliminate FLST entries which are no longer active or to allow reentry of addresses having an FQ exceeding 127. If FQ of an FLST entry is reduced to zero, the entry is deleted from the FLST. As represented by element 694, a determination is made as to whether the value of FQ has been reduced to below a minimum of 16. If the value is less than 16, FQ is set to 16 for subsequent scaling purposes as represented by block 696. Once the value has been set, if required, the FLST is sorted, as shown by element 698. Once the FLST has been sorted for either a new or present FLST entry, the sequence is continued on the FIG. 20B flowchart.

As represented by block 704, the GOODLST is examined to determine whether the failed address is present. As indicated by element 706 and block 708, if the address is present in the GOODLST, the associated sort parameters are set to worst case values as set forth in Table 6, with exception of FQ. The value of FQ is then scaled, as indicated by block 710, for entry in the GOODLST by deleting the 3 LSBs of the FLST value. The scaled value of FQ may vary from 0 to 15.

A determination is then made as to whether the scaled value of FQ exceeds the maximum of 15 (127 unscaled), as represented by element 712. In the event the maximum is exceeded, the GOODLST entry is unconditionally deleted from the list, as represented by block 714. The GOODLST is then sorted, as represented by element 716, using the scaled value of FQ, with the remaining sort parameters set to worst case values (element 708). The subroutine for sorting the GOODLST was previously described in connection with the FIG. 14 flowchart. Thus, the GOODLST entry which failed to transmit an expected message is made less preferred as a down link address.

Once the GOODLST has been updated, if appropriate, an error counter is incremented, as represented by block 718. The counter is used for diagnostic purposes to monitor the number of expected messages not received by the subject unit. A subroutine is then entered for the purpose of clearing the XPLST, as was previously described in connection with the flowchart of FIG. 21, as indicated by element 720.

The executive program causes various operations to be performed periodically. The periodic sequence, which takes place every sixty-four seconds in the present embodiment, includes an update of the System Priority SP value, the GOODLST and the FLST. In addition, a receiver failure test is conducted.

Figure 23A:
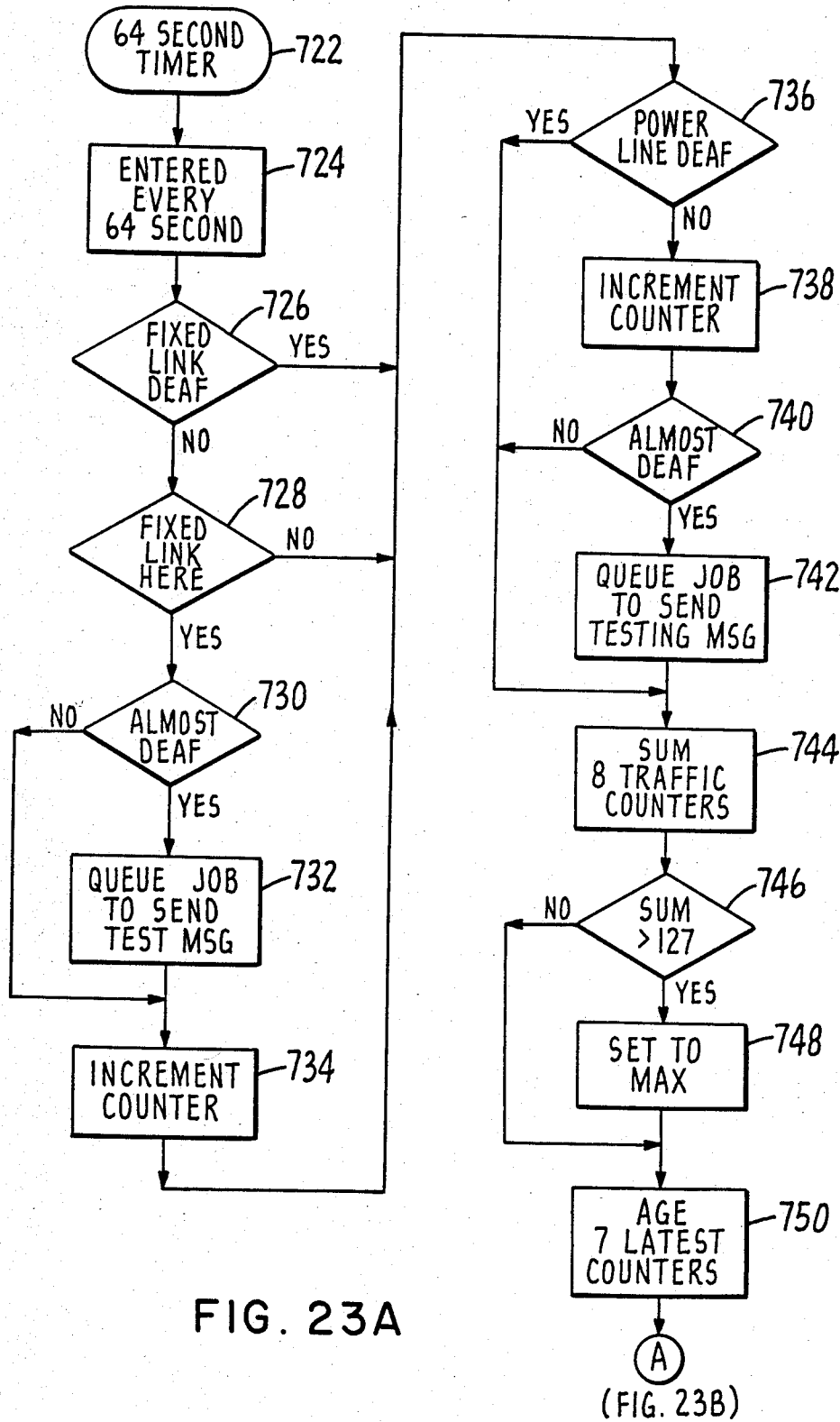
FIG. 23A-23C is a flowchart depicting a periodic sequence called by the executive program (FIG. 6) for updating and checking various network parameters.
Figure 23B:
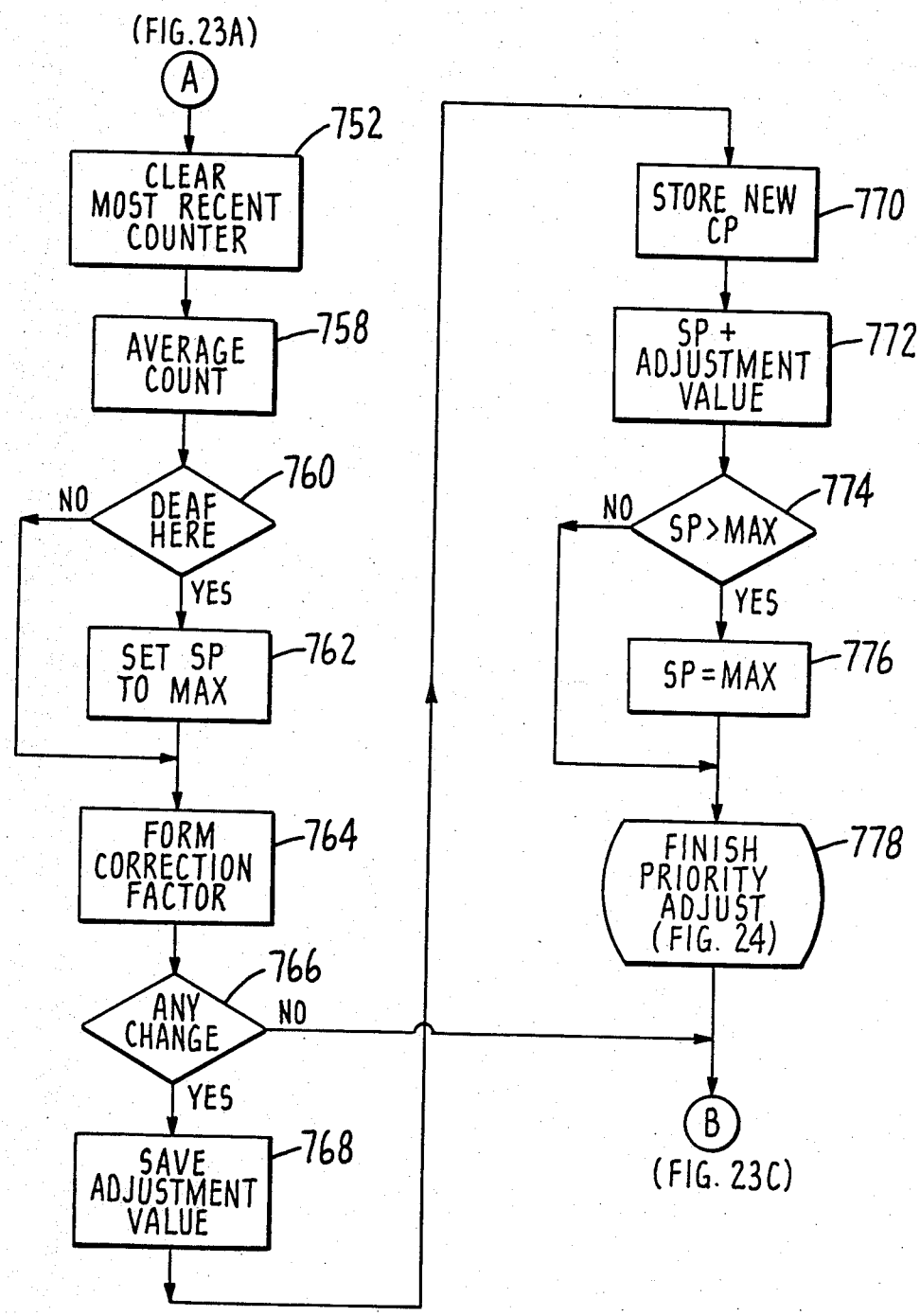

Entry into the periodic sequence is represented by element 722 of the flowchart of FIG. 23A. As represented by block 724, the sequence takes place every sixty-four seconds. The initial portion of the sequence serves to test the receiver portion of the subject unit.

A determination is first made as to whether the subject remote unit is capable of receiving messages over the fixed link. It is possible that there had been a previous determination that the subject unit cannot receive message over the fixed link. In that case, it will not be necessary to test the fixed link input. As indicted by element 726, a determination is made as to whether a previous failure had been detected by examining an appropriate internal flag. If no failure had been detected, a determination is made as to whether the subject unit is connected to a fixed link, as represented by element 728. If there is no associated link, the test is bypassed.

In the present embodiment, a test message, previously referred to as a link test message (FIG. 7B, element 156), is transmitted in the event a message has not been received for a time period approximately equal to 4.5 hours minus 15 minutes. As represented by element 730, a determination is made as to whether a fixed link message has not been received during such time period. If a message has not been received, a job will be queued to transmit a link test message, as represented by block 732. The message will be transmitted over both the power line and the fixed link, with the message transmitted over the power line serving no test purpose. The link test message is a message type which is not designated as either an up or a down link message. Remote units receiving messages of this type over the fixed link will transmit a responding message over the link (and power line), as previously described.

As represented by block 734, a counter for measuring the 4.5 hour time period is incremented to indicate that 64 seconds have lapsed. In the event the subject unit does not receive any responding message within the 4.5 hour period, the unit will assume that it is not capable of receiving messages over the fixed link. An associated flag is set indicating that the subject unit cannot receive messages over the fixed link. In the event the subject remote unit receives a message over the fixed link, the 4.5 hour counter is reset.

Once the fixed link receiver operation has been tested, a determination is made as to whether it had been previously established that the subject unit is no longer capable of receiving message over the power line, as represented by element 736. If an appropriate internal flag indicates that the power line input has failed, the test is bypassed. If the flag is not set, a counter is incremented which is used to monitor receipt of power line message, as represented by block 738. The counter will be reset every time a message is received over the power line.

If a message is received over the power line at least once every 4.5 hours, it is assumed that the unit is capable of receiving power line messages. A determination is made as to whether the 4.5 hours period has almost lapsed, as represented by element 740. If only 15 minutes remain, a job is queued to transmit a testing message, as represented by block 742. The testing message may be any type of down link message for which a reply message is expected. If the reply message or any other message is not received over the power line before the 4.5 hour period lapses, the counter will time-out. It will then be assumed that the subject unit is not capable of receiving messages over the power line. In the event there are no valid addresses present in the GOODLST of the unit, the subject unit will then proceed to periodically transmit down link messages containing a data package for the master unit so as to maintain a limited degree of operation. As previously described, such messages, sometimes referred to as deaf node messages, have a Global Sequence Number of all ones. If the subject unit is capable of receivino messages over the fixed link it is possible that the GOODLST will be updated such that valid down link addresses remain. Accordingly, deaf node messages need not be transmitted.

Once the job has been queued to transmit a test message, or in the event it has been determined that the 4.5 hour period has not almost lapsed, the periodic testing of receiver operation is completed. A periodic sequence for updating the System Priority SP is then commenced. As previously described, the value of SP is updated each time a message is received, based upon the Measured Priority MP contained in the message and the local Calculated Priority CP for the subject unit, with the latter being a measure of local message traffic. The value of SP is also updated every sixty-four seconds to reflect any changes in CP as a result of changes in local message traffic. Thus, for example, if the local message traffic has increased significantly since the last message has been received, the value of SP will be adjusted as required, thereby decreasing the probability of transmitting messages in accordance with equations (1) and (2).

The subject remote unit is provided with eight message traffic counters which count the number of messages received in eight consecutive sixty-four second periods. As represented by block 744, the counts for the eight counters are summed. A determination is then made as to whether the sum exceeds a maximum value of 127 messages, as represented by element 746. If the maximum is exceeded, the sum is set equal to the maximum, as represented by block 748.

The seven newest message counters are aged (shifted), as represented by block 750, with the oldest count being discarded. The most recent message counter is then cleared, as indicated by block 752 of FIG. 23B, so that messages can be counted during the subsequent sixty-four second period. Thus, the eight counters will contain the total number of messages received and transmitted during the last eight sixty-four second periods. The sum of the eight counters are averaged, as shown by block 758, by dividing the sum (block 744) by eight. This is accomplished by deleting the three LSBs of the eight bit value. The averaged value represents the local Calculated Priority CP for the subject unit and will be used to produce a new System Priority.

In the event it has been established that the subject unit is deaf, i.e., not capable of receiving messages over the power line and no valid down link addresses are present in the GOODLST, the resultant periodic status messages transmitted to the master by the deaf unit are assigned a relatively low priority. As indicated by element 760, a determination is made as to whether the subject unit is deaf. If the unit is deaf, the new value of CP is ignored and the value of SP is set to the maximum of 17. Thus, the effective rate at which the subject unit transmits status messages is reduced.

If the subject unit is not deaf, an adjustment value is computed by subtracting the new value of CP from the old value, with the correction factor being either polarity. A determination is then made as to whether there is any change to be made, that is, whether the adjustment value is non-zero, as indicated by element 766.

If there is no change, the sequence for updating the value of SP is bypassed. As represented by block 768, if the adjustment value is non-zero, the factor is saved. In addition, the new value of CP is stored for use in the subsequent message period, as represented by block 770.

The adjustment value is then added to the present value of SP, as indicated by block 772, to arrive at a new value of SP. A determination is then made as to whether the new value of SP exceeds the maximum value of 17, as indicated 774. If the maximum is exceeded, SP is set equal to the maximum, as indicated by block 776. The subroutine previously described in connection with the flowchart of FIG. 24 is then entered for the purpose of adjusting the probability timer in accordance with the new value of SP.

Figure 23C:
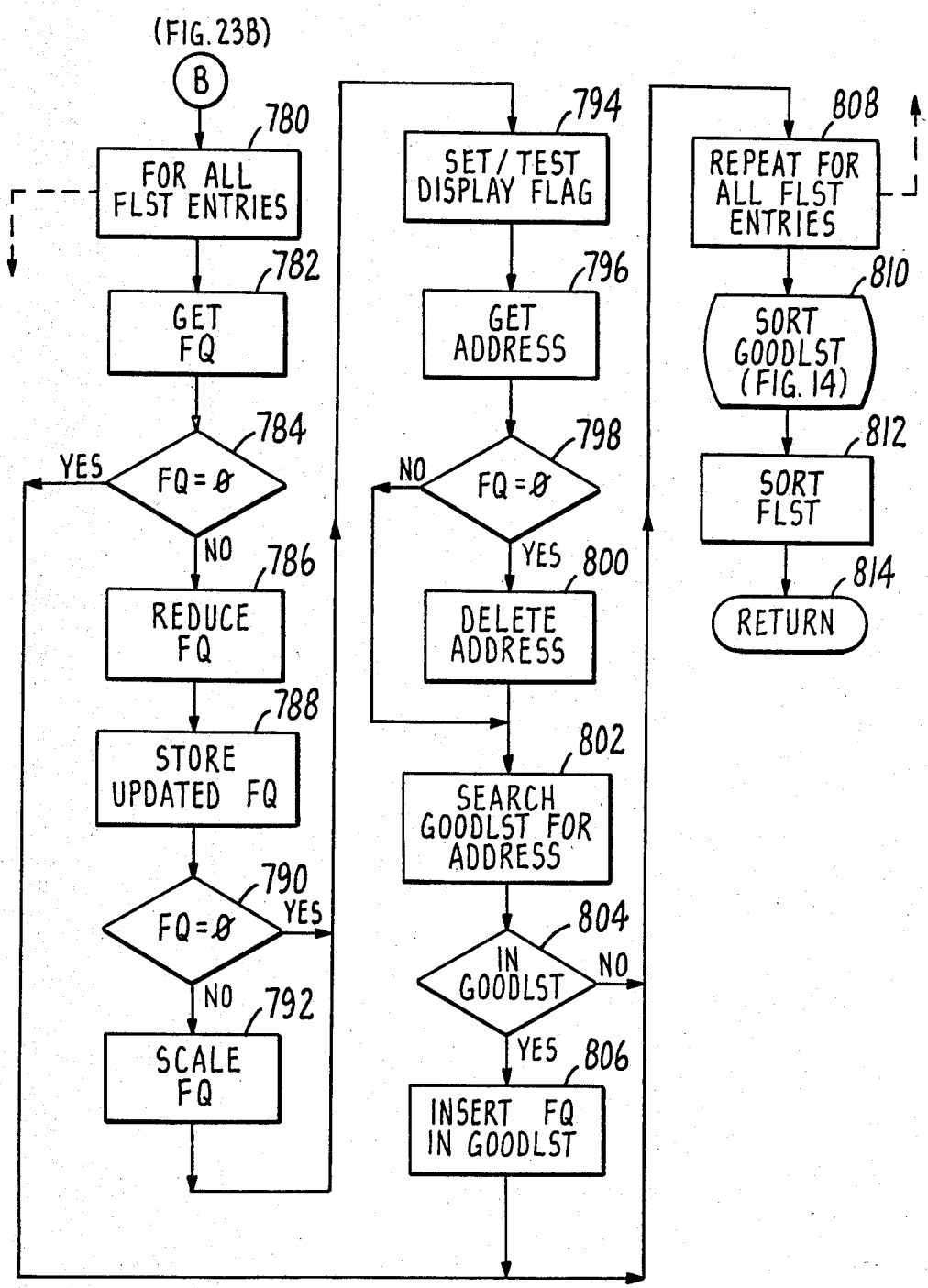

The periodic sequence then proceeds to the FIG. 23C flowchart which depicts the manner in which the FLST and GOODLST are updated once each sixty-four second time period. As represented by blocks 780 and 808, each FLST entry is successively examined and updated, if required. The value of FQ of the entry under consideration is first obtained, as indicated by block 782. A determination is then made as to whether the value of FQ is zero. If the value is zero, the value is left unchanged and the next FLST entry is examined, the address of the entry will have been deleted.

If the value of FQ is non-zero, the value of FQ is reduced by one, as represented by block 786. As previously noted, such periodic reductions of FQ for each FLST entry is performed for the purpose of clearing inactive list entries and for the purpose of permitting the address to be considered for entry on the GOODLST. As previously noted, an address has to have a FQ of 127 or less to be entered on the GOODLST. The reduced value of FQ is then stored.

As previously described, the value of FQ in the FLST is an unscaled value and the value of FQ in the GOODLST a scaled value. The GOODLST value is obtained by eliminating the three LSBs of the FLST value.

As indicated by element 790, a determination is then made as to whether the value of FQ has been reduced to zero. If FQ is zero, there is no requirement for scaling FQ for the GOODLST. If the value is not zero, FQ is scaled, as represented by block 792. A routine for updating the display to reflect the new value of FQ is then entered, as indicated by block 794.

The address of the FLST entry under consideration is then obtained, as represented by block 796. This address will be utilized to search the GOODLST for an entry. A determination is again made as to whether the value of FQ for the entry has been reduced to zero, as represented by element 798. If FQ is zero, the address of the entry is deleted from the FLST, as indicated by block 800.

Once the address has been deleted from the FLST, if required, the GOODLST is searched for the entry, as shown by block 802 and element 804. If the entry is present, the scaled value of FQ is inserted in the GOODLST, as indicated by block 806. Once FQ has been inserted, or in the event the entry is not present in the GOODLST, the next FLST entry is examined. The sequence continues until each FLST entry has been examined and updated, if appropriate, as indicated by block 800.

Once the entire FLST has been updated, the GOODLST is sorted to reflect any changes in the value of FQ. Entry into the subroutine for sorting the GOODLST is represented by element 810 and was previously described in connection with the FIG. 14 flowchart. Next the FLST is sorted, as indicated by block 812, thereby concluding the periodic sequence. As represented by element 814, the sequence then returns to the executive program.

Figure 25:
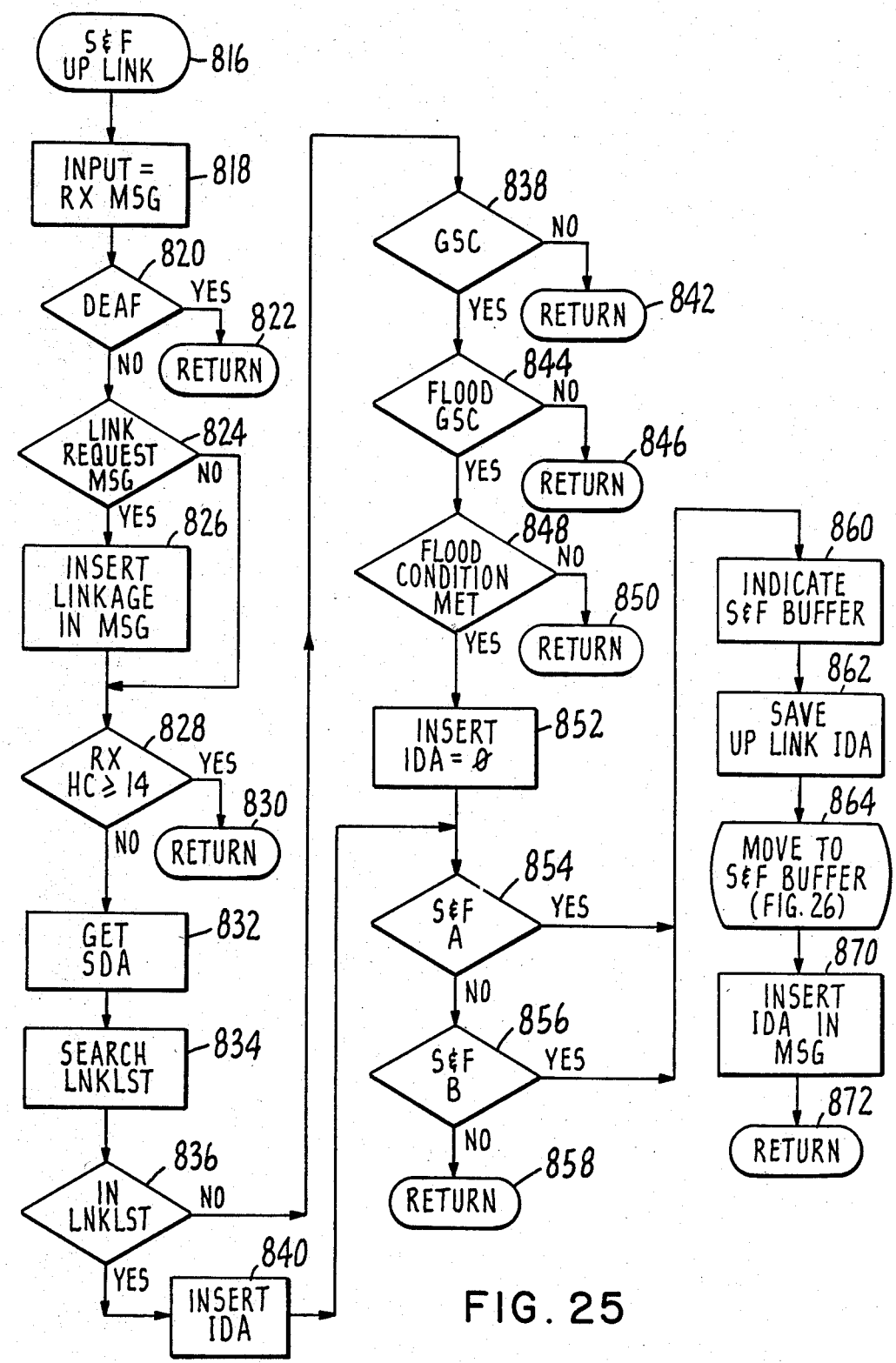
FIG. 25 is a flowchart depicting an initialization sequence for storing and forwarding a data package wherein a message will be transmitted in the up link direction.

In the event the received message is an up link message having a Source/Destination Address SDA other than that of the subject unit and is directed to the subject unit, the data package will be stored and forwarded in the up link direction. The store and forward up link sequence is depicted by the flowchart of FIG. 25. Entry into the sequence, which is called by the executive program, is represented by element 816.

As represented by block 818, the received message represents the sequence input. A determination is then made as to whether the message is a deaf node message, as indicated by element 820. If the GSN of the message is all ones, indicating that the message is a deaf node message, the data package should not be stored and forwarded in the up link direction. As shown by element 822, the sequence will return to the executive program.

If the message is not a deaf node message, a determination is made, based upon message type, as to whether the message is a link request message, as represented by element 824. A link request message is a message which is utilized for diagnostic purposes wherein the address of each node transmitting the message is inserted in the data package of the message so that the path taken by the message can be determined. If the message is a link request message, the address of the subject remote unit is inserted in the data package to be stored and forwarded, as indicated by block 826.

The Hop Count HC value of the received message is then examined, as represented by element 828. If the value of HC is greater or equal to fourteen, the message should not be transmitted up link since it is likely that the message is lost. As represented by element 830, the sequence will then return to the calling program.

If the value of HC is proper, the SDA of the message is examined, as indicated by block 832. This address represents the final destination of the data package and is used to locate the appropriate up link address in the Link List LNKLST.

As represented by block 834, the LNKLST is searched. A determination is made as to whether the SDA of the message is present in the LNKLST, as represented by element 836. If the SDA is present, the associated IDA of the LNKLST entry is obtained and inserted in the message, as represented by block 840.

It is not likely that the SDA of a Global Sequence Command GSC will be present in the LNKLST of a remote unit since there is no previous corresponding down link message. However, if the SDA is present, the command information will be stored and forwarded in the same manner as a conventional up link message, with the IDA of the GSC being taken from the LNKLST.

If the received message SDA is not present in the LNKLST, the message type of the message is examined, as indicated by element 838, to determine whether the message is a GSC. If the message is not a GSC, the data package will not be stored and forwarded. As indicated by element 842, the sequence will return to the executive program.

If the message is a GSC, a determination is made as to whether the message is either one of the two flood commands, as indicated by element 844. If the command is either one of the of the two non-flood commands (directed and store and forward) and if the SDA of the message is not present in the LNKLST (element 836), the command information will not be stored and forwarded. As shown by element 846, the sequence will then return to the calling program.

If the message is either of the two flood commands, a determination will then be made as to whether the conditions for storing and forwarding the command information are met. If the flood command is a total flood command, it is necessary that there be either a valid (non-zero) address present in the LNKLST of the subject remote unit or that the unit be coupled to a fixed link. If the flood command is a fixed link flood command, it is necessary that the remote unit be connected to a fixed link.

If the appropriate flood condition is not met, the flood command information will not be stored and forwarded. The sequence will then return to the executive program, as represented by element 850. If the appropriate condition is met, the IDA of the message is set to all zeros, as indicated by block 852.

The up link message sequence will be continued in the event the SDA of the message is in the LNKLST or in the event the message is a GSC, if appropriate. It should be noted that it is possible that one or more remote units, particularly units located up link from the subject unit, will not receive the command information during this stage of the sequence. The subject system is implemented to ensure that all remote units will eventually receive the command, even though a unit may not be intended to act upon the command other than updating the ACR for the unit.

As previously described, each unit is adapted to periodically initiate a down link message sequence with message containing a data package relating to power consumption data. The message will be of the type for which a reply is expected. When the reply message is received, the Global Sequence Number GSN of the message will differ from either the local GSN or the ACR of the receiving unit if one or more commands have not been received. In addition, any other message which the unit is capable of receiving will also have a GSN indicating that commands have been missed. The unit will then transmit a down link message informing the master of the last GSC received by the remote unit. In addition, the process of transmitting such message will cause the SDA of the transmitting unit to be added to the LNKLST of one or more units. This increases the likelihood that the unit will receive flood commands without the necessity of the unit requesting them. Nonflood commands must always be requested unless the unit heard the command, as opposed to learning of the missing command by examining the GSN of a message.

Returning to the FIG. 25 flowchart, once the IDA of the message has been determined (blocks 840, 852), the Store and Forward A buffer 82 (FIG. 5) is examined to determine whether the buffer is available for use, as indicated by element 854. If the A buffer is not available, the B buffer 84 is examined, as indicated by element 856. If neither buffer is available, the sequence returns to the executive program, as represented by element 858, and the message will not be forwarded.

If one of the two buffers is available, a pointer is directed to the available buffer, as represented by block 860. The up link address, the IDA of the message to be transmitted, is then stored, as represented by element 862. Once the address is stored, the message to be transmitted, including the data package of the received message, is transferred from the operate buffer 74 (FIG. 5) to the appropriate store and forward buffer. The transfer is accomplished utilizing a transfer subroutine which will subsequently be described in connection with the flowchart of FIG. 26.

The stored IDA is then inserted in the message to be transmitted, as indicated by block 870. The sequence will then return to the executive program, as represented by element 872. The actual transmit sequence will later be described in connection with the flowchart of FIG. 29.

Figure 26:
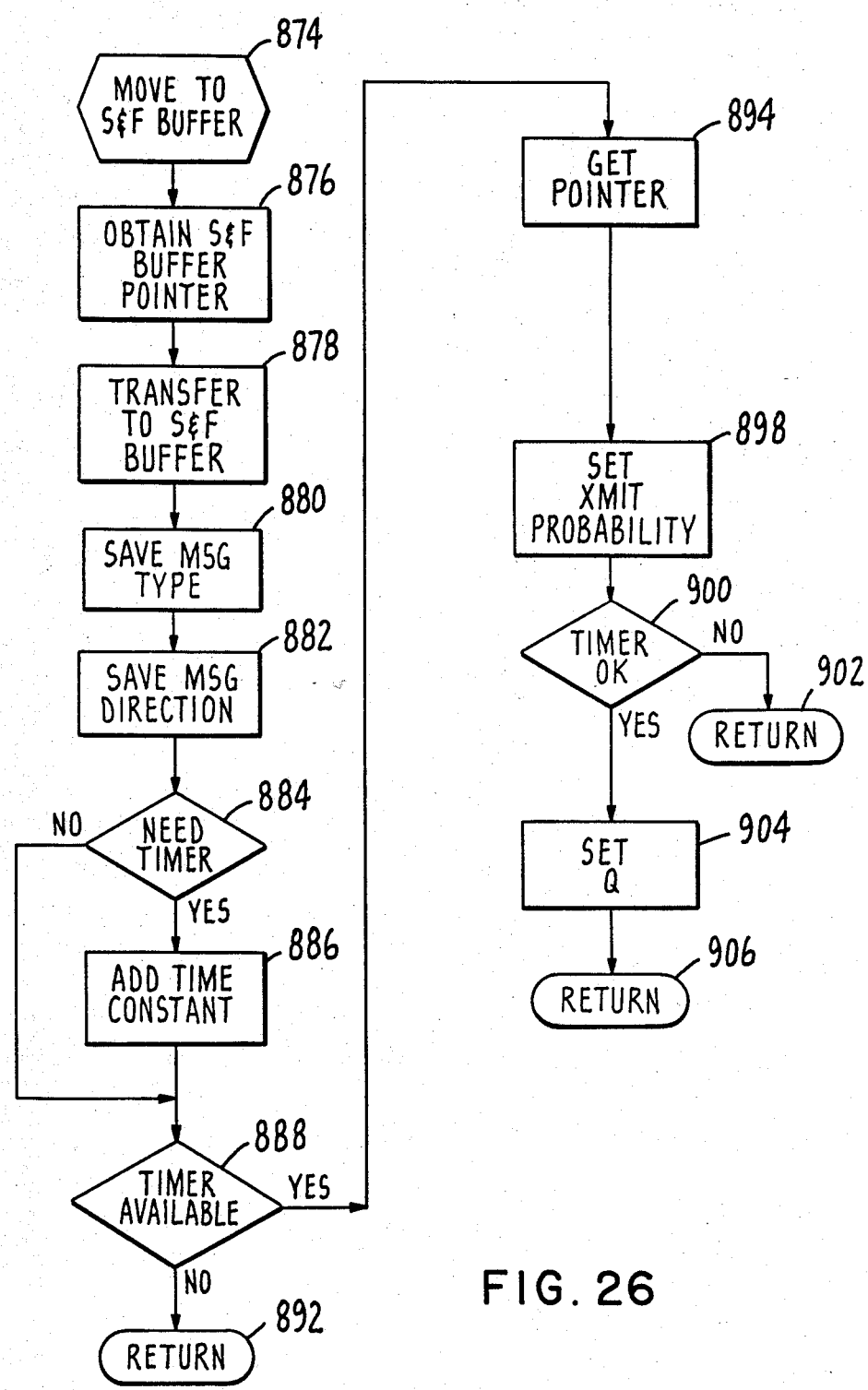
FIG. 26 is a flowchart depicting the sequence whereby up and down link messages are transferred from an input buffer to a store and forward buffer.

Referring now to FIG. 26, the subroutine for transfering messages from the operate to the store and forward buffer will be described. The subroutine is utilized for both up and down link operations.

Entry into the transfer routine is represented by element 874. The pointer directed to the appropriate store and forward buffer is obtained, and the message, including data package, is transferred to the buffer, as represented by block 876 and 878. The message type is then obtained and stored as represented by block 880. In addition, the message direction, either up or down link or neither, is obtained and saved, as represented by block 882.

A determination is then made, based upon the message type, as to whether the subject message requires an application timer, as represented by element 884. If an application timer is to be used, a fixed time constant is added to the initial application timer value present in the received data package. This fixed value, approximately 1.3 seconds (one message time) in the present embodiment, serves to compensate for the amount of time required the subject unit to receive the message.

Once the time constant has been added, if required, a determination is made as to whether a timer function is available from the timer function program, as represented by element 888. If a timer function is not available, it is not possible to store and forward the data package. As represented by element 892 the sequence will return to the executive program.

If a timer function is available, the pointer indicating the selected store and forward buffer is obtained, as represented by block 894. The probability transmit timer is then set, as represented by block 898. As previously described, a random number is selected and inserted in the 17 stage counter associated with the probability transmit timer. As also previously described, the message direction is then examined to determine the message priority NT, with NT representing the number of counter bits to be examined.

Once the probability transmit timer has been set, a determination is made as to whether probability transmit timer has been successfully set, as indicated by element 900. If a timer function had not been available, the message cannot be transmitted. As shown by block 902, the sequence will return to the executive program.

If a timer function is available, the Quality of back link value Q is set, as represented by block 904. As previously described, the value of Q is taken from the GOODLST entry for the remote unit for both up and down link messages.

Figure 29:
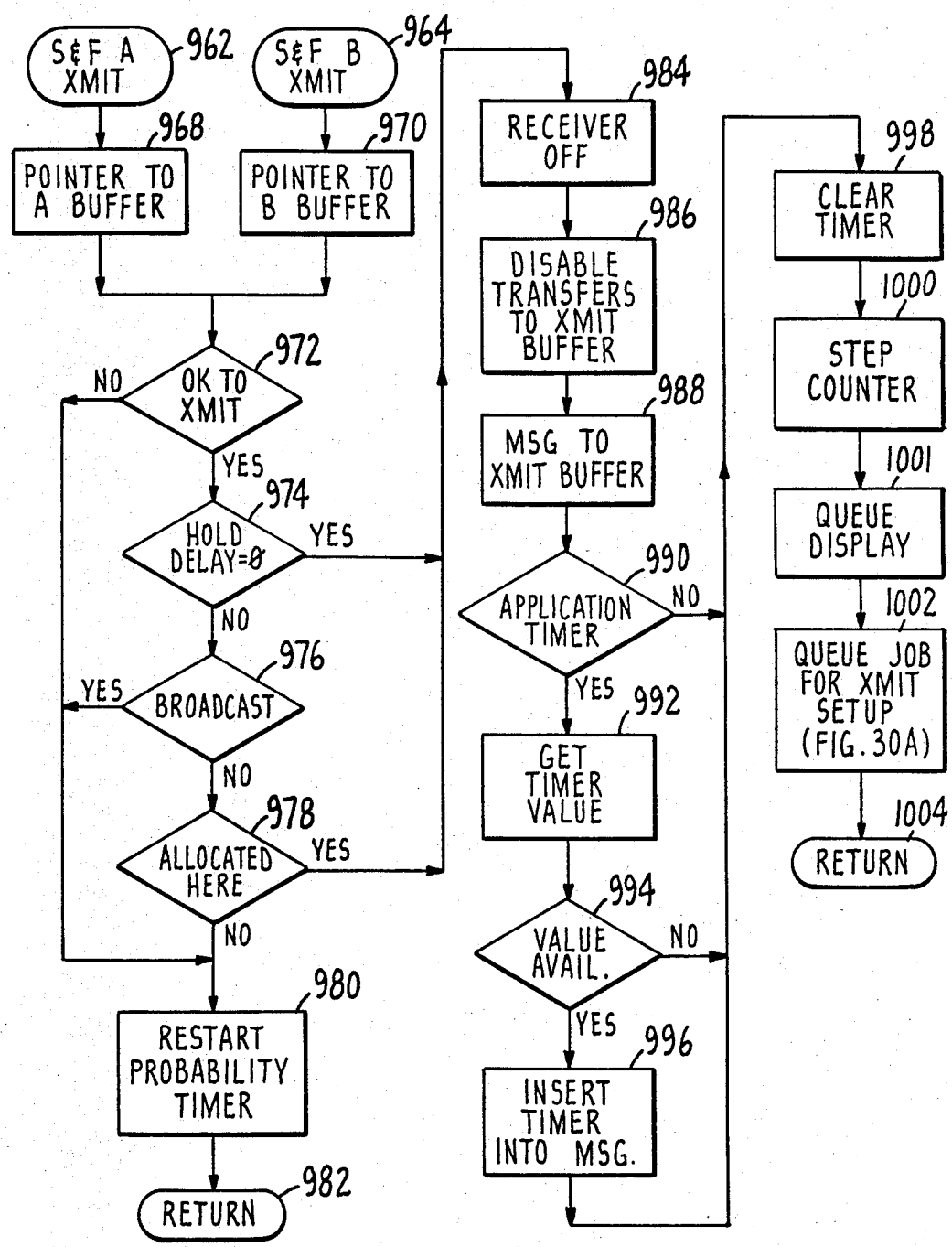
FIG. 29 is a flowchart for a sequence called by the executive program (FIG. 6) for transfering messages to be transmitted from the store and forward buffer to the transmit buffer.

The sequence involving the transfer of the message from the store and forward buffer to the transmit buffer is depicted in the FIG. 29 flowchart. The same sequence is used for either up or down link messages. The sequence is entered when the probability transmit timer bits under consideration (NI) are clocked to all zeros. Since the initial value of the counter is randomly selected, the time at which entry into the sequence occurs is not known unless NT=0.

In the event the message is present in the Store and Forward A buffer, entry into the sequence is represented by element 962. Entry into the sequence for the B buffer is represented by element 964. As shown by elements 968 and 970, the pointer is directed to the appropriate buffer, either A or B, respectively.

As represented by element 972, a determination is made as to whether it is proper to transmit over the network, by examining an associated transmit allowed flag. The flag will be set when another message is detected on the network by the subject remote unit.

If it is not proper to transmit at this time, no transmission is attempted. The probability transmit timer is restarted with a new randomly selected value, with NT remaining unchanged, as represented by block 980. The sequence will then return to the executive program, as indicated by element 982. The store and forward sequence will be reentered when the probability transmit timer times out.

If it is proper to transmit, a determination is then made as to whether the transmit hold delay timer is running, as represented by element 974. If the timer is not running, it is proper to transmit the message. If the timer is running, it may also be proper to transmit, provided the channel has been allocated to the data package SDA. In that event, a determination is made as to whether the message to be transmitted is a broadcast message as represented by element 976. A channel cannot be allocated to a broadcast message. Accordingly, a broadcast message will not be transmitted unless the channel is absolutely clear, i.e., not allocated to any remote unit.

If the message is not a broadcast message (element 976), a determination is made as to whether the channel has been allocated to the message SDA (element 978). Allocation of the channel is determined by first comparing the SDA of the message with the address contained in the LSTADD associated with the hold delay timer.

In the event the transmit hold delay timer is not running (element 974) or in the event the timer is running, but the channel has been allocated to the message SDA (element 978) it is appropriate to transmit the message, with a few minor exceptions. The receiver section of the subject unit will then be turned off, as represented by block 984. Next, steps are taken such that no messages subsequent to the present message will be transferred to the transmit buffer, as indicated by block 986. The subject message will then be transfered from the appropriate store and forward buffer to the transmit buffer, as represented by block 988.

A determination is then made as to whether there is an application timer running for the subject messsage, as shown by element 990. If a timer is running, the present timer value is obtained, as indicated by block 992.

A further determination is made as to whether a timer value is available, as indicated by element 994. If the timer value is not available, an anomaly has occurred and the application timer value present in the received data package will be used in the transmitted message in lieu of an application timer value. Thus, the message transit time can at least be approximated. If a timer function is available, it is inserted in the message, as represented by block 996. The timer function for the received message, if present, is then cleared, as represented by block 998.

Each unit maintains a record of the number of messages containing message information stored and forwarded by it for diagnostic purposes utilizing a counter. As represented by block 1000, the counter is incremented and the new value displayed. A job is then queued for carrying out a transmit setup sequence, which will be initially described in connection with the flowchart of FIG. 30A. Once the job has been queued, the sequence returns to the executive program, as indicated by element 1004.

Figure 30A:
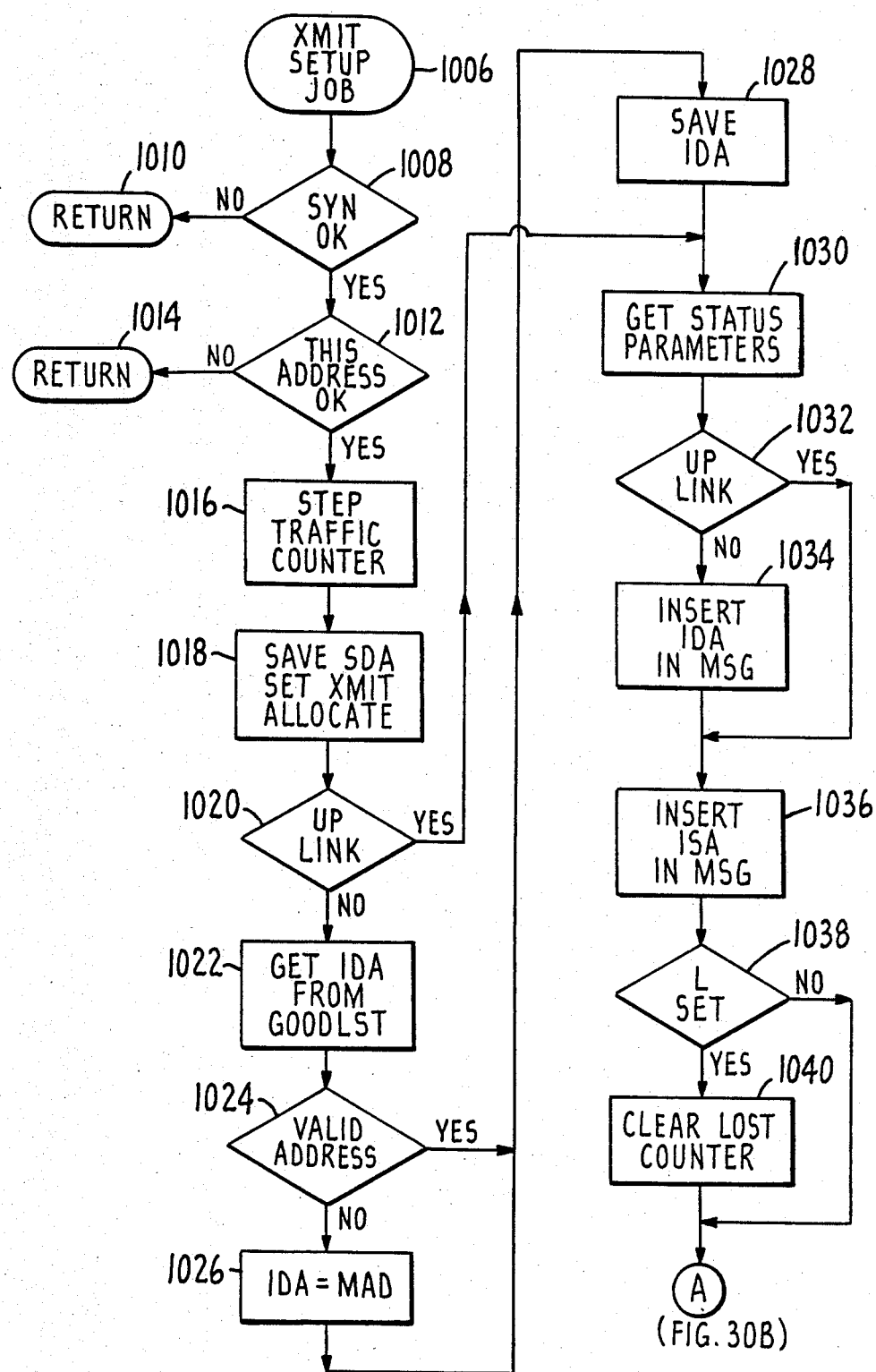
FIG. 30A-30B is a flowchart called by the executive program (FIG. 6) depicting the final transmit sequence for messages.

Referring now to FIG. 30A, entry into transmit setup sequence is represented by element 1006. The sequence is utilized for all messages transmitted by the subject unit, including up and down link store and forward messages and messages containing a data package originated by the subject unit.

An initial determination is made as to whether the subject unit has been properly programmed to transmit messages. The System Number SYN associated with the subject unit is first examined to confirm that the SYN is non-zero, as indicated by element 1008. If the SYN is zero, the sequence will return to the executive program, as represented by element 1010.

Assuming that the SYN is proper, a determination is then made as to whether the address of the subject remote unit is valid or non-zero, as indicated by element 1012. If the address is not valid, the sequence returns to the executive program, as represented by element 1014, otherwise the associated message traffic counter is incremented, as shown by block 1016. The message traffic count includes both messages received and messages transmitted by the subject unit and is used to compute Calculated Priority CP, as previously described (FIG. 23A, blocks 744, 758). Messages received and transmitted by the unit will cause the counter to be incremented twice.

The Source/Destination Address SDA of the message to be transmitted is then stored in the LSTADD, thereby indicating that the channel is to be allocated to the address. In addition, the transmit allocate flag is set, as represented by block 1018.

Once the allocation is made, a determination is made as to whether the message is an up link message, as indicated by element 1020. Assuming that the message is not up link, the message may be either down link or have no message direction. In that event, the best down link address, or IDA, is obtained from the top of the GOODLST, as indicated by block 1022.

It is possible that the GOODLST does not contain a valid or non-zero address. As represented by element 1024, if no valid address is present, the IDA of the message is set equal to the master unit address as a fall back. The message will, therefore, not be successfully comunicated to the master unless the master unit is capable of receiving messages directly from the subject remote unit The selected IDA is then saved, as indicated by block 1028. Certain selected message status peramaters are then obtained, including Q, and Hop Count. The value of Q is obtained from the top entry in the GOODLST of the subject remote unit for all messages. A preliminary value of the Hop Count is obtained from the received message, in the event the message to be transmitted is up link. If the message is not up link, the preliminary value of HC is obtained from the top GOODLST entry.

As represented by element 1032, a determination is again made as to whether the message is up link. If the message is not up link, the saved IDA obtained from the GOODLST (block 1022) is inserted in the message at this point, as represented by block 1034. If the messsage is up link, the IDA will be inserted at a later point. The address of the subject remote unit is then inserted in the message as the Intermediate Source Address ISA, as represented by block 1036.

The value of the Link confirmed flag L for the message to be transmitted is then determined. If the local flag L for the subject remote unit and the received value of L are both set, the value of L in the transmitted message will be set. For all other combinations, the transmitted flag L will be cleared.

Each remote unit is adapted to assist, under certain circumstances, surrounding remote units which appear not to be capable of communicating with the master unit. Such remote units, previously referred to as lost nodes, transmit messages having a HC equal to 15. In the event a message from a lost node is received, the subject remote unit may initiate a down link message sequence by transmitting a down link status message, with the particular message type not being critical. The down link message may provide the lost node with sufficient information, typically a suitable down link address, to enable the node to communicate with the master unit.

A lost message counter is maintained for keeping track of such lost messages, as previously described (FIG. 7E, block 292). If one or more lost messages have been received, the lost message counter is incremented. Once every five minutes, a sequence is entered at which time the contents of the counter are examined. If a count is present, a job may be queued to transmit a down link status message to assist lost nodes.

It is not necessary to transmit a status message if a message is to be transmitted in any event. Accordingly, the value of L in the message to be transmitted is examined, as represented by element 1038. If the flag L is set, the lost message counter is cleared since a message will be transmitted which is likely to be helpful to a lost node, as represented by block 1040. If L is zero, the message to be transmitted is not likely to be useful to a lost node. Accordingly, the lost message counter will not be cleared. The transmit setup sequence is continued on the FIG. 30B flowchart.

Figure 30B:
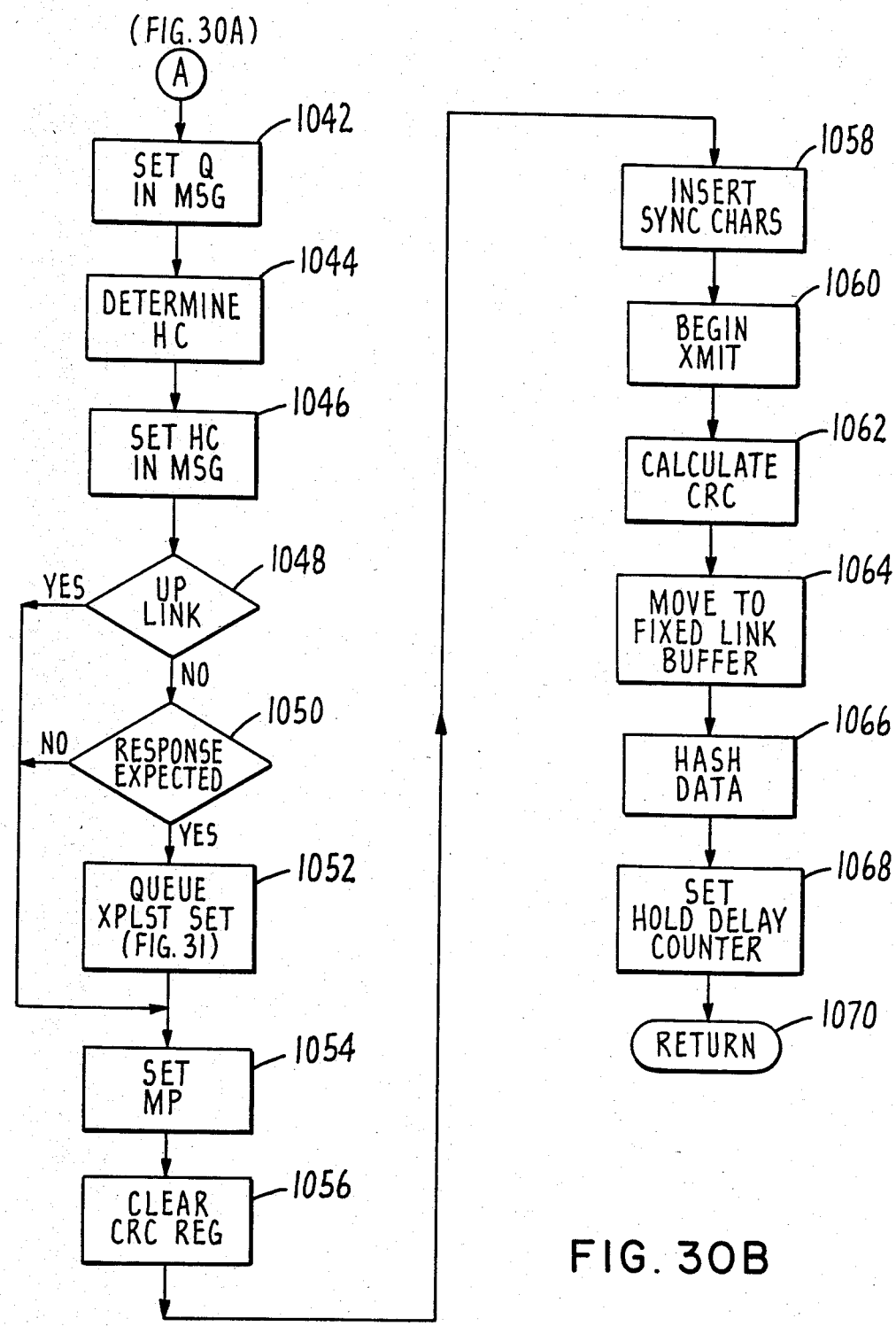

Referring now to FIG. 30B, the value of Q is then inserted in the message to be transmitted, as represented by block 1042. Once the value of Q has been inserted, the HC of the message is computed by adding one to the previously-determined preliminary value of HC (block 1030), as represented by block 1044. In the event HC exceeds the maximum of 15, the maximum value is used. The value of HC is then inserted in the message, as shown by block 1046.

A determination is then made as to whether the message to be transmitted should be added to the expected list XPLST. As represented by elements 1048 and 1050, respectively, no additions are made to the XPLST unless the message is not an up link and unless the message is of the type for which a reply is expected. If appropriate, a job is then queued for making an entry on the XPLST, as represented by block 1052. The sequence for making an XPLST entry will be subsequently described in connection with the FIG. 31 flowchart.

Once the XPLST entry is made, if required, the value of Measured Priority MP to be inserted in the message is then determined. The value of MP is set equal to the larger of CP or the value of MP in the received message if the sequence is a store and forward operation. If the message is not a store and forward message, there is no corresponding preceding message; therefore the transmitted value of MP is set equal to CP.

The registers for holding the Cyclic Redundancy Code CRC bits are then cleared, as represented by block 1056. Next, the synchronization bits are inserted in the message, as indicated by block 1058. Although the message is not completely formed, transmission of the message will then commence, as represented by block 1060.

While the synchronization bits of the message are being transmitted, the Cyclic Redundancy Code CRC bits of the message are calculated and inserted, as represented by block 1062. A duplicate of the message present in the transmit buffer, with the exception of the synchronization bits, is then transferred to the fixed link buffer 98 (FIG. 5), as represented by block 1064. This transfer will only take place if the subject remote unit is connected to a fixed link. The duplicate messages will be transmitted simultaneously over the power line and fixed link.

The data of the message in the transmit buffer are then hashed in the conventional manner, as indicated by block 1066. A hashing factor is then inserted in the message for use in unhashing the data at the receiving units. The data are not hashed for messages transmitted over the fixed link.

The transmit hold delay timer for the subject remote unit is then set. If the message type indicates that the message is a variable delay, the delay will be a function of the Hop Count HC value in the message to be transmitted. The value of HC used to determine the hold delay duration differs slightly from the value of HC present in the message to be transmitted. In most instances, the value of HC used to control the hold delay is set equal to the message HC plus one. If the message to be transmitted is lost, the value of HC for the hold delay timer is the message HC plus two. Since a lost message is defined as having an HC of 15, the value of HC for controlling the hold delay timer is 17. If the message to be transmitted contains a set MFF, for purposes of controlling the hold delay timer, the message is assumed to be of the type calling for a variable delay, as set forth in equation (4). As previously noted, a transmit allowed flag is set when a message is received. Once the transmission has been completed, the receiver section is turned back on and the transmit allowed flag is cleared.

The sequence then returns to the executive program, as represented by element 1070.

Figure 31:
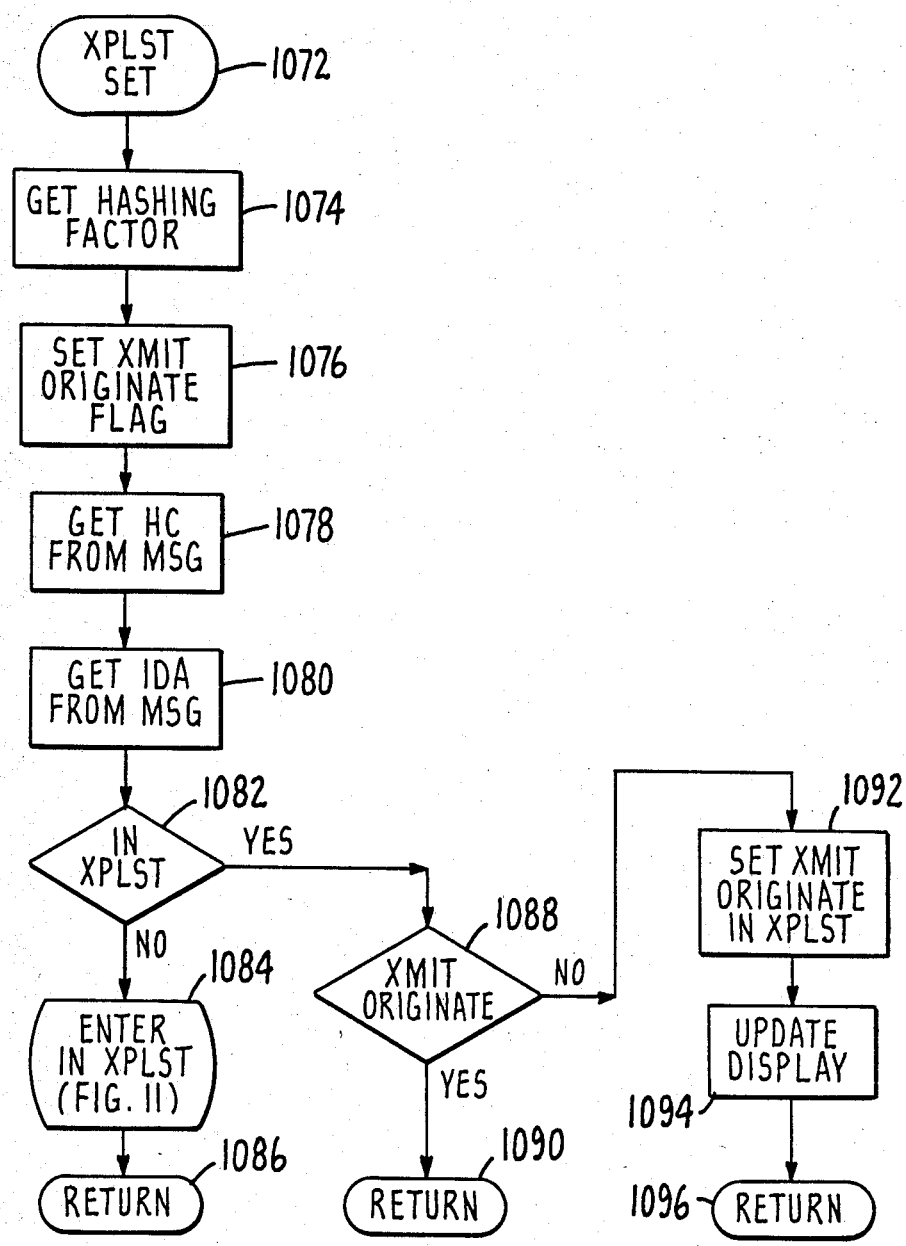
FIG. 31 is a flowchart for a sequence called by the executive program (FIG. 6) depicting the manner in which an entry into the Expected List is made.

The job which was queued for making an entry in the XPLST (block 1052) is depicted in the flowchart of FIG. 31. Entry into the job, which is actually commenced after the message has been transmitted, is represented by element 1072. A duplicate of the message which was transmitted will have been stored in the subject unit. The hashing factor of the message is extracted so that the message may be unhashed, as represented by block 1074.

The transmit originate flag, which is stored, is set, as indicated by block 1076. The HC and the IDA are then extracted from the message just transmitted, as represented by blocks 1078 and 1080, respectively.

A determination is then made as to whether the address is already present in the XPLST, as represented by element 1082. If the address is not on the XPLST, the subroutine for adding the address to the list is entered, as represented by element 1084. The subroutine was previously described in connection with FIG. 11. Once the subroutine has been completed, the job is completed and the sequence will return to the executive or calling program, as indicated by block 1086.

If the address is on the XPLST, the XPLST entry is examined to determine whether the associated transmit originate flag has already been set, as represented by element 1088. If the flag is set, the sequence returns to the calling program, as represented by element 1090, otherwise, the flag is set, as indicated by block 1092. The failure timer time period is not changed.

Once the flag has been set, the display is updated to reflect the change in the XPLST, as represented by element 1094. Once the display has been updated, the sequence will return to the executive or calling program, as indicated by element 1096.

Figure 27:
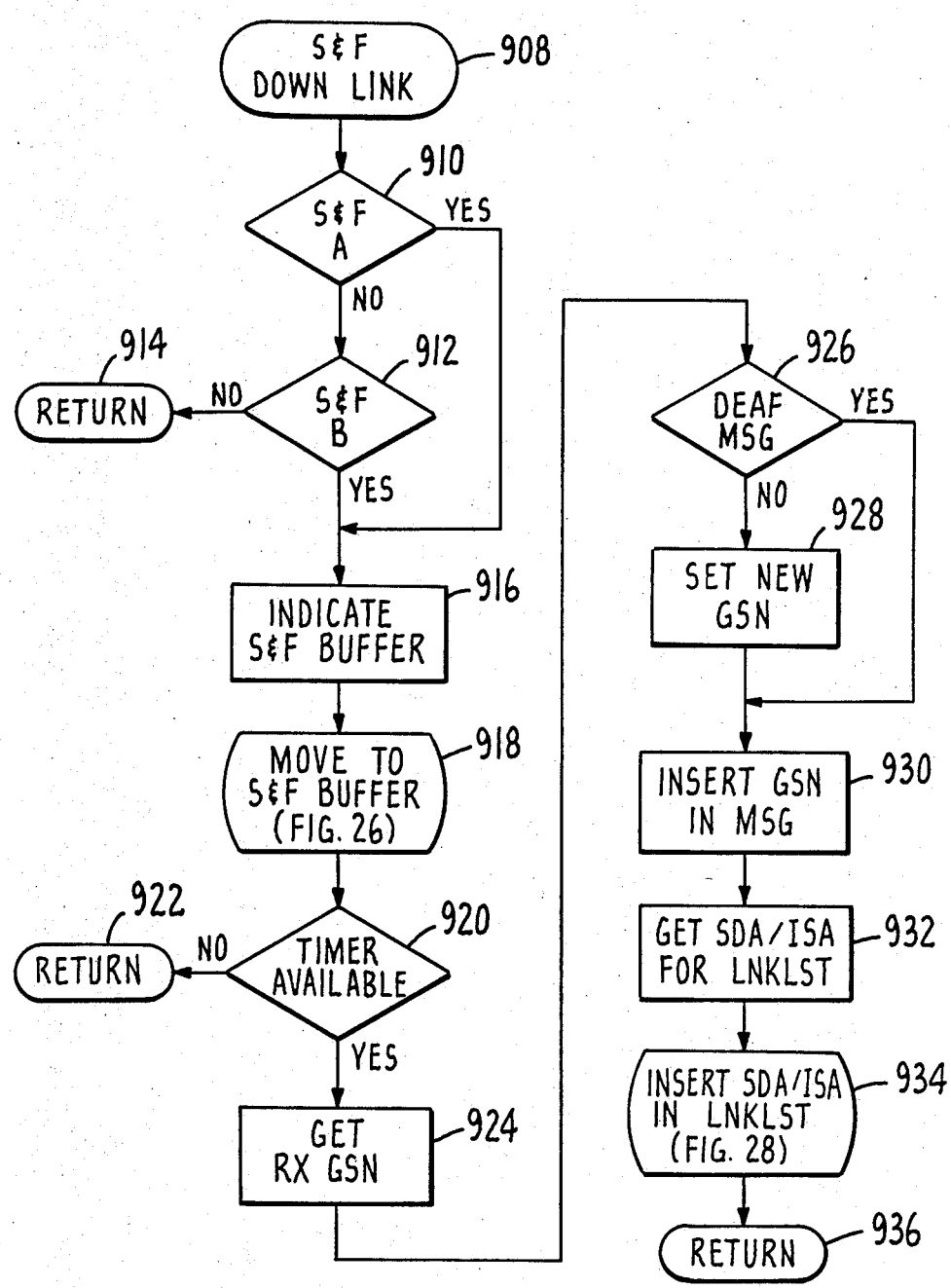
FIG. 27 is a flowchart depicting an initialization sequence for storing and forwarding a data package wherein a message will be transmitted in the up link direction.

The transmission sequence for storing and forwarding data package in down link messages is somewhat similar to that for up link messages, except that the down link operation depicted in FIG. 27 is used rather than the up link operation depicted in FIG. 25. The up link store and forward operation commences when the previously-set probability transmit timer times out.

Referring now to FIG. 27, entry into the down link sequence is represented by element 908. As represented by elements 910 and 912, a determination is first made as to whether either store and forward buffer is available. If neither is available, the sequence returns to the executive program, as represented by element 914.

If a buffer is available, a pointer is directed to the first available buffer, as indicated by block 916. A subroutine is then entered for transfering the message to be transmitted from the operate buffer to the selected store and forward buffer, as represented by element 918. The subroutine was previously described in connection with the FIG. 26 flowchart.

Once the transfer is completed, a determination is made as to whether a timer function is available for the probability transmit timer, as indicated by element 920. If the timer function is not available, the message cannot be transmitted, therefore the sequence will return to the executive program, as represented by element 922.

If the timer is available, a determination is made as to whether the message originated from a deaf remote unit. As indicated by block 924, the Global Sequence Number GSN of the received message is obtained. A determination is then made, as represented by element 926, whether the GSN is all ones. If all ones, the message is from a deaf node and the GSN of the transmitted message will be left at all ones. If the message is not a deaf node message the local GSN of the subject remote unit, which represents the latest Global Sequence Number GSN received by the unit, will be used, as represented by block 928. The GSN, either all ones or the local GSN, is inserted in the message to be transmitted, as represented by block 931.

The SDA of the received message is then obtained for entry into the Link List LNKLST, as shown by block 932. As previously described, LNKLST entries are made during the down link portion of a virtual link and provide up link addresses for the up link half of the virtual link.

Figure 28:
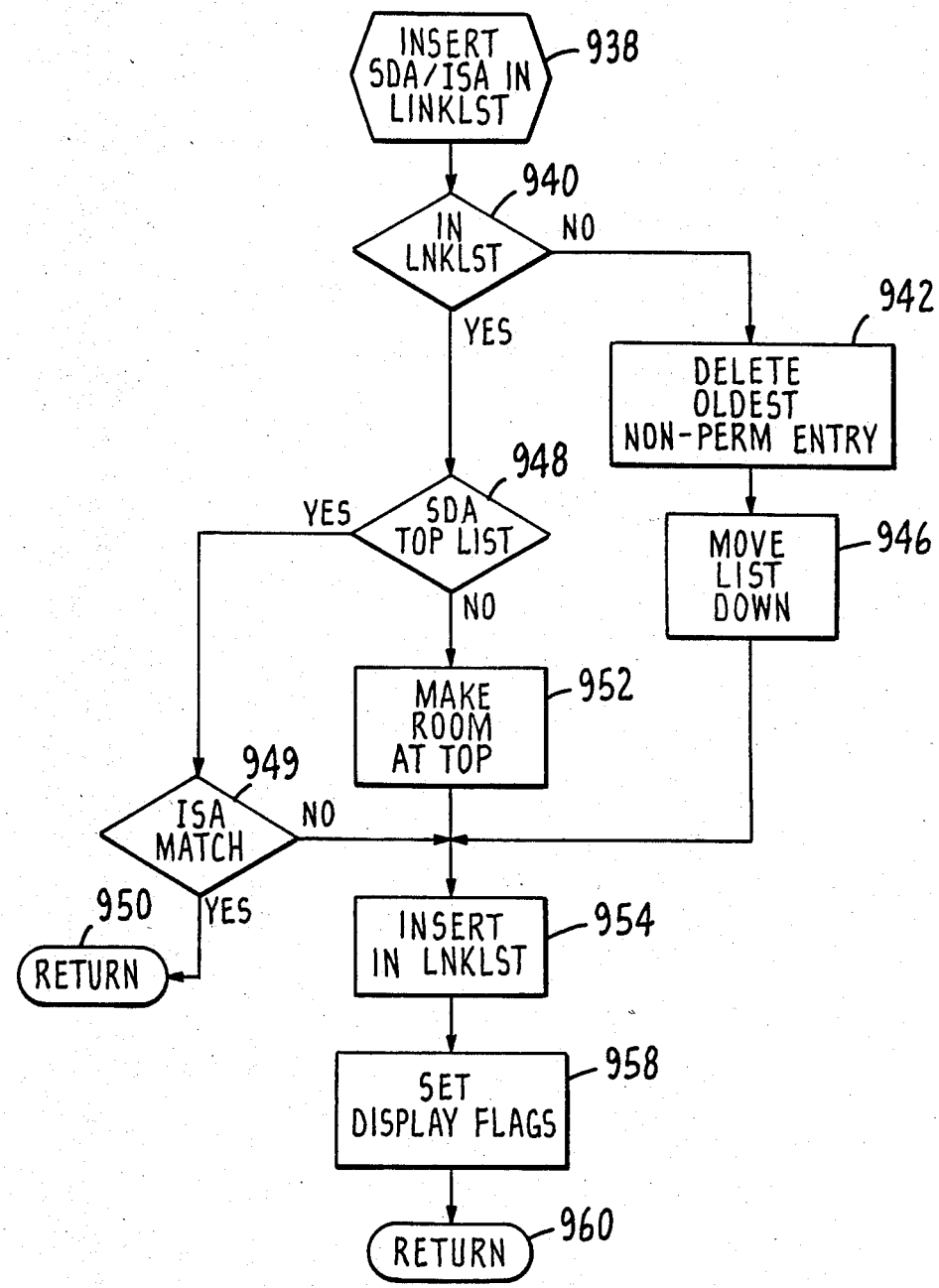
FIG. 28 is a flowchart for a subroutine depicting the manner in which address entries are made into the Link List.

The subroutine for inserting the SDA and associated ISA in the LNKLST, represented by element 934, is depicted in the flowchart of FIG. 28. Entry into the routine is represented by element 938. A determination is first made as to whether the SDA is already present in the list, as indicated by element 940. If the entry is not present, the oldest present entry is deleted as indicated by block 942. There are certain entries, which are referred to as permanent entries, that should never be removed from the list once entered. Permanent entries in the LNKLST include addresses for critical remote units which may then be accessed by the master unit without the use of Global Sequence Commands. Accordingly, the oldest non-permanent entry will be deleted.

Once the deletion has been made, all entries above the deletion are moved down on the list to fill the deleted space, as shown by block 946. Thus, a position will be available at the top of the LNKLST. As represented by block 954, the SDA and associated ISA are then inserted at the top of the list. The ISA of the LNKLST will be used as the IDA of the responding up link message. The subroutine for updating the display is then entered, as represented by element 958. The sequence then returns to the calling program, as represented by element 960.

If the SDA is already present on the LNKLST (element 940), a determination is then made as to whether the address is present at the top of the LNKLST, as indicated by element 948. If the address is at the top, a determination is made as to whether the corresponding ISA of the LNKLST matches the ISA of the received message, as represented by element 949. If there is a match, no change to the LNKLST is required and the sequence will return to the calling program, as represented by element 950. If there is no ISA match, the ISA is inserted into LNKLST for the associated SDA. If the SDA is not at the top of the LNKLST, the entry is temporarily removed, and the list is shifted down so as to provide a space at the top of the list, as represented by block 952. The removed entry is then added to the top of the list and the sequence is concluded as previously described.

Once the LNKLST has been updated, the sequence returns to the executive program, as indicated by element 936 (FIG. 27). The previously-described sequences for transfering the message to one of the store and forward buffers (FIG. 26), for carrying out the transmit set up (FIGS. 30A, 3B) and for setting the XPLST (FIG. 31) are then carried out.

The sequence for transmitting store and forward messages in the up link direction (FIG. 25) and the down link direction (FIG. 27) have been described. The sequence for transmitting messages containing a data package originated by the subject remote unit will now be described.

The executive program for controlling each remote unit periodically determines whether the remote unit is to transmit a message containing an originated data package, thereby initiating a down link message sequence. By way of example, the remote units may be implemented to periodically transmit messages containing power consumption data. As a further example, a remote unit may initiate a down link message sequence in response to an up link message from the master unit.

Figures 32, 33:
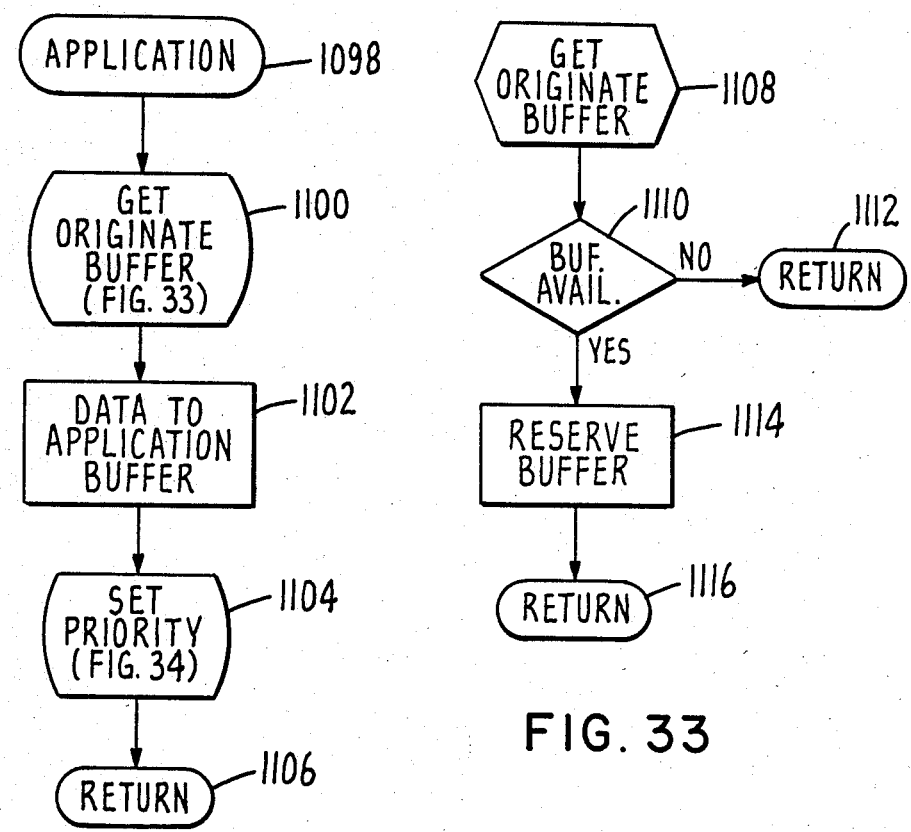
FIG. 32 is a flowchart called by the executive program depicting the manner in which a remote unit originates a data package associated with the remote unit for a message to be transmitted by the remote unit.
FIG. 33 is a flowchart of a subroutine depicting the manner in which an originate buffer is obtained for a data package associated with the remote unit to be transmitted by the remote unit.

The sequence for obtaining an application buffer for storing the data package in the message to be transmitted and for setting the priority NT for the message, sometimes referred to as the application sequence, is depicted in the flowchart of FIG. 32. The sequence is entered into when the executive program observes that a data package originated by the subject remote unit is to be transmitted thereby initiating a down link message sequence. The sequence for initiating a down link message sequence in response to receipt of a deaf node message is depicted in the flowchart of FIG. 27 for store and forward messages.

Entry into the application sequence is represented by element 1098. As indicated by element 1100, a subroutine is first called for reserving one of the five originate buffers (FIG. 5). The subroutine for reserving the buffer is depicted in the FIG. 33 flowchart.

Entry into the subroutine is represented by element 1108. As indicated by element 1110, a determination is made as to whether any of the originate buffers is available. A buffer may not be available, for example, if the network is overloaded with traffic and messages cannot reach the master unit. In that event, the down link sequence cannot be initiated and the sequence will return to the executive program, as represented by element 1112.

If an originate buffer is available, the buffer is returned as represented by block 1114. The sequence will then return to the calling program (element 1100), as represented by element 1116. A pointer is stored indicating which buffer has been reserved.

The data package to be transmitted in the sequence initiating message is transferred to a temporary or application buffer (not shown), as represented by block 1102. The data may, for example, relate to power consumption.

Once the data are transferred, a subroutine is entered for setting the priority NT of the message to be transmitted, as shown by element 1104. Message priority NT controls the probability that a message will be transmitted at a particular slot time, as previously described in connection with equation (1).

Figure 34:
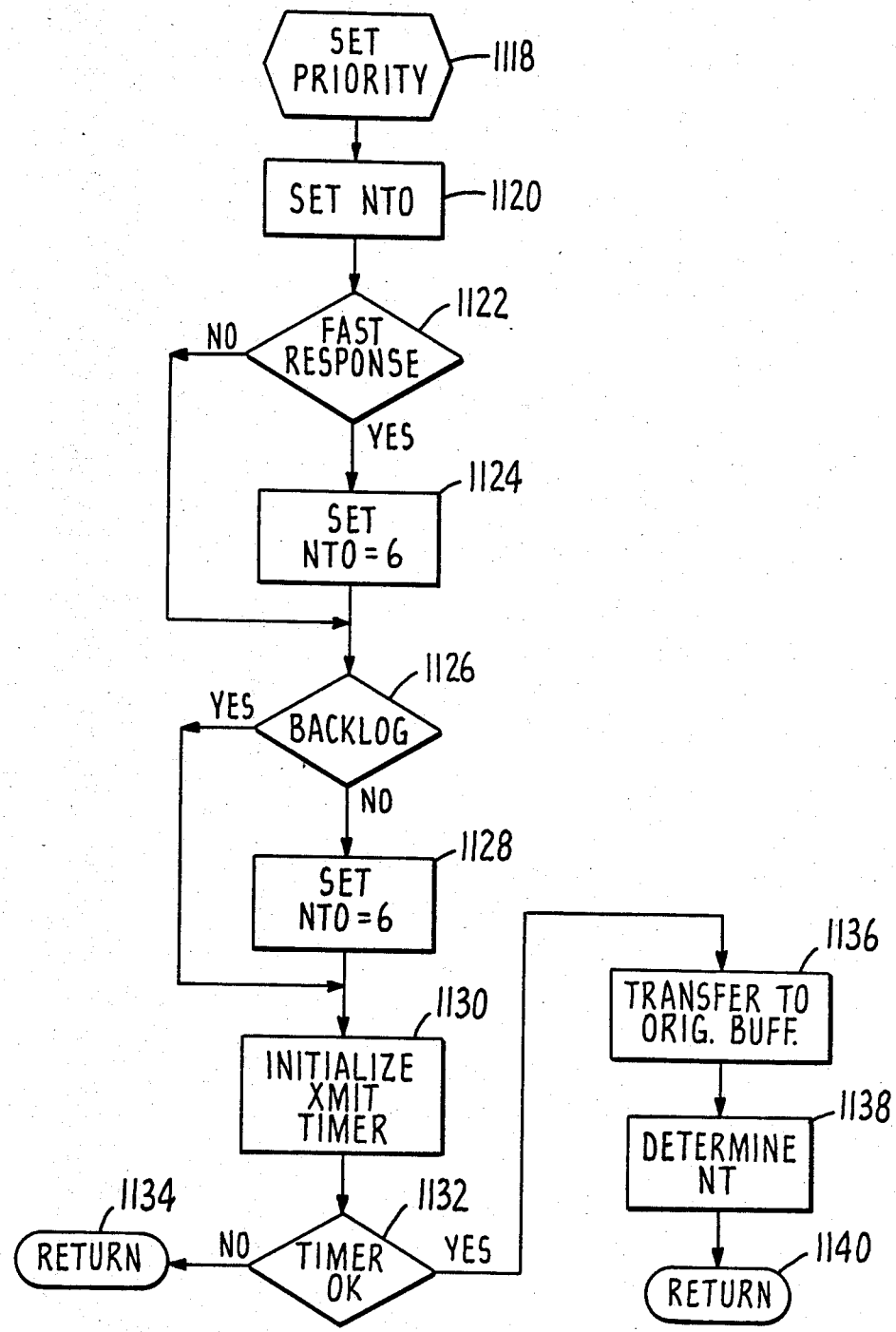
FIG. 34 is a flowchart of a subroutine depicting the manner in which message priority is set for a messages containing a data package originated by a remote unit.

Entry into the set priority subroutine is represented by element 1118 of FIG. 34. As previously described, messages transmitted by a remote unit for initiating down link message sequences, other than deaf node message sequences, have a floating priority which varies with changes in the System Priority SP, as set forth in equation (2). The original (unadjusted) priority value NTO is set equal to 17, this providing the lowest probability that a message will be transmitted at a particular slot timer tick as indicated by block 1120.

As previously described, certain messages containing information requiring a fast response from a remote unit will be assigned an initial priority value NTO of 6 rather than 17. Down link messages to be transmitted quickly are typically those that are produced in response to receipt of an up link message of an up link message sequence initiated by the master unit. As indicated by element 1122, a determination is made as to whether the message is to be assigned a high probability of transmission. If so, the original priority NTO is changed from 17 to 6, as represented by block 1124.

Once NTO has been changed, if appropriate, a determination is made as to whether the subject remote unit has a backlog of messages to be transmitted, as represented by element 1128. A backlog exists in the present embodiment if there are not at least two unreserved buffers out of the five originate buffers. If there is a message backlog, the value of NTO will be set to 6 so as to increase the probability of transmission thereby reducing message backlog.

The probability transmit timer is then set with a randomly selected initial value and the initial priority NTO is stored, as indicated by element 1130. A determination is then made as to whether the probability transmit timer has been initialized properly, as represented by element 1132. The timer will not be initialized properly if, for example, a timer function is not available. In that event, the sequence will return to the calling program, as represented by element 1134.

Assuming that the transmit timer has been initialized properly, the data package present in the application buffer is transferred to the reserved originate buffer (block 1114), as indicated by block 1136. The message priority value NT is then determined, as indicated by block 1138, in accordance with equation (2). The probability transmit timer then begins to be clocked and the sequence returns to the calling program (element 1104), as represented by element 1140. As indicated by element 1106 of FIG. 32, the sequence will then return to the executive program.

The probability transmit timer will continue to be clocked until the number of timer bits under consideration, NT, are clocked to zero. As previously described, since messages containing data packages originated by the transmitting unit have a floating priority, the value of NT will be updated in accordance with equation (2), as the value of SP changes, while the timer is running.

When the probability transmit timer times out, an attempt will be made to transmit the originated data package. The executive program will detect the time out and will cause the transmit sequence to commence.

Figure 35:
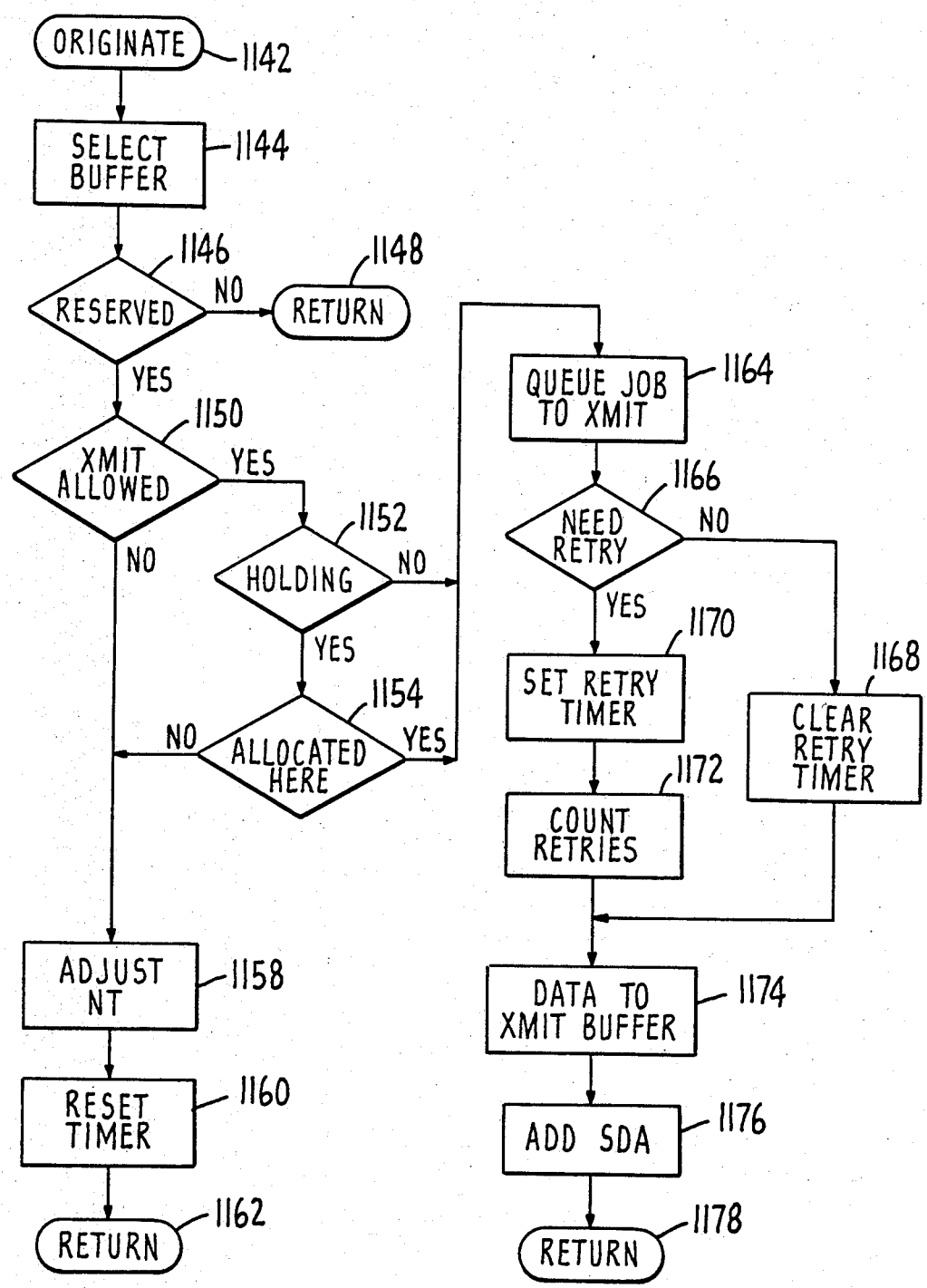
FIG. 35 is a flowchart which is entered when the probability transmit timer times out depicting the sequence in which an attempt is made to transmit a message containing a data package originated by the remote unit.

Entry into the originated data package transmit sequence is represented by element 1142 of FIG. 35. The originate buffer containing the data package to be transmitted is then selected, as represented by block 1144. A determination is then made as to whether the buffer is still reserved, as indicated by element 1146. It is possible that the message to be transmitted no longer requires transmission. By way of example, if a message had been previously sent and the reply not timely received, a retry message will be transmitted, as previously described. In the event the present data package will be inserted in a retry message, the retry message will not be transmitted if the reply to the earlier message had been received while the probability transmit timer was running. In that event, the originate buffer will no longer be reserved and the present data package will not be transmitted. The sequence will then return to the executive program, as represented by element 1148.

Assuming that the buffer is still reserved, a determination is made as to whether the transmit allowed flag is set. As previously described, the flag will be cleared in the event the subject remote unit is not receiving or transmitting a message. In the event the subject unit is receiving or transmitting a message, the allowed flag will be set and transmission of a further message will be inhibited.

If the allowed flag is set, the message priority NT is adjusted in accordance with the present System Priority SP, as indicated by block 1158. The probability transmit timer is then reset with a new random number and the sequence is returned to the executive program, as represented by block 1160 and element 1162, respectively. The sequence will be reentered when the timer times out.

Assuming that the transmit allowed flag is clear (element 1150), a determination is made as to whether the transmit hold delay timer is running, as represented by element 1152. If there is a hold delay, the message will not be transmitted unless the channel has been allocated to the subject remote unit, as represented by element 1154. The channel will have been allocated to the subject remote unit, for example, when the unit had previously transmitted a message with a set Message Following Flag MFF.

As previously described, a channel can be allocated to a remote unit by virtue of the remote unit being the final destination of the message information in a message or the remote unit being the initiator of the down link sequence which produced the message. If the channel is allocated to a remote unit because the remote unit transmitted the message, a transmit allocate flag will be set. The flag is cleared when a reply message is received by the sequence originating remote unit. A remote unit having a set transmit allocate flag will not initiate a down link message sequence over the channel, even though the channel has been allocated to the unit. Such a sequence will be initiated only in the event that the channel has both been allocated to the unit and the transmit allocate flag is cleared.

The purpose of the transmit allocate flag is to prevent messages of down link sequences initiated by a remote unit from colliding with one another. By way of example, if a remote unit initiates a sequence, the channel will be allocated to the unit and the transmit allocate flag will be set. The purpose of the retry timer, as noted earlier, is to re-transmit a message which contains a data package which initiates a message sequence in the event a reply to a previous sequence is not received. The retry timer function can be implemented utilizing the probability transmit timer. The transmit timer is reinitialized once the message is transmitted and a retry occurs if the expected reply message is not received before a time out.

Certain messages do not require the use of a retry timer. For example, if the subject remote unit transmits a message for which no reply is expected, the retry timer is not needed. As represented by element 1166, a determination is made as to whether a retry timer is needed. If no timer is required, the retry timer will be cleared, as represented by block 1168.

If a retry timer is to be used, the time period is set, as shown by block 1170. The duration of the period is determined by the local Hop Count HC of the unit, with the duration being longer for larger values of HC. The number of times a message containing a data package is re-transmitted is accumulated in a counter for diagnostic purposes, as indicated by block 1172.

Once the retry timer has been set, if appropriate, the data package in the originate buffer is transferred to the transmit buffer (FIG. 5), as indicated by element 1174.

As represented by block 1176, the SDA of the message, which is the address of the subject unit, is then inserted in the message at this point. The remainder of the down link message will be formed during the final transmit sequence, as was previously described in connection with FIGS. 30A and 30B and transmitted down link.

Thus, a novel adaptive communication network and method have been disclosed. Although a preferred embodiment has been described in some detail, certain changes could be made by those skilled in art without departing from the spirit and scope of the invention as defined by one or more of the appended claims.

By way of example, an alternative embodiment network may include several remote units which are only capable of transmitting messages contain a data package originated by the units and do not store and forward messages. The messages are periodically transmitted over the network and would contain, for example, power consumption data. The network further includes two or more remote units capable of storing and forwarding a data package and a master unit.

Figure 22:
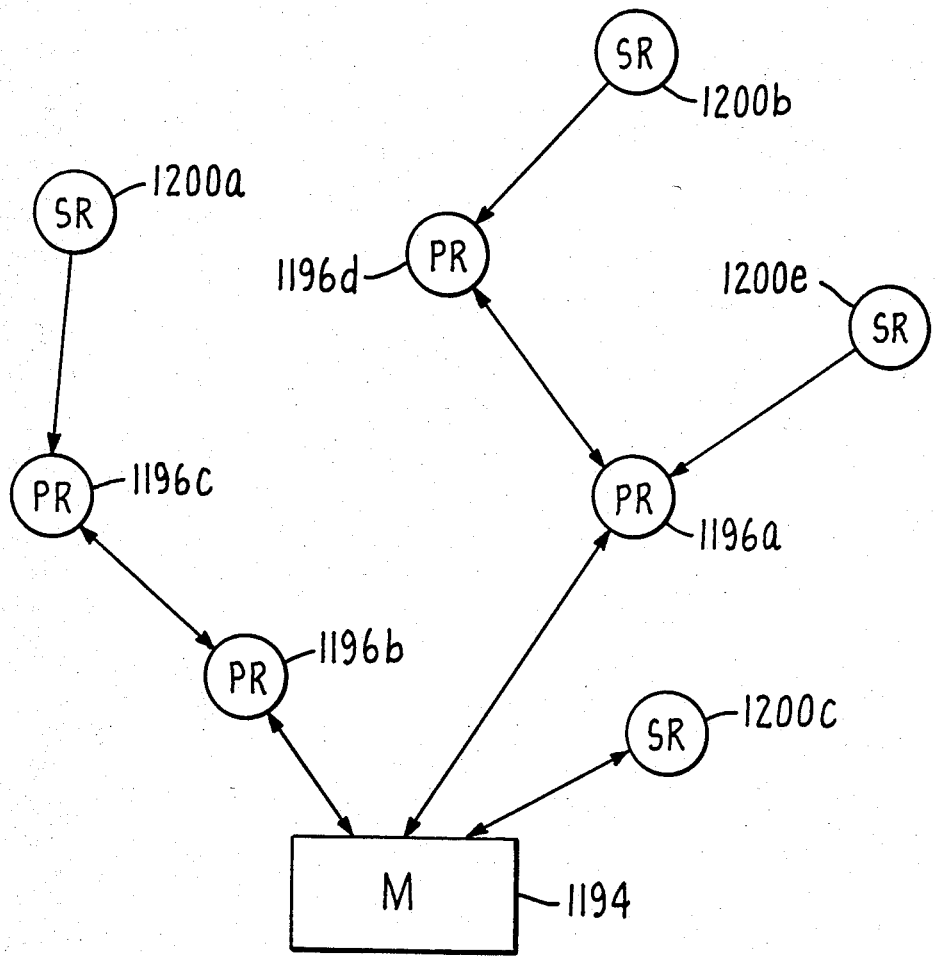
FIG. 22 is a schematic diagram illustrating a typical communication system and exemplary communication paths of an alternative embodiment of the subject invention.

An exemplary communication system utilizing the alternative embodiment invention is depicted in the diagram of FIG. 22. The system includes a master unit 1194 and several remote units 1200, referred to as secondary remote units. The system further includes remote units 1196, referred to as primary remote units, for assisting in the transfer of data packages from the secondary units to the master unit.

Although not depicted, each secondary unit 1200 has an associated power meter which provides power consumption data packages to be transferred to the master unit. The secondary units, which are not capable of receiving messages, are implemented to periodically transmit messages containing power consumption data packages such as electrical power data associated with the unit. The messages, sometimes referred to as secondary messages, also contain the address of the transmitting secondary unit so that the master unit can identify the source of the consumption data and also a flag to indicate that the message was transmitted by a secondary remote unit. The flag performs a function similar to the Global Sequence Number being set to all ones in the previously-described deaf node messages.

The primary remote units 1196 may have an associated data source, although the main function of the units is to store and forward data packages in secondary messages transmitted by secondary units and in messages transmitted by other primary remote units to the master unit. Messages transmitted by primary remote units are sometimes referred to as primary messages to distinguish them from secondary messages. Primary messages preferably have the same content as previously set forth in connection with the description of Table 1. In the event the primary remote units 1196 only function to store and forward messages, the units preferably are implemented to periodically initiate down link message sequences for the purpose of assisting other primary remote units in updating their associated Good List GOODLST.

Operation of the alternative embodiment invention will be further illustrated by way of a few examples. At initial power on, none of the Good Lists of the primary remote units contain down link addresses other than that of the master unit. The primary remote units will all commence operation by transmitting a down link message containing an IDA of the master unit. As further messages are transmitted, each primary remote unit will form a set of at least one preferred down link address. For current network conditions depicted in FIG. 36, for example, the preferred down link address for unit 1196b is the master unit and for unit 1196c, unit 1196b is the preferred address.

As previously described, secondary remote units 1200, like deaf nodes, will periodically transmit secondary messages containing power consumption data and a source address of the secondary unit. Secondary messages do not contain valid IDAs since secondary remote units are not capable of forming a Good List.

Assuming, for example, that primary unit 1196c receives a secondary message transmitted by secondary unit 1200a, the primary unit will recognize the message as a secondary message by the presence of the previously-noted secondary message flag. Unit 1196c will then undertake to store and forward the data package in the secondary message by initiating a down link message sequence. The down link message will contain a Source Destination Address SDA which identifies the secondary unit associated with the data package, an Intermediate Source Address ISA which identifies primary unit 1196c and at Intermediate Destination Address IDA, taken from the GOODLST which identifies primary remote unit 1196b. The primary message will be received by primary remote unit 1196b which will, in turn, store and forward the data package in the same manner described in connection with the first embodiment. The master unit will respond to the down link message of unit 1196b by transmitting an up link message having an Intermediate Destination Address IDA of unit 1196b, and a Source/Destination Address SDA of secondary unit 1200a and an Intermediate Source Address ISA of the master unit. The up link data package will be stored and forwarded to primary unit 1196c. Unit 1196c preferably will also transmit an up link message even though secondary unit 1200a is not capable of receiving messages. The purpose of such a message is to provide information for updating the Good Lists of other primary remote units in the system.

It should be noted that in the previously-described sequence, it is also possible that other primary units other than unit 1196c will have received the secondary message from secondary unit 1200a. For example, unit 1196d may have also received the secondary message from unit 1200a. Although both units 1196c and 1196d would have received the secondary message at the same time, because of the manner of operation of the respective probability transmit timers, it is unlikely that the two units would proceed to initiate a down link message sequence at the same time. Assuming that until 1196c commenced transmitting first, unit 1196d would detect the transmission on the network and would refrain from transmitting. Once unit 1196c completed transmitting the down link message, it is possible that unit 1196d received the transmitted message in addition to unit 1196b. In that event, unit 1196d will recognize that the down link message contains a data package from a secondary remote unit by virtue of the presence of the secondary message flag. In addition, unit 1196d will recognize that the message was not transmitted by the secondary unit because the Source/Destination Address SDA of the message will differ from the Intermediate Source Address ISA. As with the case of deaf nodes, unit 1196d will discard the message it received from secondary unit 1200a since primary unit 1196c has already undertaken to assist unit 1200a by initiating a down link message sequence.

Primary remote units are preferably implemented to perform the same function as the remote units of the first embodiment including the selection of preferred down link addresses. By way of example, for the network conditions depicted in FIG. 22, primary unit 1196d has selected primary unit 1196a as the preferred down link address. If network condition should change, unit 1196d may select other primary remote units or the master unit as the preferred address.

From the foregoing, it can be seen that the master unit is implemented in a manner similar to the remote units. The master unit will not transmit on the network if the master unit hold delay timer is running unless the channel has been allocated to the SDA of the message. If the message to be transmitted is a reply to a down link message, the master unit will utilize the Intermediate Source Address ISA of the received message as the Intermediate Destination Address IDA of the reply message. In that event, the channel will have been allocated to the data package originating remote unit during the transmission of the previous down link messages The master unit will initiate an up link sequence by transmitting a message such as a Global Sequence Command GSC much in the same manner as a remote unit initiates a down link message sequence. However, the master unit will transmit the message with a floating priority NT being determined by the urgency of the message. As previously noted, if the message is in response to receipt by the master of a down link message, the message will be transmitted with a fixed priority of ∅. Accordingly, the message will be transmitted onto the network at the next slot timer tick.

I claim:

1. A communication system for use in a network of interconnected communication paths, said system comprising a plurality of communication nodes capable of transmitting messages over the network including a master unit and a plurality of remote units which are also capable of receiving said messages over the network, with each of said nodes having an associated identifying address, wherein said remote units are capable of initiating a down link message sequence wherein a data package associated with one of said nodes is transferred from a sequence-originating remote unit to said master unit by transmission of at least one of said messages, designated as down link messages, with said down link messages including said data package a source address identifying which of said nodes is associated with said data package in said message, an intermediate source address identifying which of said nodes transmitted said down link message, an intermediate destination address identifying which of said nodes is intended to receive said down link message and wherein said master unit is capable of initiating a responding up link message sequence in response to receipt by said master unit of one of said down link messages, wherein said sequence-originating remote unit is informed of said receipt by said master unit of said data package by transmission of at least one of said messages, designated as an up link message, with said up link messages including an intermediate source address identifying which of said nodes transmitted said up link message, an intermediate destination address identifying which of said nodes is intended to receive said up link message and a final destination address identifying said node associated with said data package received by said master unit with each of said remote units including:

(a) remote input means for receiving said data package, said remote input means including remote receiver means for receiving said messages, said remote receiver means including direction means for discriminating between said up and down link messages and store and forward means for identifying received messages requiring a transmit action by said receiving remote unit;

(b) remote transmitter means for transmitting said messages in response to receipt of one of said messages requiring said transmit action by said receiving remote unit, said remote transmitter means including down link transmit means for transmitting one of said down link messages containing said data package obtained from said received message in the event said received message is one of said down link messages, said down link transmit means including down link address means for determining said intermediate destination address of said down link messages transmitted by said receiving remote unit utilizing at least one parameter indicative of network conditions obtained, at least in part, from said messages received by said receiving remote unit containing one one of said intermediate destination addresses other than said address of said receiving remote unit and including up link transmit means for transmitting one of said up link messages in the event said received message is one of said up link messages, said up link transmit means including up link address means for determining said intermediate destination address of said transmitted up link message; and wherein said master unit includes:

(a) master receiver means for receiving said messages, said master receiver means including direction means for discriminating between said up and said down link received messages; and (b) master transmitter means for transmitting said up link messages in response to receipt by said master unit of one of said down link messages.

2. The system of claim 1 wherein said down link address means also obtains said at least one parameter indicative of network conditions from said messages received by said receiving remote unit having one of said intermediate destination addresses which corresponds to said address of said receiving remote unit.

3. The system of claim 2 wherein said remote transmitter means further includes transmit initiate means for initiating one of said down link message sequences.

4. The system of claim 3 wherein said transmit initiate means is a means for initiating the transmission of one of said messages by said remote unit for the purpose of enabling other ones of said remote units to obtain said at least one parameter from said transmitted message.

5. The system of claim 3 wherein said down link messages transmitted by said down link means in response to receipt of one of said messages requiring said transmit action include one of said source addresses which corresponds to said source address of said received message and an intermediate source address which corresponds to said address of said receiving remote unit.

6. The system of claim 5 wherein said down link messages transmitted by said down link means in response to said transmit initiate means include one of said source addresses which corresponds to said address of said node associated with said data package contained in said transmitted down link messages.

7. The system of claim 6 wherein said up link address means utilizes said intermediate source addresses obtained from said received down link messages requiring transmit action for said intermediate destination address of a responding one of said up link messages.

8. The system of claim 7 wherein said store and forward means identifies said received down link messages as requiring said transmit action if said intermediate destination address of said received down link message corresponds to said address of said receiving remote unit.

9. The system of claim 8 wherein said store and forward means identifies said received up link messages as requiring said transmit action if said intermediate destination address corresponds to said address of said receiving remote unit and said final destination address differs from said address of said receiving remote unit.

10. The system of claim 9 wherein said master transmitter means transmits said up link messages containing an intermediate destination address which corresponds to said intermediate source address of said received down link message to which said up link message is a response.

11. The system of claim 10 wherein said master transmitter means transmits said up link messages containing one of said final destination addresses which corresponds to said source address of said received down link message to which said up link message is a response.

12. The system of claim 1 wherein said remote units further include data input means for producing one of said data packages from a data source associated with said remote unit.

13. The system of claim 12 wherein said remote transmitter means further includes transmit initiate means for initiating one of said down link message sequences and wherein said down link transmit means transmits one of said down link messages containing said data package obtained from said data input means in response to said transmit initiate means.

14. The system of claim 11 wherein said down link address means includes link confirmed means for producing a link confirmed flag which indicates whether said remote unit received one of said up link messages in response to a previous transmission of a down link message by said transmitting remote unit.

15. The system of claim 14 wherein said messages transmitted by said remote unit contain said link confirmed flag associated with said remote unit and wherein said down link address means examines said link confirmed flag contained in said received messages, with said examined link confirmed flag being one of said at least one parameter indicative of network conditions.

16. The system of claim 15 wherein said link confirmed means includes expected list means for identifying one of said remote units which transmits one of said down link messages and for determining whether said identified transmitting remote unit received a responding one of said up link messages.

17. The system of claim 16 wherein said down link address means includes failure quotient means for storing a failure quotient value indicative of the frequency over time that said remote unit identified by said expected list means failed to receive one of said up link messages in response to transmission of one of said down link messages by said identified remote unit and wherein said failure quotient is one of said at least one parameter indicative of network conditions.

18. The system of claim 11 wherein said down link address means includes expected list means for identifying one of said remote units which transmits one of said down link messages and for determining whether said identified transmitting remote unit received a responding one of said up link messages.

19. The system of claim 18 wherein said down link address means includes failure quotient means for storing a failure quotient value indicative of the frequency over time that said remote unit identified by said expected list means failed to receive one of said up link messages in response to transmission of one of said down link message by said identified remote unit and wherein said failure quotient is one of said at least one parameter indicative of network conditions.

20. The system of claim 11 wherein said down link address means includes hop count means for producing a hop count value associated with said remote unit indicative of the number of successive down link message transmissions required to transfer said data package from said associated remote unit to said master unit.

21. The system of claim 20 wherein said messages transmitted by said associated remote unit contain said hop count value and wherein said down link means examines said hop count value contained in said received messages, with said examined hop count value being one of said at least one paramter indicative of network conditions.

22. The system of claim 11 wherein said up link means of said remote unit store at least one node address for use as said intermediate destination address for said up link messages transmitted by said transmitting remote unit and wherein said stored addresses are one of said at least one parameter indicative of network conditions.

23. The system of claim 11 wherein said down link address means of said remote unit include signal-to-noise means for producing a signal-to-noise value indicative of an estimated signal-to-noise ratio of said messages received by said remote unit.

24. The system of claim 23 wherein said signal-to-noise value is one of said at least one parameter indicative of network conditions.

25. The system of claim 23 wherein said down link address means of said remote unit includes quality of link means for producing a transmitted quality of link value which is present in said messages transmitted by said transmitting remote unit, with said transmitted quality of link value being derived from a local quality of link value and a received quality of link value, with said local quality of link value being produced from said signal-to-noise value and said received quality of link value being derived from said transmitted quality of link values produced by nodes other than said transmitting remote unit which are present in said messages received by said transmitting remote unit and wherein said transmitted quality of link value is one of said at least one parameter indicative of network conditions.

26. The system of claim 25 wherein said down link address means of said remote unit includes a preferred node address which is utilized as said intermediate destination address of said down link messages transmitted by said transmitting remote unit and wherein said received quality of link value is derived from said transmitted quality of link value present in messages transmitted by said node associated with said preferred node address.

27. The system of claim 11 wherein said remote transmitter means includes collision reduction means for controlling transmission of said messages by said transmitting remote unit so as to reduce the probability that said messages transmitted by said transmitting remote unit will collide with other said messages on the network.

28. The system of claim 27 wherein said collision reduction means includes transmit hold means for delaying transmission of said messages by said transmitting remote unit in response to receipt by said transmitting remote unit of one of said messages.

29. The system of claim 28 wherein said transmit hold means includes hold delay timer means for controlling the duration of said transmission delay, with said timer means being changeable between an active state wherein said transmission delay is in effect and an inactive state wherein said transmission delay is not in effect, with said timer means changing from said inactive state to said active state in response to receipt by said transmitting remote unit of one of said down link messages and includes channel allocation means for storing an address, referred to as an allocated address, which corresponds to one of said nodes associated with said data package contained in said down link message which caused said change to said active state.

30. The system of claim 29 wherein said timer means changes from said inactive state to said active state in response to receipt by said transmitting remote unit of one of said up link messages.

31. The system of claim 30 wherein said down link messages contain hold delay information used by said hold delay timer means for controlling said duration of said transmission delay.

32. The system of claim 31 wherein said down link address means includes hop count means for producing a hop count value associated with said transmitting remote unit indicative of the number of successive down link message transmissions required to transfer said data package from said transmitting remote unit to said master unit and wherein said duration of said transmission delay of said transmitting remote unit is a function of one of said hop count values.

33. The system of claim 32 wherein said duration of said transmission delay may also be independent of said hop count values and wherein said hold delay information from said received message used by said hold delay timer indicates whether said duration of said transmision delay is controlled by said hop count values.

34. The system of claim 29 wherein said transmit hold means includes channel allocation means for storing an address which corresponds to one of said nodes associated with said data package present in said down link message which caused said change to said active state.

35. The system of claim 34 wherein said timer means changes from said inactive state to said active state in response to receipt by said transmitting remote unit of one of said up link messages.

36. The system of claim 27 wherein said collision reduction means of said transmitting remote unit includes transmit timer means for controlling the probability that said transmitting remote unit will transmit one of said messages at a particular one of periodic event times.

37. The system of claim 36 wherein said probability is a function of a number of said messages transmitted on the network during a predetermined time period.

38. The system of claim 37 wherein said messages contain message traffic information indicative of said number of said messages transmitted on the network and wherein said transmit timer means of said transmitting remote unit utilizes said message traffic information in said messages received by said transmitting remote unit for determining said probability.

39. The system of claim 38 wherein said transmit timer means includes a transmit counter clocked by a transmit clock, with a transmit attempt period commencing when said transmit counter is clocked starting at an initial value and with said attempt period terminating when said transmit counter is clocked to a final value at which time said transmitting remote unit attempts to transmit one of said messages, with the duration of said transmit attempt period being relatively randomly selected for each of said attempt periods.

40. The system of claim 39 wherein said transmit clock has a period which corresponds to the period of said periodic event times, said transmit counter has a plurality of counter outputs of varying count significance and with said transmit attempt period terminating when selected ones of said transmit counter outputs are clocked to said final value, with said probability of transmission being a function of which of said counter outputs are selected.

41. The system of claim 40 wherein said probability of transmission may be altered during said transmit attempt period, in response to a change in said number of messages transmitted on the network, by changing said selected ones of said transmit counter outputs.

42. The system of claim 41 wherein said selected ones of said transmit counter outputs may include none of said counter outputs, in which case said transmit attempt period terminates upon receipt of a next one of said transmit clocks.

43. The system of claim 41 wherein said transmit counter is a binary counter which is set to a relatively randomly-selected one of said initial values and which is decremented to said final value by said transmit clock.

44. The system of claim 11 wherein said down link messages transmitted by one of said nodes contain a message identifier associated with said data package in said message and wherein said message identifier is transferred from said sequence initiating remote unit to said master unit during one of said down link message sequence and transferred from said master unit back to said sequence initiating remote unit during said responding up link message sequence.

45. The system of claim 44 wherein said remote transmitter means includes retry means for confirming receipt by said master unit of said data package when said remote unit is one of said sequence initiating remote units by examining said message identifier in said up link messages and said retry means causes said sequence initiating remote unit to initiate a subsequent one of said down link message sequences containing said data package of a previous one of said down link message sequences in the event receipt of said previous down link data package by said master unit is not confirmed by said retry means.

46. The system of claim 11 wherein said master transmitter means includes command means for initiating a command message sequence wherein command information is transferred from said master unit to at least one of said remote units by transmission of at least one of said messages, referred to as a command message.

47. The system of claim 46 wherein said command messages include messages designated as flood command messages and wherein said remote receiver means of said remote unit includes flood command means for detecting receipt by said receiving remote unit of one of said flood command messages and wherein said remote transmitter means of said receiving remote unit transmits one of said flood command messages in response to receipt of one of said flood command messages by said receiving remote unit, with said transmitted flood command message containing said command information of said received flood command message.

48. The system of claim 47 wherein said flood command messages transmitted by said receiving remote units contain one of said intermediate destination addresses determined independent of said up link address means of said receiving remote unit.

49. The system of claim 46 wherein said remote units and said master unit transmit ones of said messages which further include a command number and wherein said messages transmitted by said master unit contain one of said command numbers, referred to as a master command number, which is sequentially changed as said master unit produces new command information to be transmitted in said command messages, and wherein said remote receiver means further includes command number storage means for storing said command number present in messages received by said remote unit, and said remote transmitter means inserts said command number stored in said remote unit in messages transmitted by said remote unit.

50. The system of claim 49 wherein said command number storage means replaces said stored command number with one of said command numbers present in one of said messages received by said remote unit if said received command number is indicative of command information more recent than that indicated by said command number presently stored.

51. The system of claim 50 wherein said remote receiver further includes actual command received means for producing an actual command received number indicative of said command information received by said receiving remote unit and said transmit initiate means includes missing command means for initiating one of said down link message sequences in response to a determination by said command number storage means that said received command number is indicative of command information more recent than that indicated by said command number presently stored.

52. The system of claim 51 wherein said messages of said down link message sequence initiated by said missing command means contain one of said data packages which includes said actual received command number of said initiating remote unit.

53. The system of claim 52 wherein said remote receiver means further includes sequential detection means responsive to said command number present in one of said received command messages and to said actual command received number for determining whether command information present in said received command message has been received in a predetermined command information sequence and wherein said missing command means initiates one of said down link message sequences if said receive command information is received out of said sequence.

54. The system of claim 6 wherein said remote units include receiver failure means for causing said remote unit to periodicaly transmit one of said messages, designated as a deaf message, in the event said remote receiver means of said transmitting remote unit has failed, with said deaf messages containing said data packages associated with said transmitting remote unit and further containing receiver failed information indicating that said receiver means of said transmitting remote unit has failed.

55. The system of claim 54 wherein said store and forward means of said remote units identifies said deaf messages received by said receiving remote unit as said messages requiring said transmit action, independent of said intermediate destination address of said received deaf message.

56. The system of claim 11 wherein said down link address means of said remote units includes hop count means for producing a hop count value associated with said remote unit which is indicative of the number of successive message transmissions required to transfer said data package from said associated remote unit to said master unit, with said messages transmitted by said associated remote unit containing said hop count value of said associated remote unit and wherein said remote transmitter means of said associated remote unit includes assist means for causing said associated remote unit to transmit one of said messages in response to receipt by said associated remcte unit of one of said messages containing one of said hop count values which indicates that said number of transmissions exceeds a predetermined value.

57. The system of claim 11 wherein said remote transmitter means of at least two of said remote units further includes separate output means for coupling to a separate communication path distinct from the network of interconnected communications paths and for transmitting said messages transmitted over the interconnected communication paths also over the separate communication path and wherein said remote receiver means of said at least two of said remote units further includes separate input means for coupling to the separate communication path and for receiving said messages transmitted over the separate communication path.

58. The system of claim 13 wherein the network of interconnected paths includes power lines for distributing electrical energy and wherein said data input means includes power meter means for providing data relating to electrical energy consumption by an electrical load associated with said remote unit.

59. The system of claim 1 wherein said remote units are designated as primary remote units and said messages transmitted by said remote units and by said master unit are designated as primary messages and wherein said communication nodes further include a plurality of secondary remote units, each having an associated identifying address, capable of transmitting said messages, designated as secondary messages, over the network, each of said secondary remote units including:
  secondary data input means for receiving said data package from a data source associated with said secondary remote unit; and
  secondary remote transmitter means for transmitting said secondary messages over the network, with said secondary messages including one of said addresses, designated as a source address, for identifying which of said secondary remote units transmitted said secondary message and further including said data package obtained from said data source associated with said secondary remote unit which transmitted said secondary message; and
and wherein said store and forward means of said primary remote units includes means for identifying received ones of said secondary messages as requiring said transmit action and wherein said remote transmitter means of said receiving primary remote unit initiates one of said down link message sequences in response to receipt of one of said secondary messages wherein said data package associated with said secondary remote unit which transmitted said secondary message is transferred from said sequence-initiating primary remote unit to said master unit by transmission of at least one of said down link primary messages.

60. The system of claim 59 wherein said down link primary messages transmitted by said down link means in response to receipt of one of said messages by said primary remote unit, including said primary and said secondary messages, requiring said transmit action include one of said source addresses which corresponds to said source address of said received message and an intermediate source address which corresponds to said address of said receiving primary remote unit.

61. The system of claim 60 wherein said down link primary messages transmitted by said down link means of said receiving primary remote unit include one of said source addresses which corresponds to said address of said node associated with said data package present in said transmitted down link primary message.

62. The system of claim 61 wherein said up link address means of said primary remote units utilizes said intermediate source addresses obtained from said received down link primary messages requiring said transmit action for said intermediate destination address of a responding one of said up link primary messages.

63. The system of claim 62 wherein said secondary messages contain secondary message information identifying said messages as secondary messages and wherein said store and forward means of a receiving one of said primary remote units identifies said received messages as requiring said transmit action, including said initiation of one of said down link message sequences if said secondary message information is present in said received message and wherein said store and forward means identifies said received down link primary messages as requiring said transmit action if said intermediate destination address of said received down link primary message corresponds to said address of said receiving primary remote unit.

64. The system of claim 63 wherein said store and forward means of said receiving primary remote unit identifies said received up link primary messages as requiring said transmit action if said intermediate destination address of said received up link primary message corresponds to said address of said receiving primary remote unit and said final destination address of said received up link primary message differs from said address of said receiving primary remote unit.

65. The system of claim 64 wherein said master transmitter means transmits said up link primary messages containing an intermediate destination address which corresponds to said intermediate source address of one of said received down link primary messages to which said transmitted up link primary message is a response.

66. The system of claim 63 wherein said master transmitter means transmits said up link primary messages containing one of said final destination addresses which corresponds to said source address of said received down link primary messages to which said up link primary message is a response.

67. The system of claim 66 wherein said down link address means of said primary remote units includes link confirmed means for producing a link confirmed flag which indicates whether one of said up link primary messages is received by one of said primary remote units in response to a previous transmission of one of said down link primary messages by said receiving primary remote unit and wherein said primary messages transmitted by said receiving primary remote unit contain said link confirmed flag associated with said receiving primary remote unit and wherein said down link means examines said link confirmed flag present in said received primary messages, with said examined link confirmed flag being one of said at least one parameter indicative of network conditions.

68. A communication system for use in a network of interconnected communication paths, said system comprising a plurality of communication nodes capable of transmitting messages over the network including a master unit and a plurality of remote units which are also capable of receiving said messages over the network, with each of said nodes having an associated identifying address, wherein said remote units are capable of initiating a down link message sequence wherein a data package associated with one of said nodes is transferred from a sequence initiating remote unit to said master unit by transmission of at least one of said messages, designated as down link messages, with said down link messages including said data package, a source address identifying which of said nodes is associated with said data package in said message, an intermediate source address identifying which of said nodes transmitted said down link message an intermediate destination address identifying which of said nodes is intended to receive said down link message and wherein said master unit is capable of initiating a responding up link message sequence in response to receipt by said master unit of one of said down link messages, wherein said sequence initiating remote unit is informed of said receipt by said master unit of said data package by transmission of at least one of said messages, designated as an up link message, with said up link messages including an intermediate source address identifying which of said nodes transmitted said up link message, an intermediate destination address identifying which of said nodes is intended to receive said up link message and a final destination address identifying said node associated with said data package received by said master unit, with each of said remote units including:

(a) remote input means for receiving said data package, said remote input means including remote receiver means for receiving said messages, said remote receiver means including direction means for discriminating between up and down link messages and store and forward means for identifying received messages requiring a transmit action by said receiving remote unit;

(b) remote transmitter means for transmitting said messages in response to receipt of one of said messages requiring said transmit action by said receiving remote unit, said remote transmitter means including down link transmit means for transmitting one of said down link messages containing said data package obtained from said received message, one of said source addresses which corresponds to said source address of said received message and one of said intermediate source addresses which corresponds to said address of said receiving remote unit in the event said received message is one of said down link messages, with said down link transmit means including down link address means for determining said intermediate destination address of said down link messages transmitted by said receiving remote unit utilizing at least one parameter indicative of network conditions obtained, at least in part, from said messages received by said receiving remote unit having one of said intermediate destination addresses other than said address of said receiving remote unit; with said remote transmitter means further including up link transmit means for transmitting one of said up link messages in the event said received message is one of said up link messages, said up link transmit means including up link address means for determining said intermediate destination address of said transmitted up link message; and wherein said master unit includes:
(a) master receiver means for receiving said messages, said master receiver means including direction means for discriminating between up and down link received messages;
(b) master transmitter means for transmitting said up link messages in response to receipt by said master unit of one of said down link messages, with said up link messages transmitted by said master unit containing one of said final destination addresses which corresponds to said source address of said received down link message to which said up link message is a response.

69. The system of claim 68 wherein said up link address means utilizes said intermediate source address obtained from said received down link messages requiring transmit action for said intermediate destination address of a responding one of said up link messages.

70. The system of claim 69 wherein said down link address means includes expected list means for identifying one of said remote units which transmits one of said down link messages and for determining whether said identified transmitting remote unit received a responding one of said up link messages.

71. The system of claim 70 wherein said down link address means includes failure quotient means for storing a failure quotient value indicative of the frequency over time that said remote unit identified by said expected list means fails to receive one of said up link messages in response to transmission of a down link message by said identified remote unit and wherein said failure quotient is one of said at least one parameter indicative of network conditions.

72. The system of claim 71 wherein said expected list means is also a means for producing a link confirmed flag in the event said identified remote unit is said subject remote unit indicating whether said subject remote unit has failed to receive one of said responding up link messages; wherein messages transmitted by said subject remote units contain said link confirmed flag and wherein said link confirmed flag is one of said at least one parameter indicative of network conditions.

73. The system of claim 72 wherein said down link means of said remote units include signal-to-noise means for producing a signal-to-noise value indicative of an estimated signal-to-noise ratio of said messages received by said remote units.

74. The system of claim 73 wherein said signal-to-noise value is one of said at least one parameter indicative of network conditions.

75. The system of claim 74 wherein said down link means of said remote units includes quality of link means for producing a transmitted quality of link value which is present in said messages, transmitted by said transmitting remote unit, with said transmitted quality of link value being derived from a local quality of link value and a received quality of link value, with said local quality of link value being produced from said signal-to-noise value and said received quality of link value being derived from said transmitted quality of link values produced by nodes other than said transmitting remote unit which are present in said messages received by said transmitting remote unit and wherein said transmitted quality of link values are one of said at least one parameter indicative of network conditions.

76. The system of claim 75 wherein said down link means of said remote units includes a preferred node address which is utilized as said intermediate destination address of said down link messages transmitted by said transmitting remote unit and wherein said received quality of link value is derived from said transmitted quality of link value present in messages transmitted by said node associated with said preferred node address.

77. A communication system for communicating over a network of interconnected power lines, said system comprising a plurality of communication nodes capable of transmitting messages over the network including a master unit and a plurality of remote units which are also capable of receiving said messages over the network, with each of said nodes having an associated identifying address, wherein said remote units are capable of initiating a down link message sequence wherein a data package includes data relating to consumption of electrical energy, associated with one of said nodes, is transferred from a sequence initiating remote unit to said master unit by transmission of at least one of said messages, designated as down link messages, with said down link messages including said data package, a source address identifying which of said nodes is associated with said data package in said message, an intermediate source address identifying which of said nodes transmitted said down link message, an intermediate destination address identifying which of said nodes is intended to receive said down link message and wherein said master unit is capable of initiating a responding up link message sequence in response to receipt by said master unit of one of said down link messages, wherein said sequence initiating remote unit is informed of said receipt by said master unit of said data package by transmission of at least one of said messages, designated as an up link message, with said up link messages including an intermediate source address identifying which of said nodes transmitted said up link message, an intermediate destination address identifying which of said nodes is intended to receive said up link message and a final destination address identifying said node associated with said data package received by said master unit, with each of said remote units including:

(a) remote input means for receiving said data package, said remote input means including remote receiver means for receiving said messages, said remote receiver means including direction means for discriminating between said up and down link messages and store and forward means for identifying received messages requiring a transmit action by said receiving remote unit;

(b) remote transmitter means for transmitting said messages in response to receipt of one of said messages requiring said transmit action by said receiving remote unit, said remote transmitter means including down link transmit means for transmitting one of said down link messages containing said data package obtained from said received message in the event said received message is one of said down link messages, said down link transmit means including down link address means for determining said intermediate destination address of said down link messages transmitted by said receiving remote unit utilizing a plurality of parameters indicative of network conditions, including a hop count value which represents the number of said message transmissions required to transfer said data package from a particular one of said nodes to said master unit and including up link transmit means for transmitting one of said up link messages in the event said received message is one of said up link messages, said up link transmit means including up link address means for determining said intermediate destination address of said transmitted up link message; and wherein said master unit includes:

(a) master receiver means for receiving said messages, said master receiver means including direction means for discriminating between said up and down link received messages; and (b) master transmitter means for transmitting said up link messages in response to receipt by said master unit of one of said down link messages.

78. The system of claim 77 wherein said down link address means determines said intermediate destination address utilizing said paramter indicative of network condition obtained, at least in part, from said messages received by said receiving remote unit containing one of said intermediate destination addresses other than said address of said receiving remote unit.

* * * * *